United States Patent
Negus et al.

(10) Patent No.: US 9,577,733 B2
(45) Date of Patent: *Feb. 21, 2017

(54) METHOD FOR INSTALLING A BACKHAUL LINK WITH MULTIPLE ANTENNA PATTERNS

(71) Applicant: CBF Networks, Inc., San Jose, CA (US)

(72) Inventors: Kevin J. Negus, Philipsburg, MT (US); James A. Proctor, Jr., Melbourne Beach, FL (US)

(73) Assignee: CBF Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/084,867

(22) Filed: Mar. 30, 2016

(65) Prior Publication Data

US 2016/0285532 A1  Sep. 29, 2016

Related U.S. Application Data

(63) Continuation of application No. 14/839,018, filed on Aug. 28, 2015, now Pat. No. 9,325,398, which is a
(Continued)

(51) Int. Cl.
*H04B 7/00* (2006.01)
*H04B 7/06* (2006.01)
(Continued)

(52) U.S. Cl.
CPC ............ *H04B 7/0617* (2013.01); *H01Q 1/246* (2013.01); *H01Q 3/2617* (2013.01); *H01Q 21/20* (2013.01);
(Continued)

(58) Field of Classification Search
None
See application file for complete search history.

(56) References Cited

U.S. PATENT DOCUMENTS

D307,274 S  4/1990 Sasaki et al.
D335,128 S  4/1993 Soren
(Continued)

FOREIGN PATENT DOCUMENTS

EP  2745539  6/2014
EP  2767102  8/2014
(Continued)

OTHER PUBLICATIONS

Notice of Allowance in U.S. Appl. No. 14/988,578, dated Mar. 30, 2016.
(Continued)

*Primary Examiner* — Hassan Phillips
*Assistant Examiner* — Gautam Sharma
(74) *Attorney, Agent, or Firm* — Nixon Peabody LLP

(57) ABSTRACT

An intelligent backhaul system is disclosed for deployment in the presence of existing radio systems. A backhaul system for co-channel deployment with existing licensed and unlicensed wireless networks, including conventional cellular backhaul radios, Common Carrier Fixed Point-to-Point Microwave Service, Private Operational Fixed Point-to-Point Microwave Service and other FCC 47 C.F.R. §101 licensed microwave networks is disclosed. Processing and network elements to manage and control the deployment and management of backhaul of radios that connect remote edge access networks to core networks in a geographic zone which co-exist with such existing systems or other sources of interference within a radio environment are also disclosed.

20 Claims, 16 Drawing Sheets

Related U.S. Application Data continuation of application No. 13/934,175, filed on Jul. 2, 2013, now Pat. No. 9,179,240, which is a continuation of application No. 13/371,346, filed on Feb. 10, 2012, now Pat. No. 8,502,733.

(51) Int. Cl.

| | | |
|---|---|---|
| *H04W 4/00* | (2009.01) | |
| *H01Q 1/24* | (2006.01) | |
| *H01Q 3/26* | (2006.01) | |
| *H01Q 21/20* | (2006.01) | |
| *H04W 88/16* | (2009.01) | |
| *H04B 7/10* | (2006.01) | |

(52) U.S. Cl.
CPC .............. *H04W 4/00* (2013.01); *H04W 88/16* (2013.01); *H04B 7/10* (2013.01)

(56) References Cited

U.S. PATENT DOCUMENTS

| | | |
|---|---|---|
| D349,897 S | 8/1994 | Soren et al. |
| D373,771 S | 9/1996 | Messelhi |
| 5,579,367 A | 11/1996 | Raymond et al. |
| D376,367 S | 12/1996 | Mailandt |
| D376,600 S | 12/1996 | Vallilee et al. |
| 5,604,744 A | 2/1997 | Andersson et al. |
| 5,809,422 A | 9/1998 | Raleigh et al. |
| D401,592 S | 11/1998 | Nishimura et al. |
| 5,890,055 A | 3/1999 | Chu et al. |
| RE36,591 E | 2/2000 | Hayashi et al. |
| 6,253,060 B1 | 6/2001 | Komara et al. |
| 6,310,584 B1 | 10/2001 | Reece et al. |
| D455,420 S | 4/2002 | Arpe |
| 6,377,217 B1 | 4/2002 | Zhu et al. |
| 6,462,710 B1 | 10/2002 | Carson et al. |
| 6,463,303 B1 | 10/2002 | Zhao |
| 6,486,828 B1 | 11/2002 | Cahn et al. |
| 6,529,172 B2 | 3/2003 | Zimmerman |
| 6,912,195 B2 | 6/2005 | Vook et al. |
| D507,263 S | 7/2005 | Narita |
| 6,985,123 B2 | 1/2006 | Gottl |
| 6,995,712 B2 | 2/2006 | Boyanov |
| 7,027,837 B1 | 4/2006 | Uhlik et al. |
| 7,171,223 B2 | 1/2007 | Herscovich et al. |
| 7,221,722 B2 | 5/2007 | Thomas et al. |
| 7,260,141 B2 | 8/2007 | Bierly et al. |
| 7,280,082 B2 | 10/2007 | Theobold et al. |
| 7,292,663 B1 | 11/2007 | Van Wechel et al. |
| D565,534 S | 4/2008 | Ingalsbe et al. |
| 7,394,439 B1 | 7/2008 | Johnson et al. |
| 7,403,501 B2 | 7/2008 | Bordonaro et al. |
| D595,274 S | 6/2009 | Skottke et al. |
| D596,627 S | 7/2009 | Cho et al. |
| 7,587,177 B1 | 9/2009 | Kwong |
| 7,593,729 B2 | 9/2009 | Barak et al. |
| 7,599,290 B2 | 10/2009 | Dos Remedios et al. |
| D604,724 S | 11/2009 | Vorreiter et al. |
| 7,616,554 B2 | 11/2009 | Asai et al. |
| 7,620,370 B2 | 11/2009 | Barak et al. |
| D619,571 S | 7/2010 | Lee |
| 7,756,519 B2 | 7/2010 | Barak et al. |
| D622,256 S | 8/2010 | Lockenwitz |
| 7,848,241 B2 | 12/2010 | Natarajan et al. |
| 7,948,942 B2 | 5/2011 | Zhang et al. |
| 7,978,144 B2 | 7/2011 | Tanabe et al. |
| D643,025 S | 8/2011 | Podduturi |
| 8,078,109 B1 | 12/2011 | Mulcay |
| 8,175,535 B2 | 5/2012 | Mu |
| 8,238,318 B1 | 8/2012 | Negus |
| 8,249,527 B2 | 8/2012 | Rybicki |
| 8,300,590 B1 | 10/2012 | Negus et al. |
| 8,311,023 B1 | 11/2012 | Negus |
| 8,385,305 B1 | 2/2013 | Negus et al. |
| 8,422,540 B1 | 4/2013 | Negus et al. |
| 8,462,709 B2 | 6/2013 | Nanda et al. |
| 8,467,363 B2 | 6/2013 | Lea et al. |
| 8,487,813 B2 | 7/2013 | Leiba et al. |
| 8,638,839 B2 | 1/2014 | Negus et al. |
| 8,649,418 B1 | 2/2014 | Negus et al. |
| D704,174 S | 5/2014 | Negus et al. |
| 8,761,100 B2 | 6/2014 | Negus et al. |
| 8,811,365 B2 | 8/2014 | Negus |
| 8,824,442 B2 | 9/2014 | Lea et al. |
| 8,830,943 B2 | 9/2014 | Negus et al. |
| 8,872,715 B2 | 10/2014 | Lea et al. |
| 8,928,542 B2 | 1/2015 | Lea et al. |
| 8,942,216 B2 | 1/2015 | Negus et al. |
| 8,948,235 B2 | 2/2015 | Negus et al. |
| 9,001,809 B2 | 4/2015 | Lea et al. |
| 9,049,611 B2 | 6/2015 | Negus et al. |
| 9,055,463 B2 | 6/2015 | Negus et al. |
| 9,178,558 B2 | 11/2015 | Lea et al. |
| 9,226,295 B2 | 12/2015 | Negus et al. |
| 9,226,315 B2 | 12/2015 | Negus et al. |
| 2001/0030939 A1 | 10/2001 | Vijayan et al. |
| 2001/0035844 A1 | 11/2001 | Reece et al. |
| 2001/0050927 A1 | 12/2001 | Johnson |
| 2002/0060993 A1 | 5/2002 | Dent |
| 2002/0064141 A1 | 5/2002 | Sakakura |
| 2004/0006573 A1 | 1/2004 | Takashi |
| 2004/0137924 A1 | 7/2004 | Herscovich et al. |
| 2004/0151238 A1 | 8/2004 | Masenten |
| 2004/0165650 A1 | 8/2004 | Miyazaki et al. |
| 2005/0026616 A1 | 2/2005 | Cavalli et al. |
| 2005/0068231 A1 | 3/2005 | Regnier et al. |
| 2005/0075078 A1 | 4/2005 | Makinen et al. |
| 2005/0219140 A1 | 10/2005 | Browne et al. |
| 2006/0056365 A1 | 3/2006 | Das et al. |
| 2006/0079290 A1 | 4/2006 | Seto et al. |
| 2006/0141929 A1 | 6/2006 | Lockie et al. |
| 2006/0164271 A1 | 7/2006 | Hirt et al. |
| 2006/0209746 A1 | 9/2006 | Asai et al. |
| 2006/0253526 A1 | 11/2006 | Welch et al. |
| 2006/0273952 A1 | 12/2006 | Krikorian et al. |
| 2007/0097899 A1 | 5/2007 | Larsson et al. |
| 2007/0146225 A1 | 6/2007 | Boss et al. |
| 2007/0155431 A1 | 7/2007 | Munzner et al. |
| 2007/0243878 A1 | 10/2007 | Taira et al. |
| 2007/0264935 A1 | 11/2007 | Mohebbi |
| 2008/0014948 A1 | 1/2008 | Scheinert |
| 2008/0043882 A1 | 2/2008 | Zhang et al. |
| 2008/0080364 A1 | 4/2008 | Barak et al. |
| 2008/0090575 A1 | 4/2008 | Barak et al. |
| 2008/0159212 A1 | 7/2008 | Zhang et al. |
| 2008/0181282 A1 | 7/2008 | Wala et al. |
| 2008/0240307 A1 | 10/2008 | Wang et al. |
| 2008/0242232 A1 | 10/2008 | Zavadsky et al. |
| 2008/0274745 A1 | 11/2008 | Barak et al. |
| 2009/0010238 A1 | 1/2009 | Barak et al. |
| 2009/0052411 A1 | 2/2009 | Leung et al. |
| 2009/0067526 A1 | 3/2009 | Ratermann et al. |
| 2009/0111463 A1 | 4/2009 | Simms et al. |
| 2009/0121963 A1 | 5/2009 | Greene |
| 2009/0143017 A1 | 6/2009 | Barak et al. |
| 2009/0252134 A1 | 10/2009 | Schlicht et al. |
| 2009/0274130 A1 | 11/2009 | Boch |
| 2009/0304055 A1 | 12/2009 | Nino et al. |
| 2009/0312022 A1 | 12/2009 | Viorel et al. |
| 2009/0323621 A1 | 12/2009 | Touboul et al. |
| 2010/0009694 A1 | 1/2010 | Fischer |
| 2010/0033396 A1 | 2/2010 | Tanabe et al. |
| 2010/0046439 A1 | 2/2010 | Chen et al. |
| 2010/0056205 A1 | 3/2010 | Fuss |
| 2010/0157970 A1 | 6/2010 | Gotman et al. |
| 2010/0202391 A1 | 8/2010 | Palanki et al. |
| 2010/0261423 A1 | 10/2010 | Stanforth et al. |
| 2010/0272006 A1 | 10/2010 | Bertrand et al. |
| 2010/0309048 A1 | 12/2010 | Polisetty et al. |
| 2011/0044279 A1 | 2/2011 | Johansson et al. |
| 2011/0070855 A1 | 3/2011 | Mariotti |
| 2011/0085525 A1 | 4/2011 | Patini |
| 2011/0103292 A1 | 5/2011 | Pasad et al. |
| 2011/0164186 A1 | 7/2011 | Sadek |

(56) References Cited

U.S. PATENT DOCUMENTS

| | | |
|---|---|---|
| 2011/0182174 A1 | 7/2011 | Pi et al. |
| 2011/0206155 A1 | 8/2011 | Fujimura et al. |
| 2011/0235514 A1 | 9/2011 | Huang et al. |
| 2011/0250852 A1 | 10/2011 | Green |
| 2012/0058777 A1 | 3/2012 | Nguyen et al. |
| 2012/0063472 A1 | 3/2012 | Le Pallec et al. |
| 2012/0108284 A1 | 5/2012 | Patel et al. |
| 2012/0122477 A1 | 5/2012 | Sadek et al. |
| 2012/0135724 A1 | 5/2012 | Lewis et al. |
| 2012/0184222 A1 | 7/2012 | Seok |
| 2012/0213086 A1 | 8/2012 | Matsuura et al. |
| 2013/0044028 A1 | 2/2013 | Lea et al. |
| 2013/0089037 A1 | 4/2013 | Negus et al. |
| 2013/0089041 A1 | 4/2013 | Negus et al. |
| 2013/0089083 A1 | 4/2013 | Negus et al. |
| 2013/0095765 A1 | 4/2013 | Greene |
| 2013/0100897 A1 | 4/2013 | Negus |
| 2013/0207841 A1 | 8/2013 | Negus et al. |
| 2013/0272217 A1 | 10/2013 | Negus et al. |
| 2013/0273974 A1 | 10/2013 | Lea et al. |
| 2013/0288593 A1 | 10/2013 | Norin et al. |
| 2015/0016561 A1 | 1/2015 | Negus et al. |
| 2015/0049720 A1 | 2/2015 | Negus et al. |
| 2015/0084826 A1 | 3/2015 | Lea et al. |
| 2015/0156777 A1 | 6/2015 | Negus et al. |
| 2015/0200709 A1 | 7/2015 | Negus et al. |
| 2015/0223082 A1 | 8/2015 | Negus et al. |
| 2015/0223250 A1 | 8/2015 | Negus |
| 2015/0230105 A1 | 8/2015 | Negus et al. |
| 2016/0013831 A1 | 1/2016 | Lea et al. |
| 2016/0135192 A1 | 5/2016 | Negus |
| 2016/0192374 A1 | 6/2016 | Negus |
| 2016/0248467 A1 | 8/2016 | Lea et al. |
| 2016/0278093 A1 | 9/2016 | Negus et al. |
| 2016/0285611 A1 | 9/2016 | Fischer et al. |
| 2016/0316477 A1 | 10/2016 | Negus et al. |

FOREIGN PATENT DOCUMENTS

| | | |
|---|---|---|
| EP | 2839693 | 2/2015 |
| EP | 2843863 A1 | 3/2015 |
| WO | WO 2007/146685 | 12/2007 |
| WO | WO 2008007375 A2 | 1/2008 |
| WO | WO 2011030960 A1 | 3/2011 |
| WO | WO 2011080299 A3 | 7/2011 |
| WO | WO 2013025413 A1 | 2/2013 |
| WO | WO 2013055947 A1 | 4/2013 |
| WO | WO 2013158237 A2 | 10/2013 |
| WO | WO 2014040083 A2 | 3/2014 |

OTHER PUBLICATIONS

Notice of Allowance in U.S. Appl. No. 15/060,013, dated Jun. 9, 2016.
Office Action in U.S. Appl. No. 15/165,504, dated Aug. 11, 2016.
"AccessGate—RAN Optimization for Mobile Backhaul Systems," Product Data Sheet, Memotec, 2009, Montreal, Quebec, Canada, 2 pages.
"Advances in Backhaul Synchronization—Maximizing ROI," Application Brief, Symmetricom Inc., 2008, 6 pages.
"Carrier Ethernet Services Overview," Presentation, MEF, Aug. 2008, 32 pages.
"Clock Distribution and Synchronization over Ethernet: IEEE1588v2 and SyncE," Presentation, VITESSE, Sep. 2009, 9 pages.
"Clock Synchronization in Carrier Ethernet Networks—Synchronous Ethernet and 1588v2 on Juniper Networks MX Series 3D Universal Edge Routers," White Paper, Juniper Networks, Inc., 2010, 11 pages.
"DAN2400-PTP—Open SoC Platform for Sub-6GHz Wireless Point-to-Point Systems," DesignArt Networks, Jul. 2008, 2 pages.
"Doubling Capacity in Wireless Channels," Provigent Inc., 2008, 3 pages.
"Evolving Microwave Mobile Backhaul for Next-Generation Networks," White Paper, NEC Corp., Feb. 2008, 4 pages.
"GainSpan GS1011M Low Power Wi-Fi® Module Family," Product Brief—Preliminary, GainSpan Corp., 2009, 2 pages.
"HMC536MS8G / 536MS8GE—GaAs MMIC Positive Control T/R Switch, DC—6 GHz," Data Sheet, Switches—SMT, Hittite Microwave Corp., 2008, pp. 10.295-10.299.
"IEEE 1588v2 (Precision Time Protocol) Testing," Application Note, IXIA, Dec. 2009.
"Information Technology—Open Systems Interconnection—Basic Reference Model: The Basic Model," International Standard, ISO/IEC 7498-1, Second Edition Nov. 15, 1994, Corrected and Reprinted Jun. 15, 1996, 68 pages.
"MGA-21108—Broadband Fully Integrated Matched Low-Noise Amplifier MMIC," Data Sheet, Avago Technologies, Aug. 2009, 21 pages.
"MGA-22003—2.3-2.7 GHz 3×3mm WiMAX/WiBro and WiFi Linear Amplifier Module," Data Sheet, Avago Technologies, Mar. 2010, 15 pages.
"MGA-23003—3.3-3.8 GHz 3×3mm WiMAX Power Amplifier," Data Sheet, Avago Technologies, Mar. 2010, 16 pages.
"MGA-25203—5.1-5.9GHz 3×3mm WiFi and WiMAX Power Amplifier," Data Sheet, Avago Technologies, Mar. 2010, 14 pages.
"MGA-43328—High Linearity Wireless Data Power Amplifier for 2.5 to 2.7 GHz Applications," Application Note, Avago Technologies, Apr. 2010, 10 pages.
"MGA-43328—(2.5-2.7) GHz 29dBm High Linearity Wireless Data Power Amplifier," Data Sheet, Avago Technologies, Mar. 2010, 19 pages.
"MGA-645T6—Low Noise Amplifier with Bypass/Shutdown Mode in Low Profile Package," Data Sheet, Avago Technologies, Nov. 2009, 16 pages.
"MGA-655T6—Low Noise Amplifier with Bypass Mode in Low Profile Package," Data Sheet, Avago Technologies, Nov. 2009, 14 pages.
"MGA-675T6—Low Noise Amplifier with Shutdown Mode in Low Profile Package for 4.9—6 GHz Application," Data Sheet, Avago Technologies, Nov. 2009, 16 pages.
"Part 11: Wireless LAN Medium Access Control (MAC) and Physical Layer (PHY) Specifications—Amendment 5. Enhancements for Higher Throughput," IEEE Standard for Information Technology—Telecommunications and Information Exchange Between Systems—Local and Metropolitan Area Networks—Specific Requirements, IEEE Computer Society, IEEE Std 802.11, Sep. 2009, 536 pages.
"Part 11: Wireless LAN Medium Access Control (MAC) and Physical Layer (PHY) Specifications," IEEE Standard for Information Technology—Telecommunications and Information Exchange Between Systems—Local and Metropolitan Area Networks—Specific requirements, IEEE Computer Society, IEEE Std 802.11, Jun. 2007, 1233 pages.
"Part 16: Air Interface for Fixed and Mobile Broadband Wireless Access Systems—Amendment 2: Physical and Medium Access Control Layers for Combined Fixed and Mobile Operation in Licensed Bands and Corrigendum 1," IEEE Standard for Local and Metropolitan Area Networks, IEEE Computer Society and the IEEE Microwave Theory and Techniques Society, IEEE Std 802.16e—2005 and IEEE Std 802.16-2004/Cor1-2005, Feb. 2006, 864 pages.
"Part 16: Air Interface for Fixed Broadband Wireless Access Systems," IEEE Standard for Local and Metropolitan Area Networks, IEEE Std 802.16, IEEE Computer Society and the IEEE Microwave Theory and Techniques Society, Oct. 2004, 895 pages.
"PC203-PC203-10—Basestation PHY Processor," Wireless Communications Processors, Product Brief, picoChip Flexible Wireless, 2008, 4 pages.
"SC-FDMA—Single Carrier FDMA in LTE," Data Sheet, IXIA Corp., Nov. 2009, 16 pages.
"Spectrum Sharing: The Promise and the Reality", RYSAVY Research, LLC, White Paper, Jul. 2012, pp. 1-12, available at http://www.rysavy.com.
"Technical Report: Electromagenetic Compatibility and Radio Spectrum Matters (ERM); System Reference Document (SRdoc); Mobile Broadband Services in the 2 300 MHz-2 400 MHz fre-

(56) References Cited

OTHER PUBLICATIONS quency band under Licensed Shared Access Regime", ETSI TR 103 113 V1.1.1 (Jul. 2013), European Telecommunications Standards Institute, France, 2013, pp. 1-37.
"Understanding MPLS-TP and Its Benefits," White Paper, Cisco Systems Inc., 2009, 6 pages.
"Unified Mobile Backhaul," DesignArt Networks, Jan. 26, 2011, 8 pages.
"WiMAX/WiBro RF MxFE Transceiver, AD9352," Data Sheet, Analog Devices, 2007.
"WiMAX RF MxFE Transceiver, AD9352-5," Data Sheet, Analog Devices, 2008.
"WiMAX RF MxFE Transceiver, AD9353," Data Sheet, Analog Devices, 2007.
"WiMAX/WiBro RF MxFE MISO Transceiver, AD9354," Data Sheet, Analog Devices, 2008-2009.
"WiMAX/WiBro RF MxFE MISO Transceiver, AD9355," Data Sheet, Analog Devices, 2008-2009.
"WiMAX/BWA/WiBRO/LTE RF MxFE 2×2 MIMO Transceiver, AD9356," Data Sheet, Analog Devices, 2010.
"WiMAX/BWA/LTE RF MxFE 2×2 MIMO Transceiver, AD9357," Data Sheet, Analog Devices, 2010.
Baum, D.S. et al., "An Interim Channel Model for Beyond-3G Systems—Extending the 3GPP Spatial Channel Model (SCM)," IEEE, Vehicular Technology Conference, vol. 5, 2005, pp. 3132-3136.
Beller, D. et al., "MPLS-TP—The New Technology for Packet Transport Networks," Alcatel-Lucent Deutschland AG, Stuttgart, 2009, 11 pages.
Chundury, R., "Mobile Broadband Backhaul: Addressing the Challenge," Planning Backhaul Networks, Ericsson Review, 2008, pp. 4-9.
Conrat, J-M. et al., "Typical MIMO Propagation Channels in Urban Macrocells at 2 GHz," EURASIP Journal on Wireless Communications and Networking, vol. 2007, Iss. 2, Jan. 2007, 9 pages.
Coon, J.P. et al., "Adaptive Frequency-Domain Equalization for Single-Carrier Multiple-Input Multiple-Output Wireless Transmissions," IEEE Transactions on Signal Processing, vol. 53, No. 8, Aug. 2005, pp. 3247-3256.
Coon, J.P. et al., "An Investigation of MIMO Single-Carrier Frequency-Domain MMSE Equalization," Centre for Communications Research, University of Bristol, Sep. 2002, 4 pages.
Durgin, G.D., "Wideband Measurements of Angle and Delay Dispersion for Outdoor and Indoor Peer-to-Peer Radio Channels at 1920 MHz," IEEE Transactions on Antennas and Propagation, vol. 51, No. 5, May 2003, pp. 936-944.
Falconer, D.D. et al., "Broadband Wireless Using Single Carrier and Frequency Domain Equalization," Invited Overview Paper for WPMC '02, Honolulu, Oct. 2002, 10 pages.
Falconer, D.D. et al., "Frequency Domain Equalization for Single-Carrier Broadband Wireless Systems," Wideband Wireless Access Technologies to Broadband Internet, IEEE Communications Magazine, Apr. 2002, pp. 58-66.
Frost, D. et al., "MPLS Transport Profile Data Plane Architecture," Internet Engineering Task Force, RFC 5960, Aug. 2010, 16 pages.
Gao, S.C. et al., "Dual-polarized slot coupled planar antenna with wide bandwidth," IEEE Trans. Antennas and Propagation, vol. 51, No. 3, pp. 441-448, 2003.
Garner, G.M., "IEEE 1588 Version 2," ISPCS Ann Arbor '08, Sep. 2008, 89 pages.
Hentschel, T. et al., "The Digital Front-End—Bridge Between RF and Baseband-Processing," Software Defined Radio: Enabling Technologies by Walter Tuttlebee, Chapter 6, Jun. 2002, 58 pages.
Lashkarian, N., "Reconfigurable Digital Front-end Architecture for Wireless Base-Station Transmitters: Analysis, Design and FPGA Implementation," Seminar Presentation, University of California, Berkeley, Apr. 2006, 86 pages.
Nathanzon, G. et al., "Cost-Effective Backhaul Alternatives for WiMAX Networks. Challenges & Solutions," Provigent Inc., Jun. 2008, 16 pages.

Padhi, S.K. et al., "A Dual Polarized Aperture Coupled Circular Patch Antenna Using a C-Shaped Coupling Slot," IEEE Transactions on Antennas and Propagation, vol. 51, No. 12, Dec. 2003, pp. 3295-3298.
Pancaldi, F. et al., "Single-Carrier Frequency Domain Equalization—A Focus on Wireless Applications," IEEE Signal Processing Magazine, Sep. 2008, 22 pages.
Pozar, D.M. et al., "Improved coupling for aperature-coupled microstrip antennas," Electron. Lett., vol. 27, No. 13, pp. 1129-1131, 1991.
Pozar, D.M., "A microstrip antenna aperature-coupled to a microstripline," Electron. Lett., vol. 21, No. 2, pp. 49-50, 1985.
Sharony, J., "Introduction to Wireless MIMO—Theory and Applications," CEWIT—Center of Excellence in Wireless and Informational Technology, Stony Brook University, IEEE LI, Nov. 15, 2006, 63 pages.
Soffer, R., "Microwave Wireless Backhaul for LTE Networks—Meeting the Rapidly-Increasing Demand for Mobile Data," Provigent Inc., Jan. 2010, 18 pages.
Soffer, R., "ProviBand—Next Generation Wireless Backhaul Technology," Technical White Paper, Provigent Inc., Jan. 2006, 13 pages.
Stuber, G.L. et al., "Broadband MIMO-OFDM Wireless Communications," Invited Paper, Proceedings of the IEEE, vol. 92, No. 2, Feb. 2004, pp. 271-294.
Tubbax, J., "OFDM Versus Single Carrier with Cyclic Prefix: A System-based Comparison for Binary Modulation," IMEC, Belgium, Jan. 2011, 4 pages.
"TV Whitespaces" reuse: A detailed description of the program is provided in FCC order FCC-10-174A1, and the rules for unlicensed devices that operate in the TV bands are set forth in 47 C.P.R. §§ 15.701-.717. See Title 47—Telecommunication; Chapter I—Federal Communications Commission; Subchapter A—General, Part 15—Radio Frequency Devices, Subpart H—Television Band Devices: (Available online at http://www.ecfr.gov/cgi-bin/text-idx?c=ecfr&SID=30f46f0753577b10de41d650c7adf941&rgn=div6 &view=text&node=47: 1.0.1.1.16.8&idno=47:1.0.1.1.16.8 &idno=47, retrieved Feb. 25, 2015).
Notice of Allowance in U.S. Appl. No. 13/212,036, dated Apr. 3, 2012.
Office Action in U.S. Appl. No. 13/271,051, dated Jun. 14, 2013.
Amendment and Response to Office Action in U.S. Appl. No. 13/271,051, filed Dec. 16, 2013.
Notice of Allowance in U.S. Appl. No. 13/271,051, dated Feb. 3, 2014.
Office Action in U.S. Appl. No. 13/371,346, dated Sep. 26, 2012.
Amendment and Response to Office Action in U.S. Appl. No. 13/371,346, filed Dec. 21, 2012.
Applicant Initiated Interview Summary in U.S. Appl. No. 13/371,346, filed Jan. 10, 2013.
Supplemental Amendment and Response to Office Action in U.S. Appl. No. 13/371,346, filed Jan. 25, 2013.
Notice of Allowance in U.S. Appl. No. 13/371,346, dated Apr. 2, 2013.
Office Action in U.S. Appl. No. 13/371,366, dated Apr. 19, 2012.
Amendment and Response to Office Action in U.S. Appl. No. 13/371,366, dated Jul. 19, 2012.
Notice of Allowance in U.S. Appl. No. 13/371,366, dated Sep. 21, 2012.
Office Action in U.S. Appl. No. 13/415,778, mailed Apr. 26, 2012.
Applicant Initiated Interview Summary in U.S. Appl. No. 13/415,778, filed Jul. 5, 2012.
Amendment and Response to Office Action in U.S. Appl. No. 13/415,778, dated Jul. 26, 2012.
Notice of Allowance in U.S. Appl. No. 13/415,778, mailed Sep. 17, 2012.
Office Action in U.S. Appl. No. 13/448,294, dated on Jun. 21, 2012.
Notice of Allowance in U.S. Appl. No. 13/448,294, dated Oct. 23, 2012.
Notice of Allowance in U.S. Appl. No. 13/536,927, dated Feb. 19, 2013.
Notice of Allowance in U.S. Appl. No. 29/429,634 dated Dec. 5, 2013.
Office Action in U.S. Appl. No. 13/632,961, dated May 6, 2014.

(56) References Cited

OTHER PUBLICATIONS

Office Action in U.S. Appl. No. 13/632,993, dated Jan. 30, 2015.
Amendment and Response to Office Action in U.S. Appl. No. 13/632,993, dated Jul. 27, 2015.
Notice of Allowance in U.S. Appl. No. 13/632,993, dated Aug. 21, 2015.
Notice of Allowance in U.S. Appl. No. 13/633,028, dated May 1, 2014.
Office Action in U.S. Appl. No. 13/645,472, dated May 24, 2013.
Amendment and Response to Office Action in U.S. Appl. No. 13/645,472, dated Nov. 25, 2013.
Supplemental Amendment and Response to Office Action in U.S. Appl. No. 13/645,472, dated Jan. 27, 2014.
Notice of Allowance in U.S. Appl. No. 13/645,472, dated Apr. 4, 2014.
Notice of Allowance in U.S. Appl. No. 13/748,544, dated Aug. 15, 2014.
Notice of Allowance in U.S. Appl. No. 13/898,429, dated Apr. 8, 2014.
Notice of Allowance in U.S. Appl. No. 14/197,158, dated Sep. 3, 2014.
Examiner Initiated Interview Summary in U.S. Appl. No. 14/197,158, filed Sep. 3, 2014.
Partial European Search Report in European Patent Application No. 12839752.8, dated Jun. 16, 2015.
Examiner Initiated Interview Summary in U.S. Appl. No. 14/199,734, dated Jun. 13, 2014.
Notice of Allowance in U.S. Appl. No. 14/199,734, dated Jun. 13, 2014.
Notice of Allowance in U.S. Appl. No. 14/336,958, dated Nov. 26, 2014.
Preliminary Amendment and Response in U.S. Appl. No. 14/337,744, dated Aug. 20, 2014.
Applicant Response and Amendment in U.S. Appl. No. 14/337,744, dated Oct. 6, 2014.
Notice of Allowance in U.S. Appl. No. 14/337,744, dated Jan. 12, 2015.
Office Action in U.S. Appl. No. 14/502,471, dated Jan. 5, 2015.
Applicant Response and Amendment in U.S. Appl. No. 14/502,471, dated Jul. 2, 2015.
Office Action in U.S. Appl. No. 14/502,471, dated Jul. 22, 2015.
Notice of Allowance in U.S. Appl. No. 14/498,959, dated Jan. 12, 2015.
Office Action in U.S. Appl. No. 14/552,431, dated Mar. 12, 2015.
Office Action in U.S. Appl. No. 14/552,431, dated Jul. 14, 2015.
Applicant Response and Amendment in U.S. Appl. No. 14/552,431, dated Aug. 10, 2015.
Notice of Allowance in U.S. Appl. No. 14/552,431, dated Aug. 19, 2015.
Notice of Allowance in U.S. Appl. No. 14/632,624, dated May 26, 2015.
Office Action in U.S. Appl. No. 14/686,674, dated Jul. 23, 2015.
Amendment and Response to Office Action in U.S. Appl. No. 14/686,674, dated Aug. 31, 2015.
Notice of Allowance in U.S. Appl. No. 14/686,674, dated Oct. 5, 2015.
Office Action in U.S. Appl. No. 14/688,550, dated Jul. 29, 2015.
Amendment and Response to Office Action in U.S. Appl. No. 14/688,550, dated Oct. 29, 2015.
Notice of Allowance in U.S. Appl. No. 14/688,550, dated Dec. 4, 2015.
Notice of Allowance in U.S. Appl. No. 14/837,797, dated Dec. 30, 2015.
Notice of Allowance in U.S. Appl. No. 14/950,354, dated Feb. 17, 2016.
International Search Report and Written Opinion for PCT Application No. PCT/US2012/049948 dated Oct. 22, 2012.
International Search Report and Written Opinion for PCT Application No. PCT/US2012/059797 dated Jan. 2, 2013.
International Search Report and Written Opinion for PCT Application No. PCT/US2013/029731 dated May 13, 2013.
International Search Report and Written Opinion in PCT Application No. PCT/US013/48782, dated Jul. 29, 2013.
Extended European Search Report in European Patent Application No. 12824072.8, dated Jul. 15, 2015.
Extended European Search Report in European Patent Application No. 14177662.5, dated Feb. 3, 2015.
Notice of Allowance in U.S. Appl. No. 15/142,793, dated Oct. 11, 2016.
Notice of Allowance in U.S. Appl. No. 15/165,504, dated Sep. 30, 2016.
Notice of Allowance in U.S. Appl. No. 15/203,658, dated Oct. 7, 2016.

Code of Federal Regulations Title 47: Telecommunication
PART 101–FIXED MICROWAVE SERVICES
Subpart C–Technical Standards §101.101 Frequency available

| Frequency band (Mhz) | Common carrier (Part 101) | Private radio (Part 101) | Broadcast auxiliary (Part 74) | Other (Parts 15, 21, 22, 24, 25, 74, 78, & 100) | Notes |
|---|---|---|---|---|---|
| 928-929 | MAS | MAS | | PRS | |
| 932.0-932.5 | MAS | MAS | | PRS | |
| 932.5-935.0 | CC | OFS | | | (1) |
| 941.0-941.5 | MAS | MAS | | PRS | |
| 941.5-944.0 | CC | OFS | Aural BAS | | (1) |
| 944.0 | | | | | |
| 952-958 | | OFS/MAS | | PRS | |
| 958-960 | MAS | OFS | | | |
| 1850-1990 | | OFS | | PCS | |
| 2110-2130 | CC | | | PET | |
| 2130-2150 | | OFS | | PET | |
| 2160-2180 | CC | | | ET | |
| 2180-2200 | | OFS | | PET | |
| 2450-2500 | CC | OFS | TV BAS | ISM | F/M/TF |
| 2650-2690 | CC LTTS | OFS | | MDS/LTTS | |
| 3700-4200 | CC LTTS | OFS | | SAT | |
| 5925-6425 | CC LTTS | OFS | | SAT | |
| 6425-6525 | LTTS | OFS | TV BAS | CARS | M |
| 6525-6875 | CC | OFS | | | |
| 6875-7125 | CC | OFS | TV BAS | CARS | |
| 10,550-10,680 | CC | OFS DEMS | | | |
| 10,700-11,700 | CC | OFS | | SAT | |

1305

Radio service

BAS: Broadcast Auxiliary Service–(Part 74)
CARS: Cable Television Relay Service–(Part 78)
CC: Conanon Carrier Fixed Point-to-Point Microwave Service–(Part 101, Subparts C & 1)
DBS: Direct Broadcast Satellite–(Part 100)
DEMS: Digital Electronic Message Seervice–(Part 101, Subpart G)
ISM: Industrial, Scientific & Medical–(Part 18)
ITFS: Instructional Television Fixed Service–(Part 74)
LTTS: Local Television Transmission Service–(Part 101, Subpart J)
MAS: Multiple Address System–)Part 101)
MDS: Multipoint Distribution Service–(Part 21)
OFS: Private Operational Fixed Point-to-Point Microwave Service–(Part 101, Subparts C & H)
PCS: Personal Communications Service–(Part 24)
PET: Emerging Technologies (per ET Dkt No. 92-9, not yet assigned)
PRS: Paging and Radiotelephone Service–(Part 22, Subpart E)
ST: Fixed Satellite Service–(Part 25)

Notes:
F–Fixed
M–Mobile
TF–Temporary Fixed

FIG. 13A

Partial listing of permissible frequencies of operation for fixed point-to-point microwave operation

METHOD FOR INSTALLING A BACKHAUL LINK WITH MULTIPLE ANTENNA PATTERNS

CROSS-REFERENCE TO RELATED APPLICATION

This application is a Continuation application of U.S. application Ser. No. 14/839,018 filed Aug. 28, 2015, which is a Continuation application of U.S. application Ser. No. 13/934,175, filed on Jul. 2, 2013 (now U.S. Pat. No. 9,179,240), which application is a Continuation application of U.S. application Ser. No. 13/371,346, filed on Feb. 10, 2012 (U.S. Pat. No. 8,502,733), the disclosures of which are hereby incorporated herein by reference in their entireties.

The present application is also related to U.S. patent application Ser. No. 13/212,036 filed Aug. 17, 2011 (now U.S. Pat. No. 8,238,318), U.S. patent application Ser. No. 13/371,366 filed Feb. 10, 2012 (now U.S. Pat. No. 8,311,023), U.S. patent application Ser. No. 13/645,472, filed Oct. 4, 2012 (now U.S. Pat. No. 8,811,365), U.S. patent application Ser. No. 14/197,158, filed Mar. 4, 2014 (now U.S. Pat. No. 8,928,542), U.S. patent application Ser. No. 14/199,734, filed Mar. 6, 2014 (now U.S. Pat. No. 8,872,715), U.S. patent application Ser. No. 14/559,859, filed Dec. 3, 2014, U.S. Provisional Patent Application No. 61/857,661, filed Jul. 23, 2013, U.S. patent application Ser. No. 14/151,190, filed Jan. 9, 2014 (now U.S. Pat. No. 8,982,772), U.S. patent application Ser. No. 14/608,024, filed Jan. 28, 2015, U.S. patent application Ser. No. 15/050,009, filed Feb. 22, 2016, U.S. Provisional Patent Application Ser. No. 62/130,100, filed Mar. 9, 2015, U.S. Provisional Patent Application Ser. No. 62/135,573, filed Mar. 19, 2015, U.S. patent application Ser. No. 14/337,744, filed Jul. 22, 2014 (now U.S. Pat. No. 9,055,463), U.S. Provisional Patent Application Ser. No. 61/910,194, filed Nov. 29, 2013, U.S. patent application Ser. No. 14/498,959, filed Sep. 26, 2014 (now U.S. Pat. No. 9,049,611), U.S. patent application Ser. No. 14/688,550, filed Apr. 16, 2015, U.S. patent application Ser. No. 15/060,013, filed Mar. 3, 2016, U.S. patent application Ser. No. 14/686,674, filed Apr. 14, 2015 (now U.S. Pat. No. 9,282,560), U.S. patent application Ser. No. 14/988,578, filed Jan. 5, 2016, U.S. patent application Ser. No. 14/098,456, filed Dec. 5, 2013 (now U.S. Pat. No. 8,989,762), U.S. patent application Ser. No. 14/502,471, filed Sep. 30, 2014, U.S. patent application Ser. No. 14/624,365, filed Feb. 17, 2015, U.S. patent application Ser. No. 14/666,294, filed Mar. 23, 2015, U.S. patent application Ser. No. 13/536,927, filed Jun. 28, 2012 (now U.S. Pat. No. 8,467,363), U.S. patent application Ser. No. 13/898,429, filed May 20, 2013 (now U.S. Pat. No. 8,824,442), U.S. patent application Ser. No. 14/336,958, filed Jul. 21, 2014 (now U.S. Pat. No. 9,001,809), U.S. patent application Ser. No. 14/632,624, filed Feb. 26, 2015 (now U.S. Pat. No. 9,178,558), and U.S. patent application Ser. No. 14/837,797, filed Aug. 26, 2015, the disclosures of which are hereby incorporated herein by reference in their entireties.

BACKGROUND

1. Field

The present disclosure relates generally to data networking and in particular to a backhaul system for co-channel deployment with existing licensed and unlicensed wireless networks, and to processing and network elements to manage and control the deployment and management of backhaul radios that connect remote edge access networks to core networks in a geographic zone which co-exist with the existing wireless networks.

2. Related Art

Data networking traffic has grown at approximately 100% per year for over 20 years and continues to grow at this pace. Only transport over optical fiber has shown the ability to keep pace with this ever-increasing data networking demand for core data networks. While deployment of optical fiber to an edge of the core data network would be advantageous from a network performance perspective, it is often impractical to connect all high bandwidth data networking points with optical fiber at all times. Instead, connections to remote edge access networks from core networks are often achieved with wireless radio, wireless infrared, and/or copper wireline technologies.

Radio, especially in the form of cellular or wireless local area network (WLAN) technologies, is particularly advantageous for supporting mobility of data networking devices. However, cellular base stations or WLAN access points inevitably become very high data bandwidth demand points that require continuous connectivity to an optical fiber core network.

When data aggregation points, such as cellular base station sites, WLAN access points, or other local area network (LAN) gateways, cannot be directly connected to a core optical fiber network, then an alternative connection, using, for example, wireless radio or copper wireline technologies, must be used. Such connections are commonly referred to as "backhaul."

Many cellular base stations deployed to date have used copper wireline backhaul technologies such as T1, E1, DSL, etc. when optical fiber is not available at a given site. However, the recent generations of HSPA+ and LTE cellular base stations have backhaul requirements of 100 Mb/s or more, especially when multiple sectors and/or multiple mobile network operators per cell site are considered. WLAN access points commonly have similar data backhaul requirements. These backhaul requirements cannot be practically satisfied at ranges of 300 m or more by existing copper wireline technologies. Even if LAN technologies such as Ethernet over multiple dedicated twisted pair wiring or hybrid fiber/coax technologies such as cable modems are considered, it is impractical to backhaul at such data rates at these ranges (or at least without adding intermediate repeater equipment). Moreover, to the extent that such special wiring (i.e., CAT 5/6 or coax) is not presently available at a remote edge access network location; a new high capacity optical fiber is advantageously installed instead of a new copper connection.

Rather than incur the large initial expense and time delay associated with bringing optical fiber to every new location, it has been common to backhaul cell sites, WLAN hotspots, or LAN gateways from offices, campuses, etc. using microwave radios. An exemplary backhaul connection using the microwave radios 132 is shown in FIG. 1. Traditionally, such microwave radios 132 for backhaul have been mounted on high towers 112 (or high rooftops of multi-story buildings) as shown in FIG. 1, such that each microwave radio 132 has an unobstructed line of sight (LOS) 136 to the other. These microwave radios 132 can have data rates of 100 Mb/s or higher at unobstructed LOS ranges of 300 m or longer with latencies of 5 ms or less (to minimize overall network latency).

Traditional microwave backhaul radios 132 operate in a Point to Point (PTP) configuration using a single "high gain" (typically >30 dBi or even >40 dBi) antenna at each end of the link 136, such as, for example, antennas constructed using a parabolic dish. Such high gain antennas mitigate the effects of unwanted multipath self-interference or unwanted co-channel interference from other radio systems such that high data rates, long range and low latency can be achieved. These high gain antennas however have narrow radiation patterns.

Furthermore, high gain antennas in traditional microwave backhaul radios 132 require very precise, and usually manual, physical alignment of their narrow radiation patterns in order to achieve such high performance results. Such alignment is almost impossible to maintain over extended periods of time unless the two radios have a clear unobstructed line of sight (LOS) between them over the entire range of separation. Furthermore, such precise alignment makes it impractical for any one such microwave backhaul radio to communicate effectively with multiple other radios simultaneously (i.e., a "point to multipoint" (PMP) configuration).

In wireless edge access applications, such as cellular or WLAN, advanced protocols, modulation, encoding and spatial processing across multiple radio antennas have enabled increased data rates and ranges for numerous simultaneous users compared to analogous systems deployed 5 or 10 years ago for obstructed LOS propagation environments where multi path and co-channel interference were present. In such systems, "low gain" (usually <6 dBi) antennas are generally used at one or both ends of the radio link both to advantageously exploit multipath signals in the obstructed LOS environment and allow operation in different physical orientations as would be encountered with mobile devices. Although impressive performance results have been achieved for edge access, such results are generally inadequate for emerging backhaul requirements of data rates of 100 Mb/s or higher, ranges of 300 m or longer in obstructed LOS conditions, and latencies of 5 ms or less.

In particular, "street level" deployment of cellular base stations, WLAN access points or LAN gateways (e.g., deployment at street lamps, traffic lights, sides or rooftops of single or low-multiple story buildings) suffers from problems because there are significant obstructions for LOS in urban environments (e.g., tall buildings, or any environments where tall trees or uneven topography are present).

FIG. 1 illustrates edge access using conventional unobstructed LOS PTP microwave radios 132. The scenario depicted in FIG. 1 is common for many $2^{nd}$ Generation (2G) and $3^{rd}$ Generation (3G) cellular network deployments using "macrocells". In FIG. 1, a Cellular Base Transceiver Station (BTS) 104 is shown housed within a small building 108 adjacent to a large tower 112. The cellular antennas 116 that communicate with various cellular subscriber devices 120 are mounted on the towers 112. The PTP microwave radios 132 are mounted on the towers 112 and are connected to the BTSs 104 via an nT1 interface. As shown in FIG. 1 by line 136, the radios 132 require unobstructed LOS.

The BTS on the right 104*a* has either an nT1 copper interface or an optical fiber interface 124 to connect the BTS 104*a* to the Base Station Controller (BSC) 128. The BSC 128 either is part of or communicates with the core network of the cellular network operator. The BTS on the left 104*b* is identical to the BTS on the right 104*a* in FIG. 1 except that the BTS on the left 104*b* has no local wireline nT1 (or optical fiber equivalent) so the nT1 interface is instead connected to a conventional PTP microwave radio 132 with unobstructed LOS to the tower on the right 112*a*. The nT1 interfaces for both BTSs 104*a*, 104*b* can then be backhauled to the BSC 128 as shown in FIG. 1.

As described above, conventional microwave backhaul radios have used "high gain" (typically >30 dBi or even >40 dBi) to achieve desired combinations of high throughput, long range and low latency in bridging remote data networks to core networks for unobstructed line of sight (LOS) propagation conditions. Because of their very narrow antenna radiation patterns and manual alignment requirements, these conventional microwave backhaul radios are completely unsuitable for applications with remote data network backhaul in obstructed LOS conditions, such as deployment on street lamps, traffic lights, low building sides or rooftops, or any fixture where trees, buildings, hills, etc., which substantially impede radio propagation from one point to another.

Additionally, such conventional microwave backhaul radios typically have little or no mechanism for avoiding unwanted interference from other radio devices at the same channel frequency (other than the narrowness of their radiation patterns). Thus, users of such equipment are often skeptical of deployment of such conventional backhaul radios for critical applications in unlicensed spectrum bands. Even for common licensed band deployments, such as under the United States Federal Communications Commission (FCC) 47 C.F.R. §101 rules, conventional backhaul radios are typically restricted to a particular channel frequency, channel bandwidth and location placement based on a manual registration process carried out for each installation. This is slow, inefficient, and error prone as well as wasteful of spectrum resources due to underutilization, even with the undesirable restriction of unobstructed LOS conditions.

Furthermore, once deployed in the field, conventional microwave backhaul radios are typically islands of connectivity with little or no capability to monitor the spectrum usage broadly at the deployment location or coordinate with other radios in the vicinity to optimally use spectrum resources.

FIG. 2 illustrates an exemplary deployment of multiple conventional backhaul radios (CBRs) 132 as discrete point to point (PTP) links 204 to bridge remote data access networks (ANs) 208 to a private core network (PCN) 212. Each link 204 requires unobstructed LOS propagation and is limited to a single PTP radio configuration. To the extent that multiple links originate from a common location, the CBRs 132 at such location require spatial and directional separation if co-channel operation is used.

Typically, the operator of the PCN 212 will use an element management system (EMS) 216 specific to particular CBRs 132 to monitor deployed and configured CBR links within the PCN 212. Often, an EMS 216 allows fault monitoring, configuration, accounting, performance monitoring and security key management (FCAPS) for the CBRs 132 within the PCN 212. However, such a conventional EMS 216 does not dynamically modify operational policies or configurations at each CBR 132 in response to mutual interactions, changing network loads, or changes in the radio spectrum environment in the vicinity of the deployed CBRs 132. Furthermore, such an EMS 216 is typically isolated from communications with or coordination amongst other EMSs at other PCNs (not shown) that may be overlapping geographically from a radio spectrum perspective.

As a result of the foregoing deficiencies with conventional backhaul radios and conventional approaches to obstructed line of sight systems, there exists no practical approach to the deployment, monitoring and operation of obstructed non-line of sight systems in the presence of unlicensed or licensed conventional backhaul radios or other licensed services according to 47 Code of Federal Regulations (C.F.R.) §101 within the same operational bands. Exemplary 47 C.F.R. §101 systems include Common Carrier Fixed Point to Point Microwave Service and Private Operational Fixed Point-to-Point Microwave Service and associated bands as described, for example, in 47 C.F.R. §101.101. Further, such deficiencies prevent the rapid deployment of new backhaul radios configured for co-channel operation with these systems, including conventional backhaul radio networks and other 47 C.F.R. §101 systems.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

In copending U.S. patent application Ser. No. 13/212,036, entitled Intelligent Backhaul Radio, filed Aug. 17, 2011, the entirety of which is hereby incorporated by reference, the present inventor disclosed backhaul radios that are compact, light and low power for street level mounting, operate at 100 Mb/s or higher at ranges of 300 m or longer in obstructed LOS conditions with low latencies of 5 ms or less, can support PTP and PMP topologies, use radio spectrum resources efficiently and do not require precise physical antenna alignment. Radios with such exemplary capabilities are referred to as Intelligent Backhaul Radios (IBRs).

These IBRs overcome the limitation of obstructed LOS operation and enable many desirable capabilities such as, for example only, monitoring of spectrum activity in the vicinity of the deployment and actively avoiding or mitigating co-channel interference. To fully utilize these and other capabilities of the IBRs, it is advantageous to manage and control multiple IBRs within a geographic zone collectively as an "Intelligent Backhaul System" (or IBS).

In co-pending U.S. patent application Ser. No. 13/271, 051, entitled Intelligent Backhaul System, filed Oct. 11, 2011, the entirety of which is hereby incorporated by reference, the present inventor disclosed an intelligent backhaul system (IBS) that includes a plurality of intelligent backhaul radios and a server in communication with an intelligent backhaul management system agent within at least one of the plurality of intelligent backhaul radios. The server is configured to manage or control at least one of the plurality of intelligent backhaul radios.

The IBRs and the IBS can be utilized to aid in the determination, deployment and management of IBR operational parameters in the same bands of operation as existing CBRs or other radios to which or from which interference is undesirable or forbidden (e.g., within specific 47 C.F.R. §101 licensed bands). In some embodiments, such deployment may include co-channel operation with CBRs or other systems including particularly within specific 47 C.F.R. §101 licensed bands systems, such as Common Carrier Fixed Point to Point Microwave Service and Private Operational Fixed Point-to-Point Microwave Service and associated bands.

Information stored within or obtained by the IBS or other network elements can be used to determine or aid in the determination of IBR operational parameters that allow co-band or co-channel operation with manageable interference impact to and from CBRs or other services within a geographic zone, or within a known radio frequency propagation distance.

Exemplary IBR operational parameters include but are not limited to: the selection operational frequencies; the modification of transmitter antenna patterns; the modifying or selection of antenna polarization or spatial patterns; the selection of specific antennas from a set of available antennas; the selection of transmission nulls reducing the interference impinging upon other systems; the selection of receive or transmission digital beam forming weights, or algorithmic beam forming constraints; the physical movement, placement, alignment, or augmentation of one or more antenna elements, or antenna arrays by electrical, or electromechanical control or by a request for manual adjustment or augmentation during or after installation; and the modification of transmission power; and the selection of interference margin values for the reduction of the risk in interfering existing systems.

In one embodiment, the determination of the IBR operational parameters is performed utilizing an algorithm based at least in part on known CBR locations and radiation parameters that are stored, for example, in the Universal Licensing System (ULS) operated by the Federal Communications Commission (FCC), or in other public or private databases.

In one embodiment, ULS information and associated radiation parameters, in combination with radio frequency propagation models are utilized to determine the level to which operation of an IBR under various IBR operational parameters would interfere with one or more licensed 47 C.F.R. §101 services, including Common Carrier Fixed Point to Point Microwave Service and Private Operational Fixed Point-to-Point Microwave Service within designated bands.

In one embodiment, reports of received signals are provided by the IBRs, optionally in combination with existing IBR operational parameters, to the Intelligent Backhaul Radio Management System (IBMS) for use in IBR operational parameter determination. Such reports may be stored by the IBMS and used alone or in combination with CBR radiation parameter information from public or private databases to perform IBR operational parameter selection.

Further embodiments may include an iterative method. For example, the IBRs may report received spectral measurements and configuration parameters to the IBMS, which performs selection of some or all for the operation parameters, and passes said parameters to respective IBRs. The IBRs may then perform additional or refined scanning, or initial operation, prior to the determination of the IBR operational parameters.

In one embodiment, a remote end IBR (RE-IBR) is configured to operate with an aggregation end IBR (AE-IBR) on one or more frequency channels which are co-channel with a time division duplexed (TDD) CBR. In this embodiment, the AE-IBR has a wired Ethernet connection to the IMBS. The RE-IBR connects to the IBMS utilizing an out of band data link in the form of a cellular data link during configuration, which may be a mobile phone having a Wi-Fi connection to the RE-IBR (i.e., the phone is acting as a mobile hot spot) or utilizing a Wi-Fi direct connection. Upon initiating the configuration process, the respective IBRs perform a scan of their receive channels to detect existing CBRs. The IBRs then report their respective antenna configurations and scan results to the IBMS. The IMBS, in one embodiment, determines, assuming another channel may not be used, the level of interference the CBR will receive. The interference is determined utilizing IBR effective antenna pattern adjustments and, optionally, associated information retrieved from a database of CBR parameters. In one embodiment, the effective antenna pattern adjustment includes the use of a transmission beam nulling from the required one or more IBRs to further reduce the interference levels which may be received at the CBR, while maintaining a minimum required performance between the respective IBRs. In some embodiments, an interference margin is calculated. The interference margin can used as an additional reduction of the required interference to the target CBR. The interference margin may be based on a fixed amount, a level of uncertainty of the predicted interference, an amount based upon the reliability or predicted accuracy of interference calculations, or based upon using or the availability of or specific values of CBR antenna and operating transmission parameters retrieved from a database.

In some embodiments, the RE-IBRs and AE-IBRs may operate on channels for which no interference is detected, but are within a predetermined distance of a CBR. The distance may be determined based on the geographic location of each IBR and the CBR (e.g., the location of the CBR determined by accessing the FCC ULS database). In such situations, an interference margin value, or other operational constraint value, may be utilized by the IBMS based upon propagation models to further reduce the likelihood of interfering with the CBR.

In some embodiments, co-existence of IBRs with FDD (frequency division duplex) CBRs may be required. In these embodiments, interference margins or operational transmission constraints may be calculated. An exemplary constraint is transmission beam nulling. In this example, during a scan procedure, the values related to transmission beam nulling may be determined.

In some embodiments, received signals transmitted from a CBR operating in FDD are detected during a scan procedure at an IBR. However, the IBR to IBR link, in one deployment, is configured to operate on the specific FDD paired frequency channel used for receiving by the FDD CBR as determined by the IMBS and FCC database records. In this embodiment, transmission beam nulling weights or constraints may be determined based upon the received signals in the paired channel, despite the frequency difference for the transmission channel. Such calculations may utilize propagation modeling to determine interference levels, reported measurements by the IBR to determine the level of frequency flat fading, and database values related to CBR parameters. These calculations involve a constrained transmission beam forming calculation. For example, an interference margin may be included based at least in part upon the determined level of flat fading of the scanned signal on the paired band.

It will be appreciated that many of the processes and/or process steps described above may be performed by the IBMS. It will also be appreciated that these processes and/or process steps may be performed by one or more servers or processing nodes operating within the IBMS, on behalf of the IBMS, or otherwise in association with the IBMS to accomplish the processes or steps, including, for example, IBRs, IBCs, mobile IBR configuration devices, smart phones, tables, and cloud computing resources.

According to one embodiment of the invention, an intelligent backhaul radio is disclosed that includes a plurality of receive RF chains; one or more transmit RF chains; an antenna array comprising a plurality of directive gain antenna elements, wherein each directive gain antenna element is couplable to at least one receive RF or transmit RF chain; and an interface bridge configured to couple the intelligent backhaul radio to a data network, the interface bridge comprising one or more Ethernet interfaces to couple the interface bridge to the data network, wherein the intelligent backhaul radio is configured to scan a plurality of radio frequency channels for the presence of radio signals transmitted from one or more point to point microwave systems to generate scan data, and wherein the intelligent backhaul radio comprises at least one adjustable network parameter that is adjustable based on the scan data, wherein the at least one network parameter is adjusted to reduce a potential of interference of the intelligent backhaul radio with the one or more point to point microwave systems, wherein the intelligent backhaul radio is a first intelligent backhaul radio, and wherein the adjusting the at least one network parameter comprises one or more of: selecting a frequency channel utilized between the first intelligent backhaul radio and a second intelligent backhaul radio; adjusting the effective radiation pattern of the first intelligent backhaul radio; selecting one or more of the plurality of directive gain antenna elements; and adjusting the physical configuration or arrangement of the one or more of the plurality of directive gain antenna elements.

The intelligent backhaul radio may include an intelligent backhaul controller. The intelligent backhaul radio may include an intelligent backhaul management system agent. The intelligent backhaul radio may include a wireless adapter.

The intelligent backhaul radio may be further configured to generate a scan report based on the scan data and transmit the scan report to a server.

The signals may include a signal licensed by the Federal Communications Commission (FCC) under 47 Code of Federal Regulations (CFR) section 101 as a common carrier fixed point-to-point microwave service or as a private operational fixed point-to-point microwave service.

Adjusting the effective radiation pattern may include one or more of: steering the effective radiation pattern in elevation; and steering the effective radiation pattern in azimuth.

Adjusting the effective radiation pattern may include calculating digital beam former weights based upon at least one constraint related to the potential of interference; and applying the digital beam former weights.

The constraint may be selected from the group consisting of: properties related to or derived from said scan result; a direction in which signal transmission is to be limited; parameters which reduce the potential for interfering with said one or more point to point microwave systems; parameters which increase the likelihood of said first and said second internet backhaul radios meeting performance goals with respect to an interposed wireless communication link; a restriction of use of specific transceivers or specific antennas of a plurality of transceivers or antennas; a use of specific polarizations for transmission; attributes of a collective transmission radiation pattern associated with a plurality of transmitters; a frequency or geometric translation of beam forming weights between receiver weights and transmitter weights; based upon a change in antennas used or selected; based upon a change in operating frequency; and combinations thereof.

The scan report may include one more selected from the group consisting of: the location of said first IBR; the latitude and longitudinal coordinates of one or more IBRs; configuration information related to the first IBR; capability information related to the first IBR; a transmission power capability of said first IBR; operating frequency capability of said first IBR; antenna property information related to one or more antenna for use in reception or transmission by said first IBR; received signal parameters or demodulated information from another internet backhaul radio; received signal parameters from a received point to point microwave system; and combinations thereof.

The intelligent backhaul radio may be further configured to assess performance after adjustment of the at least one adjustable network parameter.

The intelligent backhaul radio may be a first intelligent backhaul radio, and the performance may be assessed by one or more selected from the group consisting of: performing additional scans; performing additional scans with specific search criteria; performing additional scans with limitations in frequency, azimuth, elevation, or time; performing additional scans with a modified antenna selection configuration; performing additional scans using antennas intended for transmission during normal operation for reception during the additional scanning process; performing transmission of a signal from the first intelligent backhaul radio to a second intelligent backhaul radio, receiving a signal from the second intelligent backhaul radio by the first intelligent backhaul radio.

The intelligent backhaul radio may be a first intelligent backhaul radio, and the first intelligent backhaul radio may be configured to align the antenna array with a second intelligent backhaul radio prior to the scan based on at least one criterion.

The at least one criterion may be based at least in part upon a signal transmitted from the second intelligent backhaul radio.

The at least one criterion may include a GPS location and a compass direction.

According to another embodiment of the invention, an intelligent backhaul system is disclosed that includes an intelligent backhaul radio having a plurality of receive RF chains; one or more transmit RF chains; an antenna array comprising a plurality of directive gain antenna elements, wherein each directive gain antenna element is couplable to at least one receive RF or transmit RF chain; and an interface bridge configured to couple the intelligent backhaul radio to a data network, the interface bridge comprising one or more Ethernet interfaces to couple the interface bridge to the data network, wherein the intelligent backhaul radio is configured to scan a plurality of radio frequency channels for the presence of radio signals transmitted from one or more point to point microwave systems to generate scan data, and wherein the intelligent backhaul radio comprises at least one adjustable network parameter that is adjustable based on the scan data; and a server in communication with the intelligent backhaul radio, wherein the server is configured to receive the scan data from the intelligent backhaul radio, wherein the at least one network parameter is adjusted to reduce the potential of interference of the intelligent backhaul radio with the one or more point to point microwave systems, wherein the intelligent backhaul radio is a first intelligent backhaul radio, and wherein the adjusting the at least one network parameter includes one or more of: selecting a frequency channel utilized between the first intelligent backhaul radio and a second intelligent backhaul radio; adjusting the effective radiation pattern of the first intelligent backhaul radio; selecting one or more of the plurality of directive gain antenna elements; and adjusting the physical configuration or arrangement of the one or more of the plurality of directive gain antenna elements.

The server may be configured to store data received from the intelligent backhaul radio.

The system may further include one or more intelligent backhaul controllers.

The intelligent backhaul radio may include an intelligent backhaul controller.

The intelligent backhaul radio may include an intelligent backhaul management system agent.

The server may be at least one of a private server and a global server.

The intelligent backhaul radio may include a wireless adapter.

The intelligent backhaul radio may be further configured to generate a scan report based on the scan data, and wherein the server is configured to receive the scan report.

The server may utilize the scan data to identify the at least one network parameter to be adjusted.

The signals may include a signal licensed by the Federal Communications Commission (FCC) under 47 Code of Federal Regulations (CFR) section 101 as a common carrier fixed point-to-point microwave service or as a private operational fixed point-to-point microwave service.

The scan data may be analyzed by the server to determine a potential of interference of the intelligent backhaul radio with the one or more point to point microwave systems.

The server may perform a mathematical modeling of the radio propagation of one or more potentially interfering signals from the intelligent backhaul radio to the one or more point to point microwave systems.

Adjusting the effective radiation pattern may include one or more of: steering the effective radiation pattern in elevation; and steering the effective radiation pattern in azimuth.

Adjusting the effective radiation pattern may include calculating digital beam former weights based upon at least one constraint related to the potential of interference; and applying the digital beam former weights.

The constraint may be selected from the group consisting of: properties related to or derived from said scan result; a direction in which signal transmission is to be limited; parameters which reduce the potential for interfering with said one or more point to point microwave systems; parameters which increase the likelihood of said first and said second internet backhaul radios meeting performance goals with respect to an interposed wireless communication link; a restriction of use of specific transceivers or specific antennas of a plurality of transceivers or antennas; a use of specific polarizations for transmission; attributes of a collective transmission radiation pattern associated with a plurality of transmitters; a frequency or geometric translation of beam forming weights between receiver weights and transmitter weights; based upon a change in antennas used or selected; based upon a change in operating frequency; and combinations thereof.

The mathematical modeling may be based on the scan data.

The scan report may include one more selected from the group consisting of: the location of said first IBR; the latitude and longitudinal coordinates of one or more IBRs; configuration information related to the first IBR; capability information related to the first IBR; a transmission power capability of said first IBR; operating frequency capability of said first IBR; antenna property information related to one or more antenna for use in reception or transmission by said first IBR; received signal parameters, or demodulated information from another internet backhaul radio; received signal parameters from a received point to point microwave system; and combinations thereof.

The intelligent backhaul radio may be further configured to assess performance after adjustment of the at least one adjustable network parameter.

The intelligent backhaul radio may be a first intelligent backhaul radio, and the performance may be assessed by one or more selected from the group consisting of: performing additional scans; performing additional scans with specific search criteria; performing additional scans with limitations in frequency, azimuth, elevation, or time; performing additional scans with a modified antenna selection configuration; performing additional scans using antennas intended for transmission during normal operation for reception during the additional scanning process; performing transmission of a signal from the first intelligent backhaul radio to a second intelligent backhaul radio; receiving a signal from the second intelligent backhaul radio by the first intelligent backhaul radio.

The intelligent backhaul radio may be a first intelligent backhaul radio, and the first intelligent backhaul radio may be configured to align the antenna array with a second intelligent backhaul radio prior to the scan based on at least one criterion.

The at least one criterion may be based at least in part upon a signal transmitted from the second intelligent backhaul radio. The at least one criterion may include a GPS location and a compass direction. The system may further include an installation assisting device, and the installation assisting device may determine the GPS location and the compass direction.

The server may be coupled with a database, and the database may include information related to one or more existing point to point microwave sites.

The information may include one or more selected from the group consisting of: radio service group; fixed transmit location details; latitude and longitude of one or more existing point to point microwave sites; street address of one or more existing point to point microwave sites; site elevation; antenna elevation; transmitter antenna height; polarization; beam width; antenna pointing azimuth and elevation angle; antenna gain; transmitter power or equivalent isotropically radiated power (EIRP); frequency of operation or frequency tolerance; emission designator; equipment modulation type and rate; and equipment manufacturer.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

FIG. 13A is a table of a partial listing for the frequency availability for specific radio services 47 C.F.R. §101.101.

DETAILED DESCRIPTION

Figure 1:
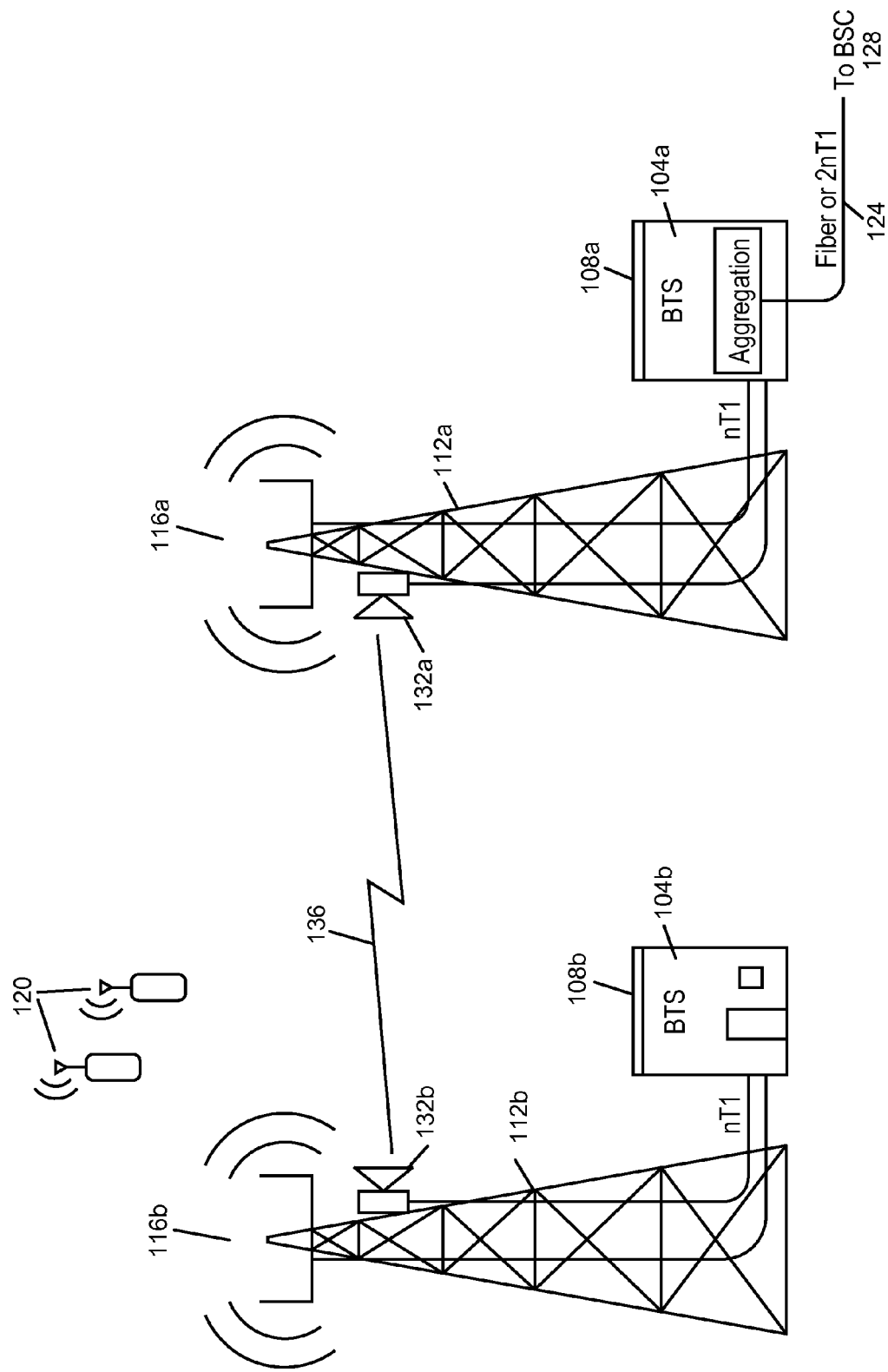
FIG. 1 is an illustration of conventional point to point (PTP) radios deployed for cellular base station backhaul with unobstructed line of sight (LOS).
Figure 2:
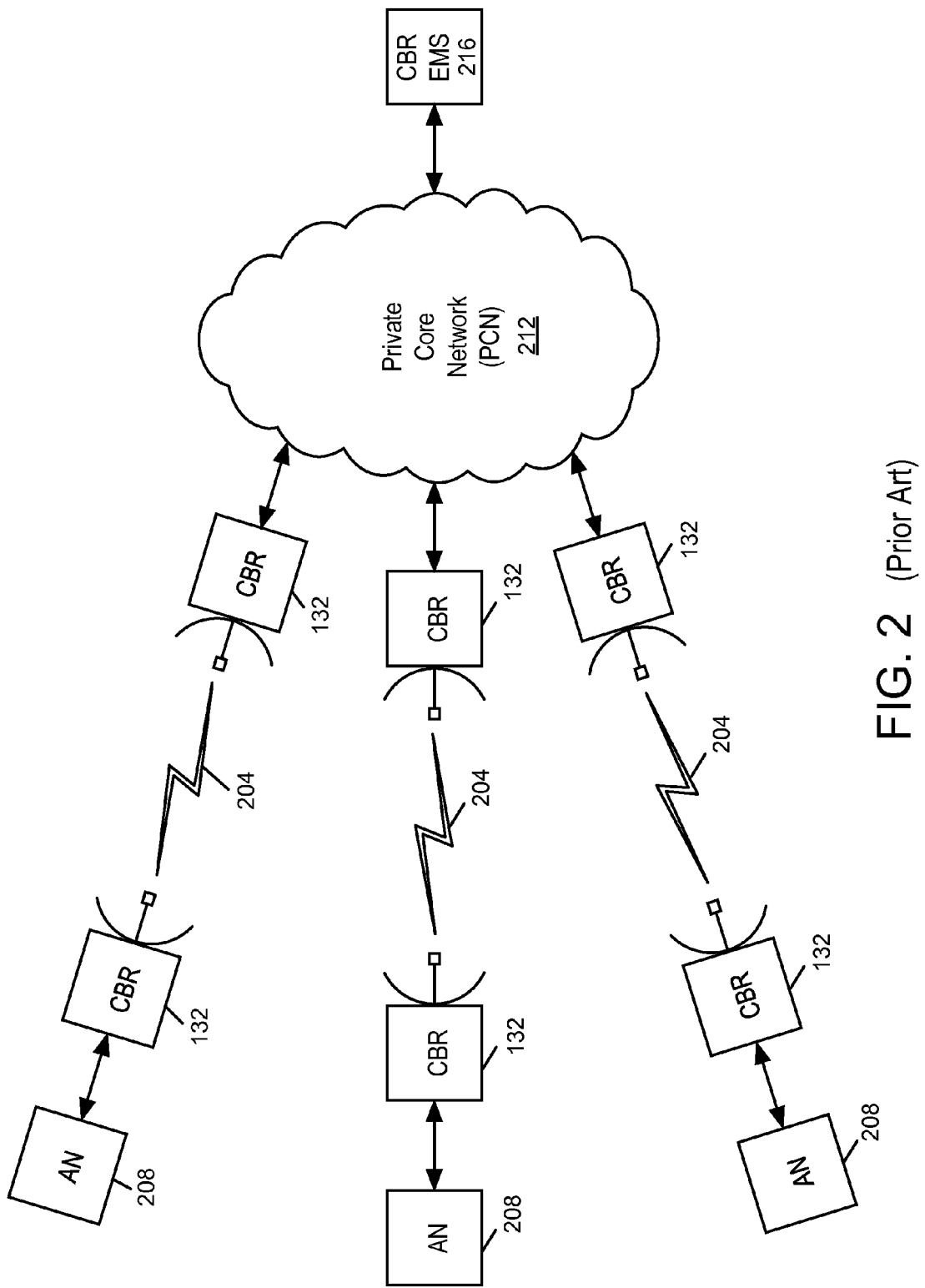
FIG. 2 is an illustration of an exemplary deployment of conventional backhaul radios.
Figure 3:
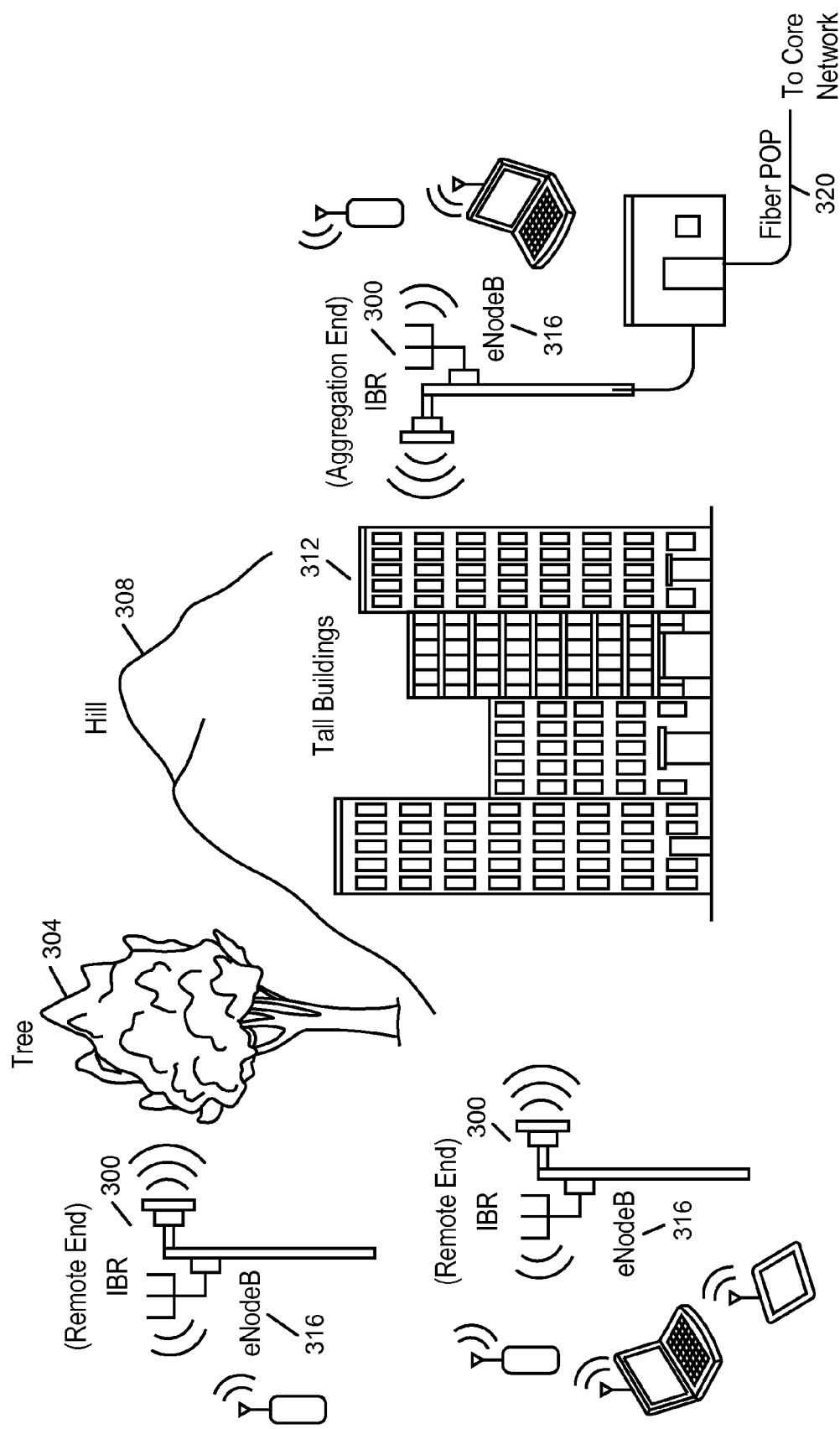
FIG. 3 is an illustration of intelligent backhaul radios (IBRs) deployed for cellular base station backhaul with obstructed LOS according to one embodiment of the invention.

FIG. 3 illustrates deployment of intelligent backhaul radios (IBRs) in accordance with an embodiment of the invention. As shown in FIG. 3, the IBRs 300 are deployable at street level with obstructions such as trees 304, hills 308, buildings 312, etc. between them. The IBRs 300 are also deployable in configurations that include point to multipoint (PMP), as shown in FIG. 3, as well as point to point (PTP). In other words, each IBR 300 may communicate with one or more than one other IBR 300.

For 3G and especially for $4^{th}$ Generation (4G), cellular network infrastructure is more commonly deployed using "microcells" or "picocells." In this cellular network infrastructure, compact base stations (eNodeBs) 316 are situated outdoors at street level. When such eNodeBs 316 are unable to connect locally to optical fiber or a copper wireline of sufficient data bandwidth, then a wireless connection to a fiber "point of presence" (POP) requires obstructed LOS capabilities, as described herein.

For example, as shown in FIG. 3, the IBRs 300 include an Aggregation End IBR (AE-IBR) and Remote End IBRs (RE-IBRs). The eNodeB 316 of the AE-IBR is typically connected locally to the core network via a fiber POP 320.

The RE-IBRs and their associated eNodeBs 316 are typically not connected to the core network via a wireline connection; instead, the RE-IBRs are wirelessly connected to the core network via the AE-IBR. As shown in FIG. 3, the wireless connection between the IBRs include obstructions (i.e., there may be an obstructed LOS connection between the RE-IBRs and the AE-IBR).

Figure 4:
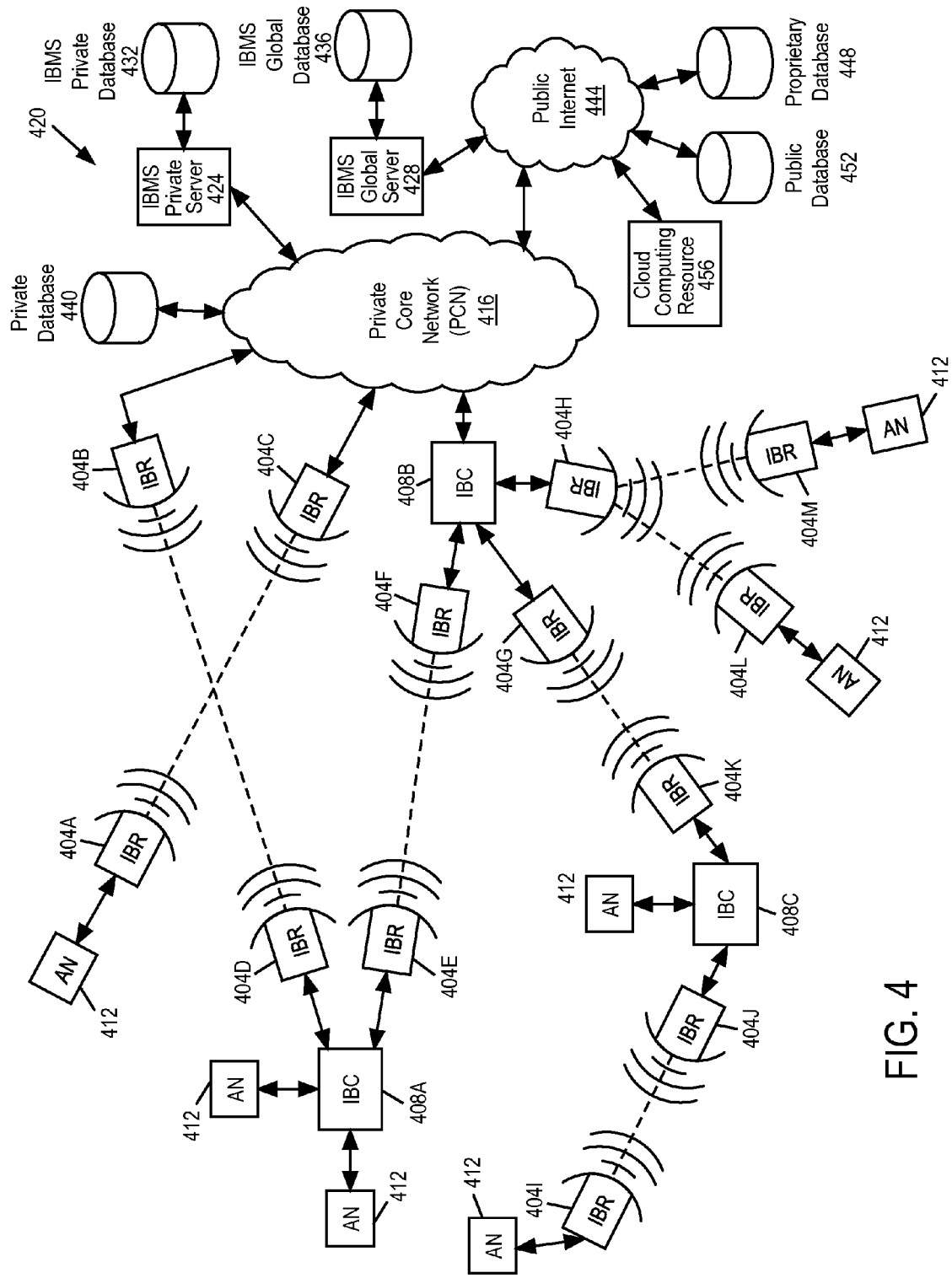
FIG. 4 is an exemplary deployment of an intelligent backhaul system (IBS) according to one embodiment of the invention.

FIG. 4 illustrates an exemplary deployment of an intelligent backhaul system (IBS) 400. The IBS 400 includes multiple IBRs 404 that can operate in both obstructed and unobstructed LOS propagation conditions. The IBS 400 has several features that are not typical for conventional line of sight microwave backhaul systems.

First, the IBS 400 includes multiple IBRs 404. Exemplary IBRs are shown and described below with reference to, for example, FIG. 5 of the present application, and are disclosed in detail in co-pending U.S. patent application Ser. No. 13/212,036, entitled Intelligent Backhaul Radio, filed Aug. 17, 2011, and FIG. 4 of co-pending U.S. patent application Ser. No. 13/271,051, entitled Intelligent Backhaul System, filed Oct. 11, 2011, the entireties of which is hereby incorporated by reference. It will be appreciated that there are many possible embodiments for the IBRs as described herein and in co-pending U.S. patent application Ser. Nos. 13/212,036 and 13/271,051. The IBRs 404 are able to function in both obstructed and unobstructed LOS propagation conditions.

Second, the IBS 400, optionally, includes one or more "Intelligent Backhaul Controllers" (IBCs) 408. As shown in FIG. 4, for example, the IBCs 408 are deployed between the IBRs 404 and other network elements, such as remote data access networks (ANs) 412 and a private core network (PCN) 416.

Third, the IBS 400 includes an "Intelligent Backhaul Management System" (IBMS) 420. As shown in FIG. 4, the IBMS 420 includes a private server 424 and/or a public server 428. The IBMS 420 may also include an IBMS agent in one or more of the IBRs 404. The IBMS agent is described in detail with reference to FIG. 5 of the present application, FIG. 5 of and copending U.S. application Ser. No. 13/271,051 and FIG. 7 of copending U.S. application Ser. No. 13/212,036. An IBMS agent may, optionally, be included within one or more of the IBCs 408.

Figure 5:
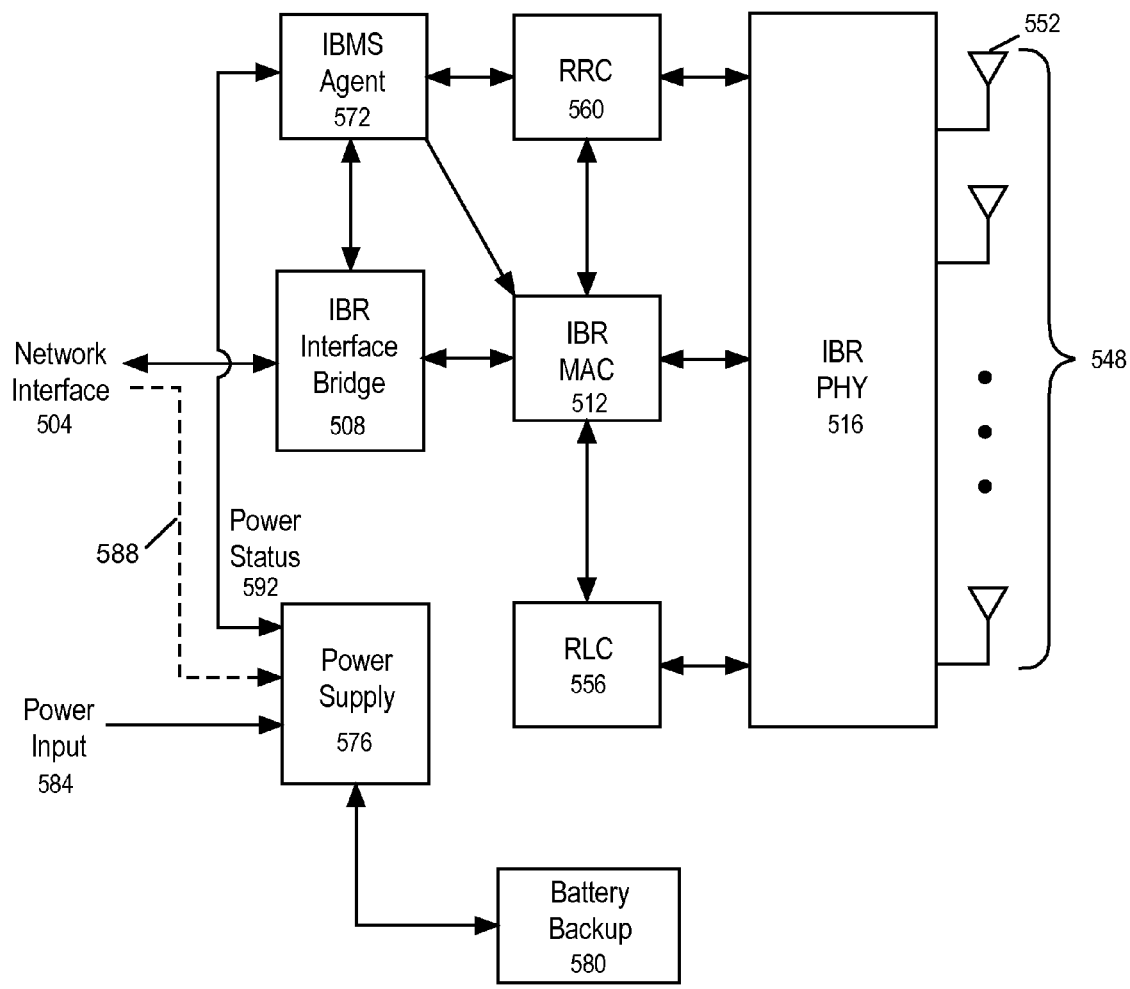
FIG. 5 is a block diagram of an IBR according to one embodiment of the invention.

FIG. 5 is a simplified block diagram of the IBRs 404 shown in FIG. 4. In FIG. 5, the IBRs 404 include interfaces 504, interface bridge 508, MAC 512, a physical layer 516, antenna array 548 (includes multiple antennas 552), a Radio Link Controller (RLC) 556 and a Radio Resource Controller (RRC) 560. The IBR may optionally include an IBMS agent 572. FIG. 5 illustrates, in particular, an exemplary embodiment for powering the IBR 404. In FIG. 5, the IBR 404 also includes a Power Supply 576 and an optional Battery Backup 580. The Power Supply 576 may receive a Power Input 584 or an alternative power input derived from a network interface 504. It will be appreciated that the components and elements of the IBRs may vary from that illustrated in FIG. 5.

In some embodiments, the IBR Interface Bridge 508 physically interfaces to standards-based wired data networking interfaces 504 as Ethernet 1 through Ethernet P. "P" represents a number of separate Ethernet interfaces over twisted-pair, coax or optical fiber. The IBR Interface Bridge 508 can multiplex and buffer the P Ethernet interfaces 504 with the IBR MAC 512. The IBR Interface Bridge 508 may also include an optional IEEE 802.11 (or WiFi) adapter. IBR Interface Bridge 508 also preserves "Quality of Service" (QoS) or "Class of Service" (CoS) prioritization as indicated, for example, in IEEE 802.1q 3-bit Priority Code Point (PCP) fields within the Ethernet frame headers, such that either the IBR MAC 512 schedules such frames for transmission according to policies configured within the IBR of FIG. 5 or communicated via the IBMS Agent 572, or the IBR interface bridge 508 schedules the transfer of such frames to the IBR MAC 512 such that the same net effect occurs. In other embodiments, the IBR interface bridge 508 also forwards and prioritizes the delivery of frames to or from another IBR over an instant radio link based on Multiprotocol Label Switching (MPLS) or Multiprotocol Label Switching Transport Profile (MPLS-TP).

In general, the IBR utilizes multiple antennas and transmit and/or receive chains which can be utilized advantageously by several well-known baseband signal processing techniques that exploit multipath broadband channel propagation. Such techniques include Multiple-Input, Multiple-Output (MIMO), MIMO Spatial Multiplexing (MIMO-SM), beam forming (BF), maximal ratio combining (MRC), and Space Division Multiple Access (SDMA).

The Intelligent Backhaul Management System (IBMS) Agent 572 is an optional element of the IBR that optimizes performance of the instant links at the IBR as well as potentially other IBR links in the nearby geographic proximity including potential future links for IBRs yet to be deployed.

Figure 6:
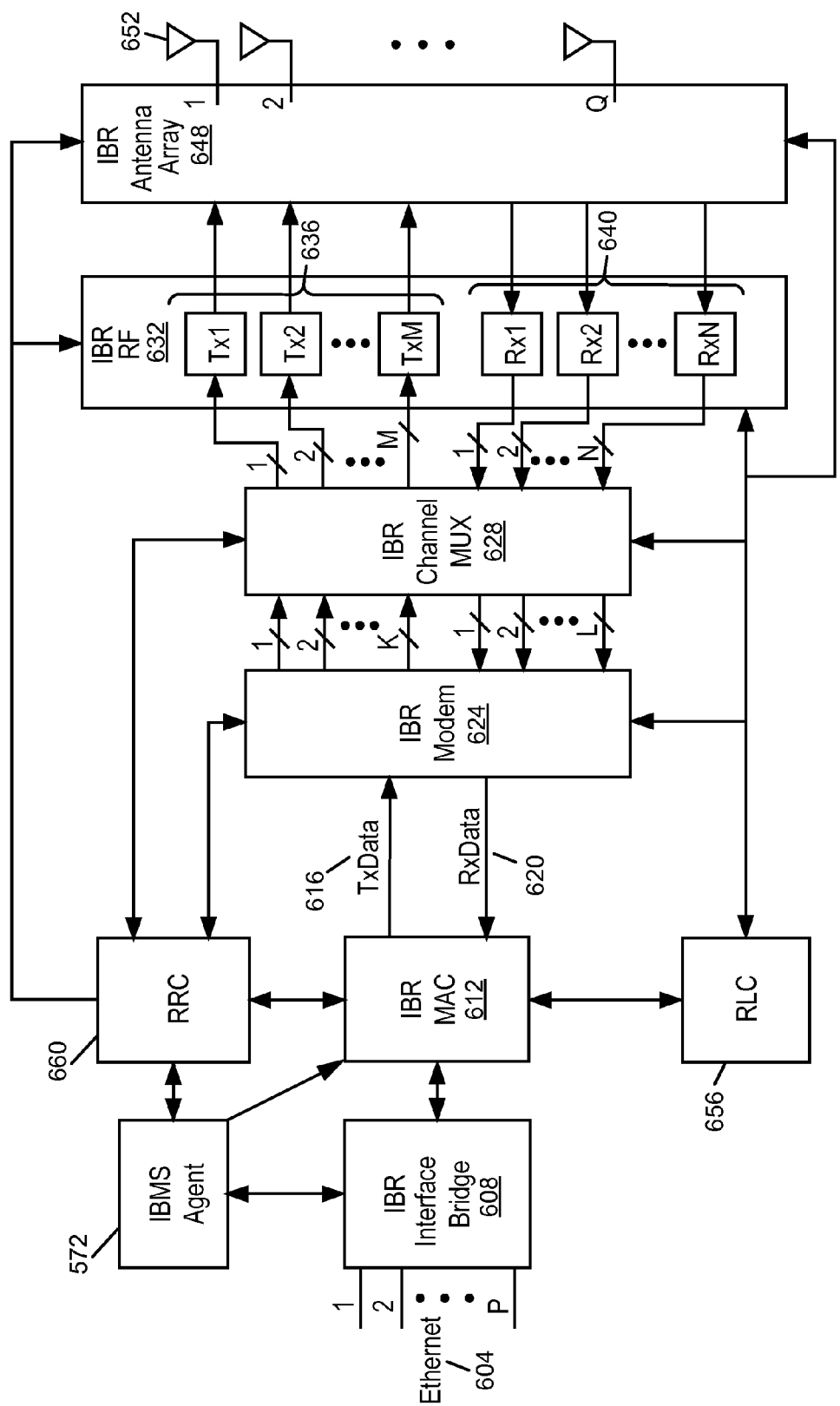
FIG. 6 is a block diagram of an IBR according to one embodiment of the invention.

FIG. 6 illustrates an exemplary detailed embodiment of the IBR 400 illustrating some additional details. FIG. 6 corresponds to FIG. 7 of copending U.S. application Ser. No. 13/212,036 and FIG. 6 of copending U.S. application Ser. No. 13/271,051. As shown in FIG. 6, the IBR 400 includes interfaces 604, interface bridge 608, media access controller (MAC) 612, modem 624, which includes one or more demodulator cores and modulator cores, channel multiplexer (MUX) 628, RF 632, which includes transmit chains (Tx1 . . . TxM) 636 and receive chains (Rx1 . . . RxN) 640, antenna array 648 (includes multiple directive gain antennas/antenna elements 652), a Radio Link Controller (RLC) 656, a Radio Resource Controller (RRC) 660 and the IBMS agent 572. It will be appreciated that the components and elements of the IBRs may vary from that illustrated in FIG. 6.

The primary responsibility of the RRC 660 is to set or cause to be set at least the one or more active RF carrier frequencies, the one or more active channel bandwidths, the choice of transmit and receive channel equalization and multiplexing strategies, the configuration and assignment of one or more modulated streams amongst the one or more modulator cores, the number of active transmit and receive RF chains, and the selection of certain antenna elements and their mappings to the various RF chains. Optionally, the RRC 660 may also set or cause to be set the superframe timing, the cyclic prefix length, and/or the criteria by which blocks of Training Pilots are inserted. The RRC 660 allocates portions of the IBR operational resources, including time multiplexing of currently selected resources, to the task of testing certain links between an AE-IBR and one or more RE-IBRs. The MAC 612 exchanges data to and from a remote access data network via coupling to at least the interface bridge 608 and to and from at least one other intelligent backhaul radio. The MAC 612 inputs receive data from a receive path and outputs transmit data to the transmit path.

Additional details regarding the features and operation of the IBR 400 are disclosed in copending U.S. application Ser. Nos. 13/212,036 and 13/271,051, the entireties of which are hereby incorporated by reference. For example, the various policies and configuration parameters used by the RRC 660 to allocate resources within and amongst IBRs with active links to each other are sent from the IBMS Agent 572 to the RRC 660. In the return direction, the RRC 660 reports operational statistics and parameters back to the IBMS Agent 572 both from normal operation modes and from "probe in space" modes as directed by the IBMS Agent 572.

With reference back to FIG. 5, the IBR 400 also includes a power supply 576. In some embodiments, a Power Input 584 to the Power Supply 576 is an alternating current (AC) supply of, for example, 120V, 60 Hz or 240V, 50 Hz or 480V, 60 Hz, 3-phase. Alternatively, the Power Input 584 may be a direct current (DC) supply of, for example, +24V, −48V, or −54V.

The Power Supply 576 outputs voltage to other elements of the IBR 404. In some embodiments, typical Power Supply 576 output voltages are DC voltages such as +12V, +5V, +3.3V, +1.8V, +1.2V, +1.0V or −1.5V.

In the event that the Power Supply 576 loses its Power Input 584 for any reason, the Battery Backup 580 may provide an alternative power input to the Power Supply 576 so that IBR operation may continue for some period of time. This is particularly advantageous for ANs at remote locations wherein critical communications services may be needed during temporary main power supply outages. The Battery Backup 580 is typically charged by a DC input such as +18V or +12V from the Power Supply 576.

As shown in FIG. 5, the Power Supply 576 may optionally receive a power input derived from a network interface 504. For IBRs that require approximately 15 W of power or less, an exemplary power input from a network interface 504 is "Power over Ethernet" (or PoE) as defined by IEEE 802.af. For other IBRs that require approximately 25 W of power or less, an exemplary power input from a network interface 504 is "Power over Ethernet Plus" (or PoE+) as defined by IEEE 802.at. Typical DC voltages associated with POE are +48V or −48V, and typical DC voltages associated with PoE+ are +54V or −54V.

In some embodiments, it may be desirable for the Power Supply 576 to operate from AC main supplies, such as 120V, 240V or 480V, in two separate structures. First, an AC to DC converter creates a DC power input such as +24V, +12V, +18V, −48V, −54V, etc; and, second, a DC to DC converter creates the DC voltages required internal to the IBR such as +12V, +5V, +3.3V, +1.8V, +1.2V, +1.0V, −1.5V, etc.

In embodiments in which the Power Supply 576 includes these two separate structures, the AC to DC converter portion of the Power Supply 576 may be physically external to the main enclosure of the IBR while the DC to DC converter portion of the Power Supply 576 is internal to the main enclosure of the IBR. Similarly, in some embodiments, the Battery Backup 580 may be external to the main enclosure of the IBR. Similarly, for IBRs with a WiFi Adapter capability as described in copending U.S. application Ser. No. 13/212,036, the WiFi Adapter may be positioned internal to or external of the enclosure of the IBR.

The IBMS Agent shown in FIG. 5 can function as described in copending U.S. application Ser. No. 13/212, 036, copending U.S. application Ser. No. 13/271,051 and/or as described in more detail below. As shown in FIG. 5, in some embodiments, the Power Supply 576 may provide a control signal (Power Status) 592 to the IBMS Agent 572 that communicates, for example, if the Power Supply 576 is operating from a Power Input 584, a derived power input from a network interface 588, or from an optional Battery Backup 580 and possibly an estimated current reserve level for such Battery Backup. In such embodiments, the IBMS Agent 572 may relay this status 592 to other elements of the IBS 400.

Figure 7:
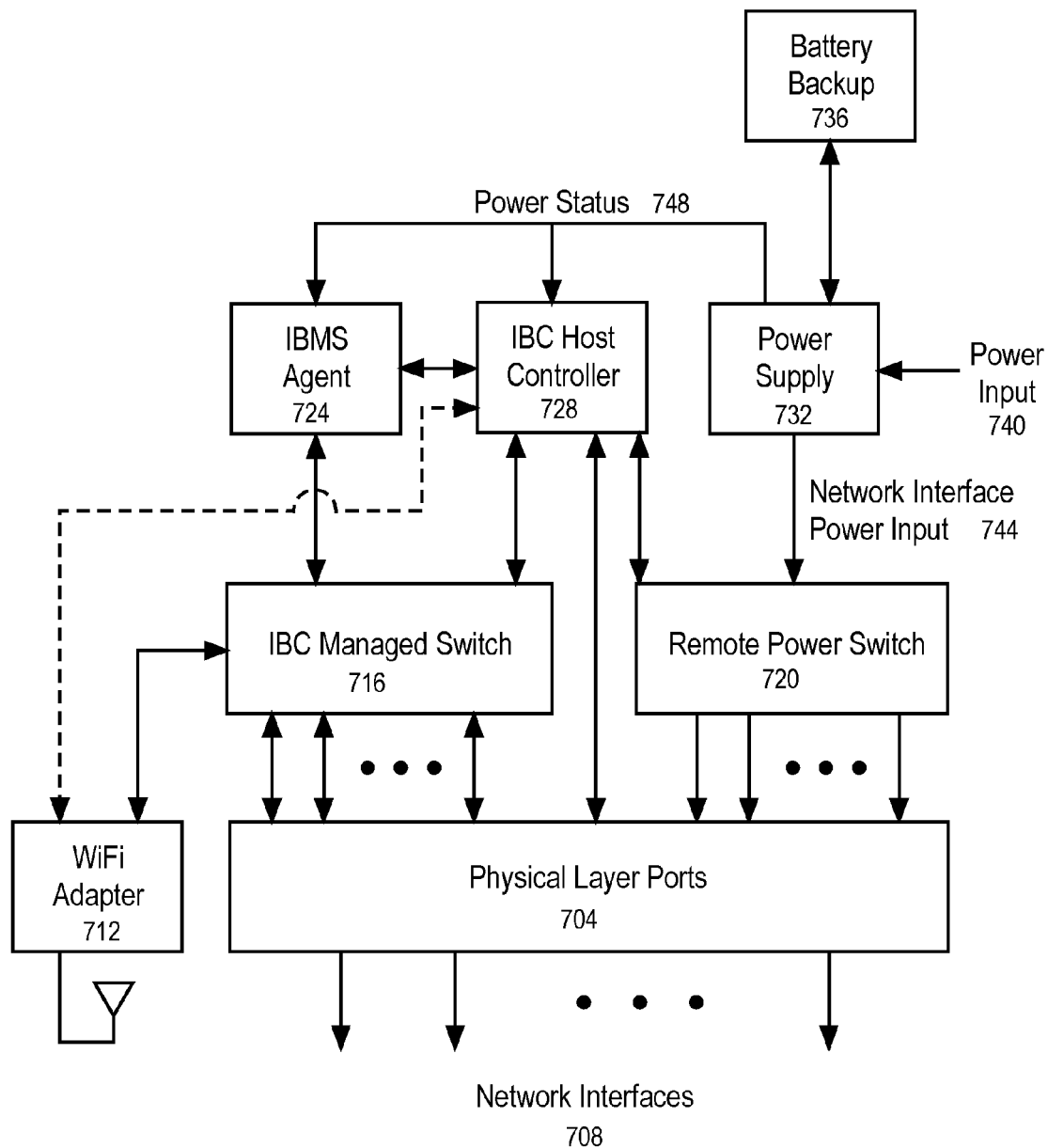
FIG. 7 is a block diagram of an intelligent backhaul controller (IBC) according to one embodiment of the invention.

FIG. 7 illustrates a simplified block diagram of IBCs 408A-C of FIG. 4. As shown in FIG. 7, the IBC 408 includes a plurality of physical layer ports 704 that include a plurality of network interfaces 708. The IBC 408 also includes a wireless adapter 712, an IBC managed switch 716, a remote power switch 720, an IBMS agent 724, and an IBC host controller 728. The IBC 408 may also include a power supply 732 and an optional battery backup 736.

In some embodiments, the plurality of Network Interfaces 708 are typically an Ethernet or IEEE 802.3 interfaces based on copper wires or fiber optics. Typically, such Ethernet interfaces support data rates of 1 Gb/s, 10 Gb/s or higher. Each Network Interface 708 is typically coupled to a respective Physical Layer Port 704 and in turn typically coupled to a respective Layer 2 port within the IBC Managed Switch 716.

In some embodiments, the IBC Managed Switch 716 is a substantially conventional Layer 2 switch in accordance with standard features defined by various IEEE 802.1 and 802.2 specifications. For example, the IBC Managed Switch 716 may be compliant with IEEE 802.1D for MAC-layer bridging across various ports and IEEE 802.1Q for adding Virtual Local Area Networking (VLAN) tags and the 3-bit 802.1p Priority Code Point (PCP) field. VLAN capability enables the IBC Managed Switch 716 to be segmented amongst certain subsets of the available switch ports and the PCP fields enable certain frames to have higher delivery priority than other frames. Other exemplary IBC Managed Switch 716 capabilities include compliance with IEEE 802.1X for access control, IEEE 802.1AB for link layer discovery, IEEE 802.1AE for MAC layer security, and IEEE 802.1AX for link aggregation and resiliency as well as numerous derivative standards specifications based on the above list (and IEEE 802.1D and 802.1Q).

In some embodiments, the IBC Managed Switch 716 may also have certain routing or packet-forwarding capabilities, such as routing by Internet Protocol (IP) address or packet-forwarding by Multiprotocol Label Switching (MPLS) in a substantially conventional fashion. In particular, some IBC Managed Switches 716 may operate as an MPLS Label Switch Router (LSR) while other MPLS-compatible devices within certain ANs operate as Label Edge Routers (LERs that represent ingress and egress points for packets within an MPLS network). In other embodiments, the IBC Managed Switch 716 may alternatively or additionally operate as an LER that affixes or removes MPLS labels having at least a label value or identifier, a 3-bit traffic class field (analogous to the PCP filed in IEEE 802.1 or the precedence bits in the Type of Service field in IP headers), and a time-to live field. Based on MPLS labels, such IBC Managed Switches 716 forward packets to particular ports (or possibly sets of ports in a VLAN segment) corresponding to certain ANs or IBRs as associated with particular "tunnels" to other MPLS LERs or LSRs, or based on MPLS ingress or egress ports from the IBC Managed Switch 716 when operating as an MPLS LER.

In some embodiments, the IBC Managed Switch 716 may alternatively or additionally operate as an MPLS Transport Profile (MPLS-TP) switch to provide connection-oriented, packet-switching on specific paths between such an IBC and typically another such IBC or peer MPLS-TP device at the edge of the PCN 416.

In some embodiments, the IBC Managed Switch 716 may alternatively or additionally operate as a Carrier Ethernet switch that provides one or more Ethernet Virtual Connections (EVCs) according to standards promulgated by the Metro Ethernet Forum (MEF). For example, in such embodiments, certain IBC Network Interface 708 ports may be configured within the IBC Managed Switch 716 as an MEF User Network Interface (UNI) port. Typically, such an IBC UNI port, if associated with an AN 412 at an IBC 408 on a remote location, can then be paired to another UNI (possibly at another IBC) at the edge of the PCN (at an aggregation point) via an EVC. Depending on the configuration of the IBC Managed Switch 716 and other network elements, the EVC could be an E-Line such as an Ethernet Private Line, an E-LAN such as an Ethernet Private LAN, or an E-Tree. For deployments such as shown in FIG. 4, an exemplary IBC 408 with MEF capability can also interact with one or more IBR-based links to provide Committed Information Rate (CIR) and Excess Information Rate (EIR). These interactions may be direct via one or more Network Interfaces 708 or optionally indirect via the IBMS 420.

As shown in FIG. 7, the IBC 408 may also include an IBC Host Controller 728. The IBC host controller 728 may be implemented as software on one or more microprocessors. In some embodiments, the IBC Host Controller 728 directs the operation of the IBC Managed Switch 716 according to policies provided to the IBC 408. The scope of policies applicable to a given IBC 408 depends on the particular set of IBC Managed Switch capabilities, as described above. Typical policies relate to the mapping between Network Interface 708 ports assigned to ANs 412 and those assigned to IBRs 404 as realized within the IBC Managed Switch 716. In many cases, the policies may be derived from Service Level Agreements (SLAs) that govern the desired and/or required performance attributes of backhaul connections between particular ANs 412 or users of ANs 412 and the PCN 416.

In some embodiments, the policies administered by the IBC Host Controller 728 in directing the behavior of the IBC Managed Switch 716 are supplied by the IBMS Agent 724. In some embodiments, such policies are alternatively or additionally supplied by a console interface to the IBC 408 at the time of initial deployment or later.

As shown in FIG. 7, the IBC 408 may also include an IEEE 802.11 Wireless LAN interface (i.e. a "WiFi Adapter") 712. In some embodiments, the WiFi Adapter 712 may be configured as a public or private IEEE 802.11 access point based on one or more standard specifications such as IEEE802.11g, IEEE802.11n or subsequent IEEE 802.11 variants. In this situation, the IBC effectively integrates a WiFi-based AN within the IBC that is attached to an internal port of the IBC Managed Switch 716 such that traffic to or from the WiFi AN can be bridged to one or more IBRs 404, or passed to an IBMS Agent 724, 576 (at either the IBC 408 or within the one or more attached IBRs 404) or the IBC Host Controller 728 over standard network protocols, such as TCP or UDP on IP. This permits terminal devices such as smartphones, tablets or laptop computers to act as a console input to easily access, monitor or configure policies and performance data associated with the IBC 408, or via the IBC Managed Switch 716, also access, monitor or configure policies and performance data at one or more IBRs 404 attached to the IBC 408. This is particularly advantageous for IBCs 408 and/or IBRs 404 that are mounted in locations without easy physical accessibility, such as those mounted on street lamps, utility poles, and building sides or masts that are insufficient to support humans at the IBC or IBR mounting height. Similarly, such access to the IBC 408 and attached IBRs 404 can be realized via a WiFi Adapter within one of the attached IBRs 404 by bridging across an exemplary IBC 408.

Alternatively, in some embodiments, the WiFi Adapter 712 may be optionally connected to the IBC Host Controller 728 (instead of the IBC Managed Switch 716) over a serial bus or other internal bus suitable for peripheral I/O devices. In this embodiment, the WiFi Adapter 712 would not be suitable for public or private WiFi access point usage at commercially-desirable throughputs, but may still be suitable for console mode operation to access, monitor or configure policies and performance data at the IBC 408 and possibly at attached IBRs 404 to the extent permitted by the software executing on the IBC Host Controller 728.

In some embodiments, the optional WiFi Adapter 712 may be physically contained within the enclosure of the IBC 408, subject to consideration of antenna location for effective propagation especially for elevated mounting and ground level access. In other embodiments, the optional WiFi Adapter 712 may be external to the IBC physical enclosure and either connected via an external Network Interface 708 or via an external mounting interface to the IBC Managed Switch 716 optimized specifically for an attached external WiFi Adapter.

For embodiments of the IBC 408 or IBR 404 that include a WiFi Adapter, it is possible to access such devices with the WiFi Adapter configured as an access point, as a peer to peer station device, as a station device wherein the portable terminal (smartphone, tablet, laptop computer, etc.) is configured as an access point, or via WiFi direct.

In FIG. 7, the IBC 408 also includes a Power Supply 732 and an optional Battery Backup 736. The Power Input 740 to the Power Supply 732 may be an alternating current (AC) supply of, for example, 120V, 60 Hz or 240V, 50 Hz or 480V, 60 Hz, 3-phase. Alternatively, the Power Input 740 may be a direct current (DC) supply of, for example, +24V, −48V, or −54V. Typical Power Supply 732 output voltages to the various elements of the IBC are DC voltages such as +12V, +5V, +3.3V, +1.8V, +1.2V, +1.0V or −1.5V.

The optional Battery Backup 736 may be charged by a DC input, such as +18V or +12V, from the Power Supply 732. In the event that the Power Supply 732 loses its Power Input 740 for any reason, the Battery Backup 736 may provide an alternative power input to the Power Supply 732 so that IBC operation may continue for some period of time. This is particularly advantageous for ANs at remote locations wherein critical communications services may be needed during temporary main power supply outages.

In some embodiments, a Power Supply 732 that operates from AC main supplies, such as 120V, 240V or 480V, includes two separate structures. First, the Power Supply 732 includes an AC to DC converter that creates a DC power input such as +24V, +12V, +18V, −48V, −54V, etc.; and, second, the Power Supply 732 includes a DC to DC converter that creates the DC voltages required internal to the IBC such as +12V, +5V, +3.3V, +1.8V, +1.2V, +1.0V, −1.5V, etc.

In these embodiments where the Power Supply 732 includes two separate structures, the AC to DC converter portion of the Power Supply 732 may be physically external to the main enclosure of the IBC 408 while the DC to DC converter portion of the Power Supply 732 remains internal to the main enclosure of the IBC 408. Similarly, for certain IBC embodiments, the Battery Backup 736 may be external to the main enclosure of the IBC 408.

Note that unlike the IBR 404, the IBCs 408 typically are not configured to use standards-based PoE or PoE+ as an alternate power input for powering the IBC 408. Instead, the IBCs 408 combine a PoE or PoE+ power injection capability that can be switched to some or all of the Network Interfaces 708 from a Remote Power Switch 720 via the Physical Layer Ports 704. Typically the Network Interface Power Input 744, such as +48V or −48V for PoE or +54V or −54V for PoE+, is provided by the Power Supply 732 and then switched under the direction of the IBC Host Controller 728 at the Remote Power Switch 720. The specific Network Interface 408 ports receiving PoE or PoE+ power from the Remote Power Switch 720 are determined based on configuration parameters set at time of deployment by, for example, console mode input or the IBMS Agent 724 or updated from time to time via the IBMS Agent 724.

Note also that as for the IBR 404, exemplary IBCs 408 may also have the Power Supply 732 provide a control signal (Power Status) 748 to at least the IBMS Agent 724 or the IBC Host Controller 728 that communicates, for example, if the Power Supply 732 is operating from a Power Input 740 or from an optional Battery Backup 736 and possibly an estimate current reserve level for such Battery Backup 736. As with the IBR 404, such Power Status 748 may be relayed by the IBMS Agent 724 to other IBMS elements. Alternatively or additionally, the IBMS Agent 724 and/or IBC Host Controller 728 may choose to restrict or terminate PoE or PoE+ power to certain Network Interfaces 708, whether AN 412 or IBR 404, based on policies as may currently be set at the IBC 408. Such restrictions or terminations may also consider the actual power consumption of particular Network Interfaces 708 as may be determined by the Remote Power Switch 720 and reported to the IBC Host Controller 728. One example of when it is advantageous to terminate PoE or PoE+ power under backup conditions is when the device, powered by the IBC 408, such as an AN 412 or IBR 404, are known to the IBC 408 (possibly via the IBMS) to have their own back-up power sources.

In some embodiments, the IBCs 408 may also provide synchronization capabilities to ANs 412, IBRs 404 or other network devices attached to the Network Interfaces 708. One methodology for providing synchronization at remote locations such as IBCs 408A or 408C in FIG. 4 is to attach or embed a Global Positioning Satellite (GPS) receiver in an IBC (not shown in FIG. 7) and then distribute a one pulse per second (1 PPS) output to applicable ANs 412 and IBRs 404. However, the GPS may not operate effectively in the street level obstructed propagation conditions. An alternative approach to establishing synchronization at the IBC 408 for distribution to ANs 412 or IBRs 404 is to extend a synchronization methodology already in use in the PCN 416.

In some embodiments, the synchronization methodology of the IBCs 408 is Synchronous Ethernet (SyncE). With SyncE, the Network Interface clock frequency of a designated physical port can be precisely applied by the IBCs 408 to any other designated Network Interface physical port. Typically, this is performed by conventional circuitry comprised within the Physical Layer Ports 704 of the IBC 408. With SyncE, the IBC 408 can ensure that the Network Interface clock frequencies at certain physical ports are all identical over time to a master clock frequency typically supplied from within the PCN 416. This is particularly advantageous for network deployments where synchronous applications such as voice or video communications are desired to traverse multiple backhaul links as illustrated, for example, in FIG. 4.

In other embodiments, the synchronization methodology is IEEE 1588v2 or subsequent variations thereof. With IEEE 1588v2, the IBC 408 examines timestamps within certain packets (or frames) to either derive precise timing for internal or local distribution purposes or to modify such timestamps to account for delays traversing the IBC 408 or other network links or elements. Typically, this is performed by conventional circuitry comprised within the IBC Managed Switch 716 and/or Physical Layer Ports 704.

IBRs 404 can also include circuitry for SyncE or IEEE 1588v2 synchronization methodologies. In the SyncE case, the IBC 408 can only pass SyncE clock frequency synchronization from a master clock in the PCN 416 to remote ANs 412 over IBR links to the extent that the IBRs 404 include SyncE capability. In the IEEE 1588v2 case, the IBRs 404 operate across an instant AE-IBR to RE-IBR link as an IEEE 1588v2 transparent clock wherein the time stamp at ingress to such a link (for example, at IBR 404F in FIG. 4) is modified at egress from the link (for example, at IBR 404E in FIG. 4) to account for the actual latency incurred in traversing the link.

Similarly, in some embodiments, the IBC 408 operates as an IEEE 1588v2 transparent clock that modifies timestamps to account for actual latency incurred as a packet traverses from one IBC Network Interface physical port to another. In other embodiments, the IBC 408 alternatively or additionally operates as an IEEE 1588v2 boundary clock that has the ability to determine latency between such an IBC and another IEEE 1588v2 boundary clock or transparent clock device within the network based on delays determined between such devices.

In some embodiments, the IBCs 408 also have the capability to operate as an IEEE 1588v2 master or grandmaster clock as may be directed by the IBMS Agent 724 based on policies or messages passed from an IBMS Private Server 424 or IBMS Global Server 428 as shown in FIG. 4.

As shown in FIG. 7, the IBC 408 includes an IBMS Agent 724. The IBMS agent 724 may be similar to the IBR IBMS Agent 572 shown in and described with respect to FIG. 5 of the present application and copending U.S. patent application Ser. No. 13/271,051, and shown in and described with respect to FIG. 7 of copending U.S. patent application Ser. No. 13/212,036. The IBMS Agent 724 can be used to set numerous exemplary operational policies or parameters such as, for example, access control, security key management, traffic shaping or prioritization, load balancing, VLAN segmentation, routing paths, port mirroring, port redundancy, failover procedures, synchronization methodologies and port mappings, power management modes, etc. The IBMS Agent 724 can also be used to report numerous operational parameters or statistics to the IBMS Private Server 424 or IBMS Global Server 428, such as, for example, active sessions, connected device identifiers, MAC addresses, packet counts associated with particular MAC addresses or physical ports, packet or frame error rates, transfer rates, latencies, link availability status for certain ports, power consumption for certain ports, power status of the IBC, etc.

In embodiments where a CBR may be utilized for a particular link (not shown in FIG. 4), the IBMS Agent 724 within the IBC 408 can also act as a proxy IBMS Agent for the CBR to the extent the IBC 408 can determine certain operational parameters or statistics or set certain operational parameters or policies for such CBR. Optionally, the IBC 408 may also additionally or alternatively determine or set certain operational parameters or policies for a CBR or a switch port connected to such CBR based on OpenFlow (http://www.openflow.org/), Simple Network Management Profile (SNMP) or other industry standard network element management protocols.

With reference back to FIG. 4, the IBS 400 includes at least one IBMS Server 424, 428 which communicates with IBMS Agents 572, 724 within IBRs 404 and IBCs 408. In many deployments, operators of a PCN 416 may prefer to maintain an IBMS Private Server 424 within the PCN 416. Such an IBMS Private Server 424 typically serves as a secure and private point of database storage and policy management for all IBMS Agents 572, 724 within a particular PCN 416. Typically, such an IBMS Private Server 424 is implemented in a mirrored configuration of two or more substantially conventional servers and databases for both load balancing and redundancy purposes. In some embodiments, the IBMS Private Server 424 is implemented external to the PCN 416, for example as a virtual server and database within the IBMS Global Server 428, but still maintained as a secure and private point within the PCN 416 via a virtual private network (VPN) connection or equivalent technique.

One exemplary capability of the IBMS Private Server 424 includes storing, archiving and indexing data and statistics received from IBMS Agents in IBCs 408 and IBRs 404 associated with a particular PCN 416. An additional exemplary capability of the IBMS Private Server 424 includes generation and/or modification of policies used to configure, manage, optimize or direct, via IBMS Agents, the operation of IBCs 408 and IBRs 404 associated with a particular PCN 416. The IBMS Private Server 424 may also access information from or export information to a Private Database 440.

In some embodiments of the IBMS Private Server 424, certain raw or statistical data related to, for example, IBR operational parameters, are provided to the IBMS Global Server 428. Exemplary IBR operational parameters include channel frequency, modulation and coding scheme (MCS) index, transmit power control (TPC) value, signal to noise ratio (SNR) or signal to noise and interference ratio (SINR), superframe timing parameters, observed interferers, location, antenna configurations, antenna orientations, etc. The IBMS Private Server 424 may also receive policy recommendations for IBRs 404 and IBCs 408 associated with a particular PCN 416 from the IBMS Global Server 428. Such data and/or statistical summaries thereof may be maintained in an IBMS Private Database 432 associated with a particular IBMS Private Server 424.

As shown in FIG. 4, the IBS 400 may also include an IBMS Global Server 428 coupled to the public Internet 444. For IBRs 404 and IBCs 408 deployed in PCNs 416 where an IBMS Private Server 424 is not used, the IBMS Global Server 428 and such IBRs 404 and IBCs 408 can be configured such that the IBMS Global Server 428 provides the capabilities described above for the IBMS Private Server 424 for such IBRs 404 and IBCs 408.

The IBMS Global Server 428 communicates with IBRs 404 and IBCs 408 and IBMS Private Servers 424 such that the IBMS Global Server 428 has access to operational parameters for all IBRs 404 and IBCs 408 across all PCNs 416 capable of interacting with each other, either in network traffic flow or via common access to wireless propagation space.

As also shown in FIG. 4, the IBMS Global Server 428 maintains data associated with the operational parameters of the IBRs 404 (and possibly also IBCs 408) within an IBS 400 in an IBMS Global Database 436. The IBMS Global Server 428 is typically implemented in a mirrored configuration of two or more substantially conventional servers and databases for both load balancing and redundancy purposes. In some embodiments, the IBMS Global Server 428 may be virtualized within a cloud computing cluster that provides on demand server computing resources in response to instantaneous loading of the IBMS Global Server 428.

As shown in FIG. 4, the IBMS Global Server 428 preferably accesses one or more Public Databases 452 over, for example, the public Internet 444. In certain embodiments, the IBMS Global Server 428 accesses data or information in such Public Databases 452 in determining recommended policies for IBRs 404 or IBCs 408 within the IBS 400. In other embodiments, the IBMS Global Server 428 either additionally or alternatively provides data or information to such Public Databases 452 to, for example, enable other radio spectrum users to develop policies in view of deployed IBRs 404 or comply with applicable regulatory requirements. One example of a Public Database 452 is information available within the website of the United States Federal Communications Commission (FCC) at www.fcc.gov for certain fixed service radio locations, antenna orientations, antenna characteristics, transport powers and channel frequencies. Another example of the Public Database 452 is a listing of locations and parameters associated with certain ANs 412, such as WiFi access points. Other examples of Public Databases 452 include Geographic Information Services (GIS) databases of topography, landscape, and building locations and descriptions as may be maintained by various government agencies serving the geographic region encompassed by an exemplary IBS 400.

As also shown in FIG. 4, the IBMS Global Server 428 has the capability to access data or information from or provide data or information to certain Proprietary Databases 448 over the public Internet 444 to the extent that the operator of the IBMS Global Server 428 procures access privileges to such Proprietary Databases 448. Exemplary Proprietary Databases 448 may provide spectrum usage information or detailed GIS data for the geographic region encompassed by an exemplary IBS 400. Alternatively, such Proprietary Databases 448 may be vehicles to monetize data or information provided to such databases by the IBMS Global Server 428.

In certain embodiments where the IBMS Global Server 428 provides data or information to one or more Public Databases 452 or Proprietary Databases 448, some or all these databases may be within the IBMS Global Database 436 of FIG. 4.

The IBMS Global Server 428 of FIG. 4 may also have an analytical capability to determine estimated radio channel propagation effects for deployed or proposed IBR links in view of the other IBR links and other spectrum users within the geographic region encompassed by an exemplary IBS 400. As shown in FIG. 4, an exemplary IBMS Global Server 428 can access either locally or over the public Internet Cloud Computing Resources 456 to execute algorithms associated with such analytical capability, as described in further detail hereinafter. In general, radio channel propagation effects are simulated with such algorithms in view of, for example, radio locations (including antenna height), antenna characteristics and orientations, radio characteristics, channel frequencies and bandwidths, transmit powers, and GIS data describing the propagation environment.

In addition, the IBMS Private Server 424 or IBMS Global Server 428 may also provide traditional FCAPS information. This FCAPS information can be accessed in certain embodiments by the PCN operator by a client in communication with the IBMS Private Server 424 or IBMS Global Server 428. Alternatively or additionally, in other embodiments, such FCAPS information may be exported by the IBMS Private Server 424 or IBMS Global Server 428 to another Network Management System (NMS) as preferred by a particular PCN operator.

In some embodiments, the IBMS Private Server 424 or IBMS Global Service 428 also provides users, such as a particular PCN operator, with the capability to determine additional IBS Components for network changes, moves, adds, or redundancies. This may also be provided via a client interface or via export to another NMS. Typically, the IBMS Private Server 424 or IBMS Global Server 428 considers the particular goal of the IBC network modification, such as for example only, changing the amount of backhaul capacity at a remote location, moving a remote AN 412/IBR 404 to a different location, adding another remote location with one or more ANs, or providing an additional redundancy mechanism at a remote location. In view of the capabilities of the IBMS 420 as described above, then with knowledge of available IBR and IBC product variants or upgrade capabilities, the IBMS Private Server 424 or IBMS Global Server 428, acting as an expert system in exemplary embodiments, then recommends particular additional IBR or IBC equipment or upgrades to realize the requested goal.

In some embodiments, the IBMS Private Server 424 or IBMS Global Server 428 also actively monitors the IBS 400 with the IBMS capabilities described above such that, acting as an expert system in exemplary embodiments, it provides unsolicited recommendations for additional IBR or IBC equipment or upgrades or modified configuration parameters for existing deployed IBRs, IBCs and certain supported CBRs. Typically, for existing deployed IBRs or IBCs that are in communication with the IBMS Private Server 424 or IBMS Global Server 428, such modified configuration parameters associated with either preferential operation or a software-only equipment upgrade can be transferred to the particular IBRs or IBCs over network connections to avoid a need for manual configuration and/or travel by an operator to the remote location. Optionally, such an IBMS Server 424, 428 may also link to a commerce server or application to invoice as appropriate for such upgrades.

In some embodiments, the IBMS Private Server 424 or IBMS Global Server 428 generates a configuration file or list of configuration settings for any additional IBRs or IBCs or upgraded IBRs or IBCs in view of the overall IBS network deployment and IBMS capabilities described above. In some exemplary embodiments, such a configuration file or list is supplied via email or network connection to an installer of the IBR or IBC for initial deployment provisioning using a console mode terminal either wireline connected to the instant IBR or IBC or wirelessly (i.e. WiFi) connected to the IBR or IBC. Alternatively or additionally, other exemplary embodiments allow network discovery between the instant IBR or IBC being provisioned upon deployment and the IBMS Private Server 424 or IBMS Global Server 428 such that the initial provisioning configuration can be transferred to the IBR or IBC without manual configuration.

Although FIGS. 3-7 and the descriptions thereof herein depict the IBC 408 as a separate network element from that of the IBR 404, this is not an absolute requirement for all embodiments of an IBS 400. In some exemplary embodiments, it may be advantageous to integrate some or all of the IBC functionality described herein within a single physical entity of the IBR 404. Alternatively, in other exemplary embodiments, it may be advantageous to utilize separate physical enclosures respectively for the IBR 404 and IBC 408 such that an IBC physical entity can directly attach to an IBR physical entity without separate mounting or cables. Such IBC/IBR combinations may maintain multiple physical network interface ports for connection to one or more ANs and one or more additional IBRs without combined or attached IBC.

In some IBS deployment scenarios, CBR links may be used in addition to or alternatively to the IBR links shown in FIG. 4. For such situations, certain IBC deployments may serve as a proxy between such a CBR and the IBMS Private Server 424 or IBMS Global Server 428 such that the IBMS Agent in such IBC 408 provides operational parameters for the CBR link regarding throughput or congestion. This optional capability provides additional information to the IBMS Private Server 424 or IBMS Global Server 428 on which to base its recommendations for configurations of IBRs 400 and IBCs 408 within the IBS 400 or to modify policies at such IBRs 404 and IBCs 408. Alternatively, the IBMS Private Server 424 or IBMS Global Server 428 may determine such information and set such operational parameters for either CBRs or other network elements including routers and switches via OpenFlow or other such industry standard network management protocols.

In exemplary IBCs 408, network traffic shaping and classifying is based on policies that may be updated by the IBMS Private Server 424 or IBMS Global Server 428 via the IBMS Agent at the IBC 408 as described above. This is advantageous to the PCN operator because such policies can reflect or enforce provisions of Service Level Agreements (SLAs) for backhaul between certain ANs and elements within the PCN. For example, an SLA may require minimum throughput at all times to or from certain ANs with simultaneous maximum latencies for such traffic for certain traffic types. The IBMS Private Server 424 or IBMS Global Server 428 can translate such SLA requirements to policies that can be set at a given IBC 408 or IBR 404. To the extent that traffic contention occurs at an IBC 408 due to finite switching bandwidth or IBR backhaul capacity, the IBMS Agent may further set policies on the order in which one or more SLA requirements is violated. Similarly, to the extent that spectrum resource contentions in a local geographic area amongst the IBR (or CBR) links under IBMS Private Server 424 or IBMS Global Server 428 management causes one or more SLA requirements to be violated, the order in which traffic is controlled or spectrum access restricted may be set via policies communicated to the IBMS Agents 572, 624 of affected IBCs 408 or IBRs 404. In the above examples, the IBMS Private Server 424 or IBMS Global Server 428 may also set such policies in view of minimizing financial penalties to the PCN operator in situations where SLA requirements are violated.

In exemplary embodiments, the IBS 400 provides redundant backhaul paths from certain ANs 412 to elements within the PCN 416 as depicted, for example, at IBC 408A in FIG. 4. In one example, as shown in FIG. 4, IBC 408A may direct traffic to or from the one or more ANs 412 via redundant IBRs 404 as shown. The instantaneous switching of AN traffic to the two or more IBRs 404 in a redundancy configuration can be set by policies at the IBC 408. The policies can be updated via the IBMS Agent at the IBC 408 in communication with the IBMS Private Server 424 or IBMS Global Server 428. Such policies can include designation of redundancy order amongst multiple IBRs 404 connected to a particular IBC 408 in case an IBC port condition indicates an IBR equipment or link failure or link conditions degraded past a threshold and load balancing parameters amongst available IBR links at an IBC 408. One load balancing strategy that may be deployed via policies at the IBC 408 in communication with IBMS elements is to uniformly distribute all classes of AN traffic amongst available IBRs 404. An alternate load balancing strategy in view of overall IBS operation as determined via the IBMS Private Server 404 or IBMS Global Server 428 and communicated policies to the IBMS Agent 724 of the IBC 408 may be to direct no traffic or only certain classes of traffic to particular IBR links on particular IBC network interface ports. Numerous other redundancy, load balancing, path routing and fail over strategies are also possible.

In certain exemplary embodiments, an IBC 408 may also be directed via IBMS elements to localize traffic amongst ANs 412 using, for example, MPLS. Alternatively, an IBC 408 may be directed to preferentially choose certain MPLS paths or IP routes based on network congestion as communicated to its IBMS Agent based on determination of congestion at either an IBMS Server or other network element from IBMS Agent messages or other method such as Open Flow.

In some embodiments, the IBMS Private Server 424 or IBMS Global Server 428 acts as an RF spectrum coordinator for an IBS 400 within a given geographic region. For example, an exemplary IBMS Private Server 424 or IBMS Public Server 428 with the capabilities described herein may communicate policies or configuration parameters to some or all IBRs 404 in an IBS 400 such that each IBR 404 is directed to use or instructed to favor operation at particular channel frequency, channel bandwidth, antenna selection or overall radiation orientation, or within a maximum transmit power level. Such policies or configuration parameters may be determined at exemplary embodiments of the IBMS Private Server 424 or IBMS Global Server 428 in view of measured data at various IBRs 404 as reported via respective IBMS Agents and alternatively or additionally in view of RF propagation modeling using available database and computing resources. For example, in the exemplary IBS 400 shown in FIG. 4, the RF links between IBRs 404D and 404B and IBRs 404A and 404C may contend for common RF spectrum resources. To the extent that the exemplary IBMS Private Server 424 or IBMS Global Server 428 determines that such contention is not sufficiently mitigated by the affected IBRs 404 under their current policies and configuration parameters in view of, for example, measured data, interference cancellation capabilities, antenna selections, characteristics and orientations, simulated propagation effects, traffic conditions, applicable SLAs, etc., then such exemplary IBMS Private Server 424 or IBMS Global Server 428 may send updated policies or configuration parameters to one or more affected IBRs 404 via their IBMS Agents. In such an example, this may cause such IBRs 404 to use or favor usage of a particular RF channel frequency or sub band of frequencies, to use a different channel bandwidth, to avoid certain antenna selections or orientations, or to restrict operation to a specified maximum transmit power level. In exemplary embodiments, the foregoing process may also consider interference from non IBR users of the same RF spectrum, such as CBRs, or interference to other users of the instant RF spectrum as may be required under certain spectrum regulations.

In some embodiments, the IBMS Private Server 424 or IBMS Global Server 428 acts as a topology coordinator for an IBS 400 within a given geographic region typically in conjunction with RF spectrum coordinator capability described above. For example, an exemplary IBMS Private Server 424 or IBMS Global Server 428 with the capabilities described herein may communicate policies or configuration parameters to some or all IBRs 404 in an IBS 400 such that each IBR 404 is directed to associate or instructed to favor association with certain other designated IBRs 404. Such policies or configuration parameters may be determined at exemplary embodiments of the IBMS Private Server 424 or IBMS Global Server 428 in view of reported traffic flows at certain IBC network interface ports or over certain IBR links, reported link performance metrics at certain IBRs, instant interference and RF spectrum coordination considerations, desired redundancy, failover or load balancing goals, and applicable SLA requirements including, for example, localized network congestion or access cost considerations. For example, in the IBS 400 shown in FIG. 4, IBR 404A is shown as associated with IBR 404C, IBR 404D is shown as associated with IBR 404B, IBR 404E is shown as associated with IBR 404F, and IBR 404K is shown as associated with IBR 404G. However, based on reported measurement data or RF propagation modeling, the IBMS Private Server or IBMS Global Server may also determine that IBRs 404A and 404D can alternatively associate with IBR 404C or 404F, IBR 404E can alternatively associate with IBR 404C or 404G, and IBR 404K can alternatively associate with IBR 404F or IBR 404H. In such potential association scenarios, the exemplary topology coordinator at an IBMS Private Server 424 or IBMS Public Server 428 can change policies or configuration parameters for such IBRs enumerated above in reference to FIG. 4 such that such IBRs are forced to associate differently or given an option to associate differently as a localized decision based on certain adverse network conditions such as interference or link failure.

For embodiments in which the IBMS Private Server 424 or IBMS Global Server 428 acts as a topology coordinator, such capability may also additionally or alternatively extend to IBC internal topology characteristics such as VLAN port mapping, MPLS routing paths, distribution of traffic to redundant IBR links, etc. again in view of desired redundancy, failover or load balancing goals, and applicable SLA requirements including, for example, localized network congestion or access cost considerations.

As described in co-pending U.S. patent application Ser. No. 13/212,036, some IBR embodiments use fixed super frame timing parameters. Particularly for Time Division Duplex (TDD) fixed super frame operation, the relationship between start and end of transmission timing in any given link direction to other such transmissions by other IBR links in nearby geographic proximity can greatly affect both the amount of interference experience by such links and the effectiveness of interference cancellation techniques at receiving IBRs.

In some embodiments, particularly for situations where TDD fixed superframe timing IBR links are deployed, the IBMS Private Server 424 or IBMS Global Server 428 acts as a superframe timing coordinator for an IBS 400 within a given geographic region typically in conjunction with the RF spectrum coordinator and topology coordinator capabilities described above. For example, an exemplary IBMS Private Server 424 or IBMS Global Server 428 with the capabilities described herein may communicate policies or configuration parameters to some or all IBRs 404 in an IBS 400 such that each IBR 404 is directed to use or to favor the use of certain super frame timing parameters such as uplink/downlink duty cycle and super frame timing offset relative to a global timing reference or current local timing reference. Such policies and configuration parameters may be determined at exemplary embodiments of the IBMS Private Server 424 or IBMS Global Server 428 in view of similar considerations described above for the RF spectrum coordinator and topology coordinator capabilities. For example, in the IBS 400 shown in FIG. 4, any IBRs described above as capable of associating with multiple other IBRs, such as IBR 404D can associate with IBRs 404B, 404C or 404F, are likely to also cause meaningful interference at any such IBRs not presently associated with. Thus if co-channel operation is required then advantageously the exemplary superframe timing coordinator capability of an IBMS Private Server 424 or IBMS Global Server 428 would set superframe timing related polices or configuration parameters to minimize the impacts of such interference as measured or calculated. Alternatively or additionally, the superframe timing coordinator capability is invoked in conjunction with the RF spectrum coordinator and topology coordinator capabilities such that if acceptable IBR link performance is deemed unachievable by super frame timing changes then changes to policies or configurations parameters for RF spectrum or topology may be invoked by the IBMS Private Server 424 or IBMS Global Server 428.

Figure 8B:
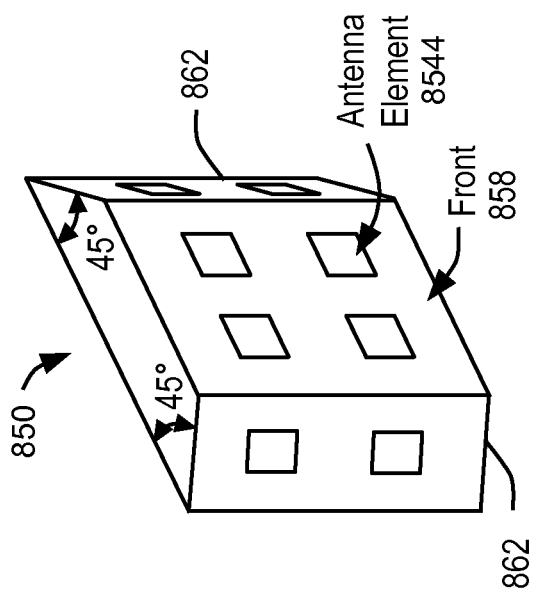
FIG. 8B is a perspective view of an IBR including antenna array geometry according to one embodiment of the invention.
Figure 8A:
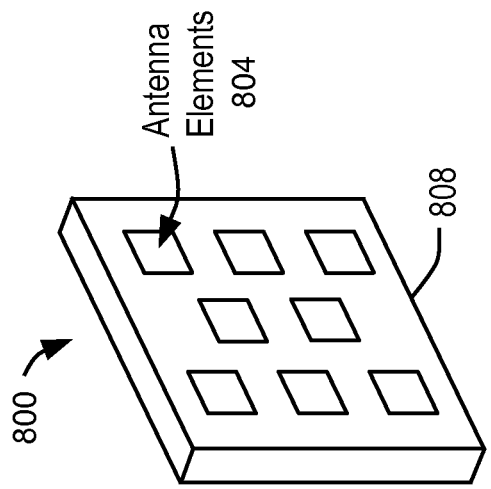
FIG. 8A is a perspective view of an IBR including antenna array geometry according to one embodiment of the invention.

FIG. 8A illustrates an IBR suitable for obstructed LOS PTP operation (or sector-limited PMP operation) in which spatial diversity (and optionally polarization diversity and/or pattern diversity) is utilized to the exclusion of directional diversity. As shown in FIG. 8A, all of the antenna elements 804 are positioned on a front facet 808 of the IBR. In FIG. 8A, the IBR 800 includes eight antenna elements 804 (Q=8). It will be appreciated that the IBR 800 may include less than or more than eight antenna elements 800. Additionally, in some embodiments, a subset of the antenna elements 804 may be used for transmission, while a different subset may be used for reception. Alternatively, some or all of the elements 804 may be used for both transmission and reception.

FIG. 8B illustrates another embodiment of an IBR 850 in which directional diversity is present. IBR 850 includes the same number of antenna elements as the IBR 850 shown in FIG. 8A (Q=8, or 16 if using cross-polarization feeds to all antenna elements). In FIG. 8B, the antenna elements 854 are arranged on a front facet 858 and two side facets 862. In FIG. 8B, the side facets 862 are at a 45° angle in the azimuth relative to the front facet 858. It will be appreciated that this 45° angle is arbitrary and different angles are possible depending on the specific radiation patterns of the various antenna elements. Furthermore, the angle may be adjustable so that the side facets 862 can vary in azimuth angle relative to the front facet between 0° to 90° (any value or range of values between 0° to 90°). Conventional electromechanical fabrication elements may also be used to make the side facing angle dynamically adjustable by using, for example, servo motors. Additionally, variations of the embodiment of FIG. 8B can use more than three facets at different angular spacing all within a nominal azimuthal range of approximately 180°, and the number of antenna elements 854 may be less than or greater than Q=8. For example, in one embodiment, the antenna array includes four facets uniformly distributed in an azimuthal angular range across 160°. Additionally, in some embodiments, a subset of the antenna elements 854 may be used for transmission, while a different subset may be used for reception. Alternatively, some or all of the elements 854 may be used for both transmission and reception.

It will be noted by one skilled in the art the geometrical arrangement of the elements 804, 854 in FIGS. 8A and 8B allow the potential use of transmission and reception beam forming in two dimensions by IBR 800 and IBR 850, which may allow for both vertical and horizontal beam and null steering during both transmit and receive processing.

Figure 9:
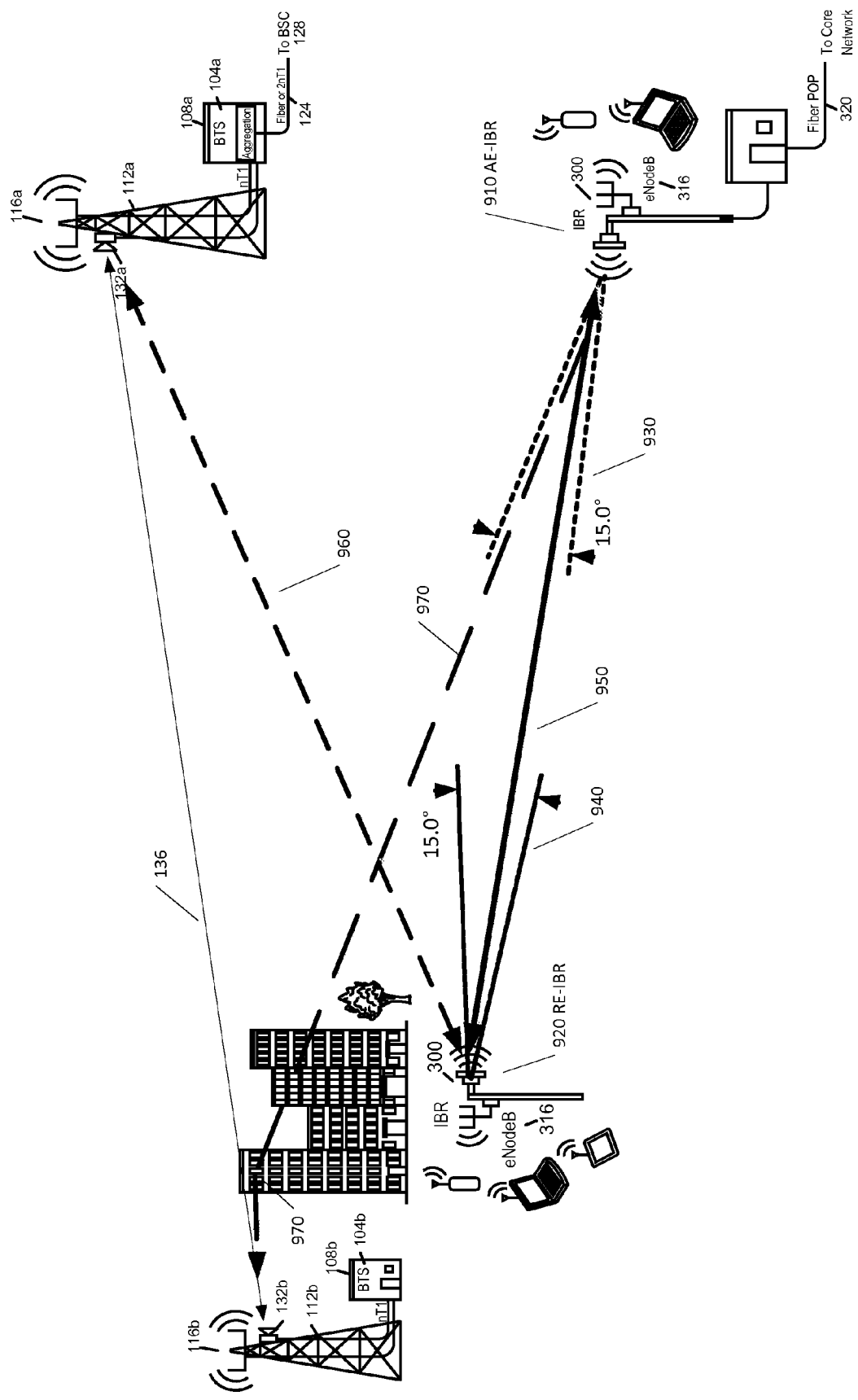
FIG. 9 illustrates exemplary deployment of intelligent backhaul radios (IBRs) deployed for cellular base station backhaul with obstructed LOS in the presence of an existing exemplary deployment of conventional backhaul radios deployed for cellular base station backhaul with unobstructed line of sight (LOS) according to one embodiment of the invention.

FIG. 9 illustrates a deployment scenario according to one embodiment of the invention. Pre-existing CBR 132a utilizes an unobstructed line of sight wireless link 136 to CBR 132b. The CBRs have a relatively narrow beam (e.g., 3 dB width of 2 Degrees in both azimuth and elevation). A tall building 312 is located between CBR 132a and CBR 132b. The building 312 is short enough that it does not adversely impact link 136 because each CBR has a relatively narrow beam.

Figure 12:
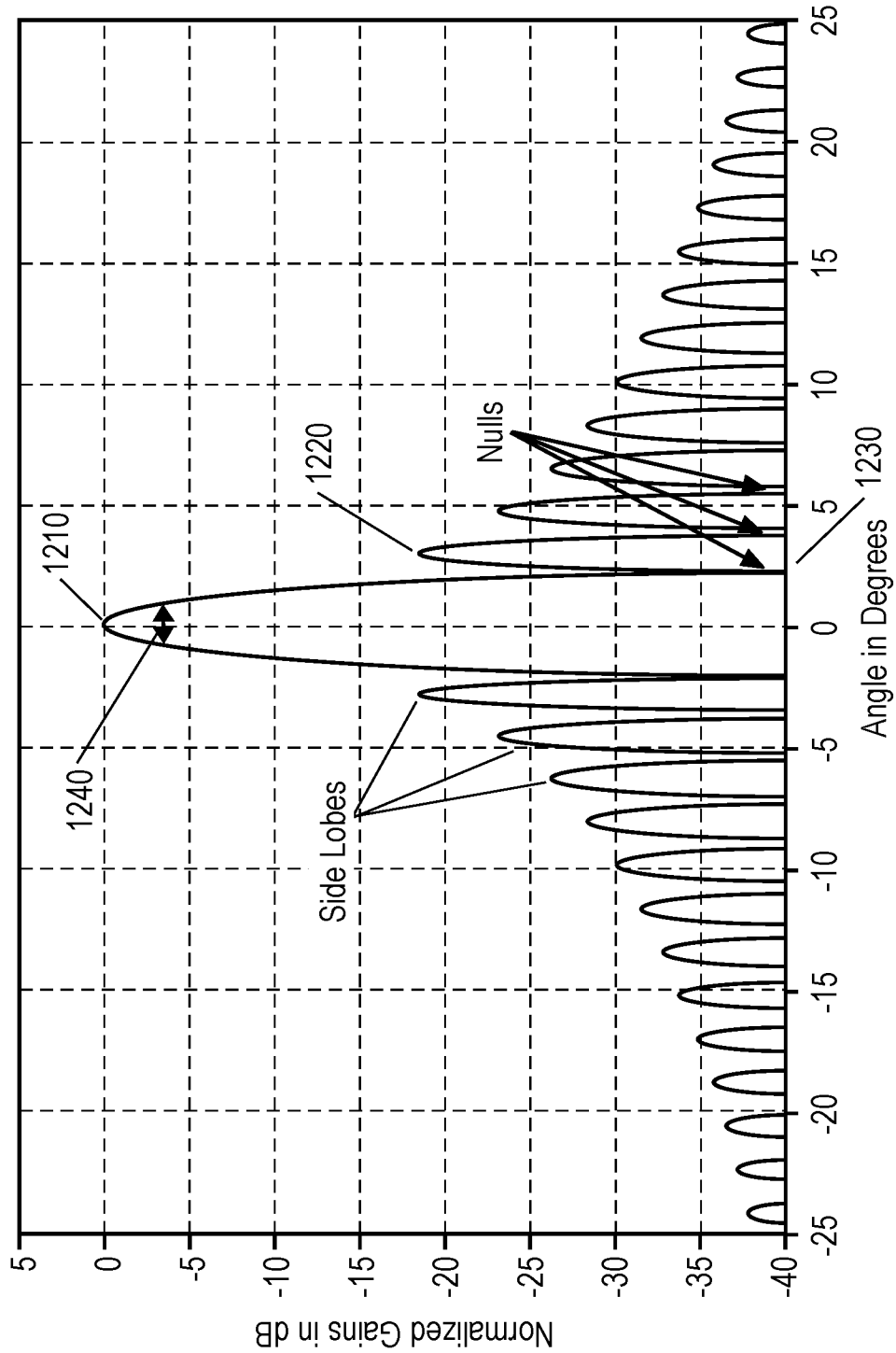
FIG. 12 illustrates a normalized antenna gain relative to an angle from bore utilizing an exemplary antenna system.

FIG. 12 illustrates a CBR antenna pattern having a similar main antenna beam width and other antenna pattern attributes as the CBRs 132a, 132b of FIG. 9. It is relevant to note that while the CBR antenna pattern depicted in FIG. 12 possesses a narrow 3 dB main beam width 1240 relative to the peak gain 1210 in the antenna bore sight direction, there remains the possibility for signal reception from angles beyond the 3 dB beam width points, but with lesser relative antenna gain levels. For example, the gain level at twice the 3 dB beam width may be as significant as −10 dB or −15 dB relative to the main bore sight gain 1210. Furthermore, the gain at side lobe 1220 remains within −20 dB, in this example, relative to the peak bore sight gain 1210, and is located at roughly 3 times the angular distance from the bore sight direction as the 3 dB main beam radius. In contrast, antenna nulls, including nulls 1230, are points where the residual gain from the CBR antenna is at a significant minimum level and are generally interspersed between side lobes or other higher gain portions of the antenna pattern. The antenna pattern depicted in FIG. 12 represents a typical CBR antenna pattern, such as one produced by so called parabolic dishes including, generally, a circularly symmetric antenna gain pattern about the bore sight.

As discussed in additional detail in this disclosure and the co-pending applications previously incorporated by reference, the use of multi-element antenna systems, in some configurations, allows an antenna array's beams, side lobes, and nulls to be advantageously directed. By the advantageous angular placement of an antenna array's main gain lobe, and the placement of lower gain portions of the antenna array's gain pattern in specific other directions, a desired link may be maintained while managing the level of undesired signal transmitted to or received from other transceiving radios (including CBRs) in the area. The antenna arrays may utilize adaptive techniques incorporating transmission null steering or reception null steering approaches. In one embodiment, adaptive antenna array processing, including null steering algorithms, are utilized to allow for the deployment of RE-IBR 920 and AE-IBR 910 of FIG. 9 in the presence of CBRs 132a and 132b so as to not impact the CBRs 132a,b receiver performance by reducing interfering signal levels from each IBR impinging upon the CBR antenna gain patterns.

In one embodiment, the antenna elements 854 (e.g., utilized by IBR 910 and 920) have a 3 dB antenna beam width in elevation (930 and 940, respectively) of 15 degrees and a 3 dB antenna beam width of 30 degrees in azimuth. Such individual antenna pattern radiation patterns may cause interference to deployed CBRs in the geographic area. In one example, the signal transmissions from RE-IBR 920 to CBR 132a via propagation path 960 are received at a sufficient level so as to cause a degradation of the CBR link 136 performance. In another example, a signal transmitted from AE-IBR 910 along a signal propagation path 970 is scattered from building 312 and received in a side lobe of the antenna pattern of CBR 132b at a sufficient level to also impact the CBR to CBR link performance.

In one embodiment, the RE-IBR 920 and AE-IBR 910 utilize a multi-element antenna array such as IBR 850. Such an antenna array configuration allow for spatial array processing. Such spatial array processing may include phased array processing, digital beam forming, transmission null steering, elevation and azimuth beam steering, antenna selection, beam selection, polarization adjustments, MIMO processing techniques, and other antenna pattern modification and spatial processing approaches for both the transmission and reception of signals. It will be appreciated that other antenna array configurations may be used, which have more or fewer antenna elements than IBR 850 and have different geometrical arrangements, polarizations, directional alignments and the like.

Embodiments of the present invention are advantageous because the impact to the CBR link performance can be reduced or eliminated completely while allowing for the deployment of the IBR 910 and IBR 920 in the same geographical region as the CBRs with sufficient inter-IBR link 950 performance. In some embodiments, IBR deployments may be enabled in the same geographical areas and within the same frequency bands, and in further embodiments such deployments may be in a co-channel configuration between CBRs and IBRs, while allowing for sufficient performance between IBR 910 and IBR 920.

Figure 10:
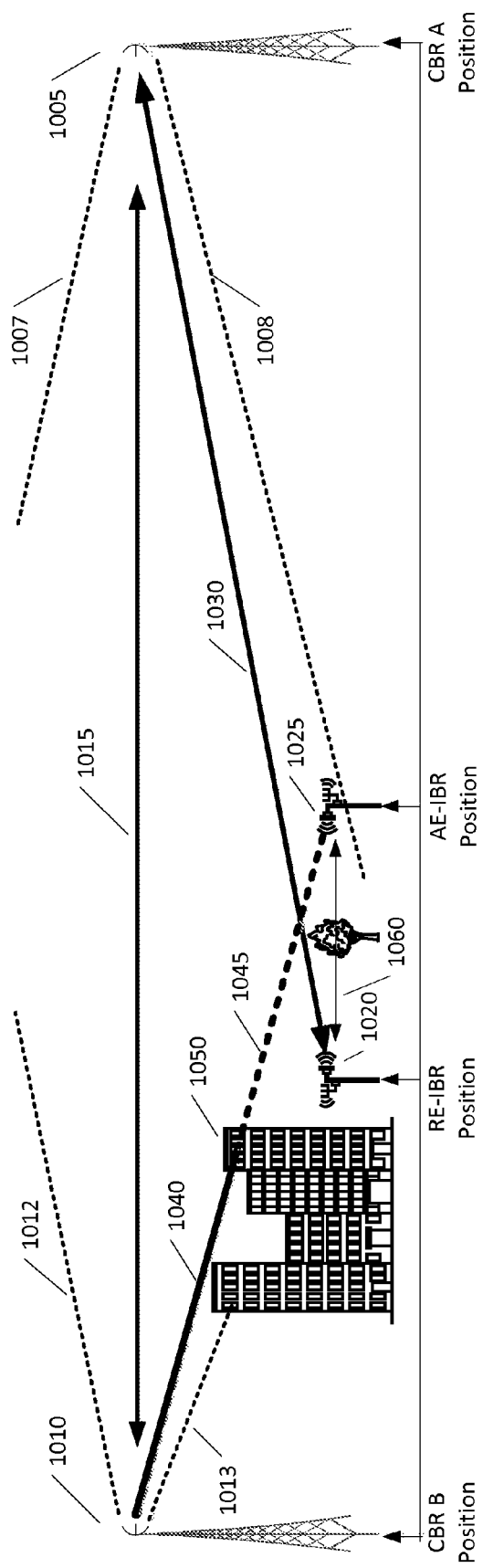
FIG. 10 illustrates an exemplary deployment of intelligent backhaul radios (IBRs) deployed for cellular base station backhaul with obstructed LOS in the presence of an existing exemplary deployment of conventional backhaul radios deployed for cellular base station backhaul with unobstructed line of sight (LOS) according to one embodiment of the invention.
Figure 11:
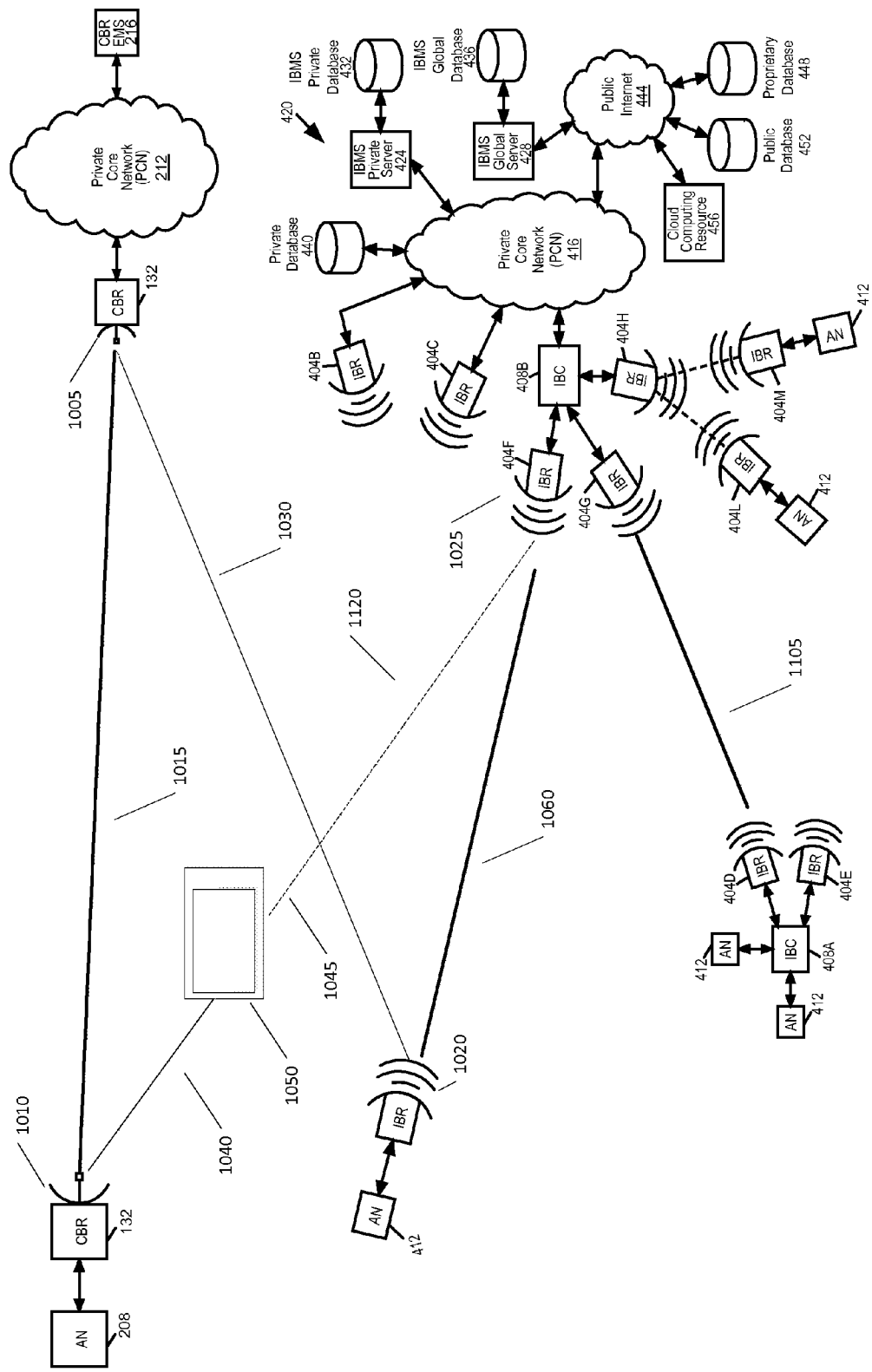
FIG. 11 illustrates an exemplary deployment of an intelligent backhaul system (MS) in the presence of an existing exemplary deployment of conventional backhaul radios according to one embodiment of the invention.

FIGS. 10 and 11 illustrate additional exemplary deployments of IBRs in the presence of CBRs. FIG. 10 is a side perspective view of elements of a deployment embodiment example, and FIG. 11 is a top perspective view of the deployment embodiment. It should also be noted that some geometrical differences exist between FIG. 10 and FIG. 11 to provide illustrative descriptions. Where FIG. 10 and FIG. 11 are in conflict or otherwise are inconsistent, the differences should be considered alternative embodiments.

Intelligent backhaul radios RE-IBR 1020 and AE-IBR 1025 are deployed with configurations as previously discussed in the related embodiments of IBRs 910 and 920. The IBRs 1020 and 1025 are deployed for cellular base station backhaul with obstructed LOS propagation link 1060 according to one embodiment of the invention.

In FIGS. 10 and 11, CBR A 1005 and CBR B 1010 are deployed for cellular base station backhaul with unobstructed line of sight (LOS) propagation link 1015. CBRs 1005 and 1010 are deployed within the same geographical region of the IBRs 1020 and 1025. Each CBR 1005, 1010 includes an antenna pattern, with 3 dB main beam width (1007 and 1012, respectively). Additional properties of CBRs 1005, 1010 are, in one embodiment, the same as those described with respect to CBRs 940 and 930 of FIG. 9.

In the embodiment shown in FIG. 10, antenna elements 854 are utilized by IBR 1020 and 1025 and have a 3 dB antenna beam width in elevation of 15 degrees and a 3 dB antenna beam width of 30 degrees in azimuth. Such individual antenna pattern radiation patterns may cause interference to deployed CBRs in the geographic area. In one example, the signal transmissions from RE-IBR 1020 to CBR 1005 via propagation path 1030 are received at a sufficient level to cause a degradation of performance of the CBR link 1015. In another example, a signal transmitted from AE-IBR 9025 along signal propagation path 1040 and 1045 is scattered and attenuated from building 1050 but has a sufficiently low level so as to not cause performance degradation to CBR 1010 or IBR 1025.

As explained above, in FIG. 10, RE-IBR 1020 and AE-IBR 1025 are deployed for cellular base station backhaul with obstructed LOS propagation link 1060. Additionally, with respect to the present embodiments of FIGS. 10 and 11, RE-IBR 1020 and AE-IBR 1025 utilize a multi-element antenna array, such as antenna array 850. The antenna array 850 allows for various spatial array processing. As described above, such spatial array processing may include phased array processing, digital beam forming, transmission null steering, elevation and azimuth beam steering, antenna selection, beam selection, polarization adjustments, MIMO processing techniques, and other antenna pattern modification and spatial processing approaches for both the transmission and reception of signals. It should be noted the current embodiment is only one configuration, and that other embodiments may utilize more or fewer antenna elements and with varying geometrical arrangements, polarizations, directional alignments and the like.

Embodiments of the invention relate to determination of IBR network parameters and the installation and commissioning process of remote end IBRs (RE-IBRs) and Aggregation End IBRs (AE-IBRs). A detailed process for installing and commissioning the IBRs is described in further detail below with reference to FIG. 14 and FIG. 15. These processes and/or some of the process steps may be may be performed using one more of IBRs and IBCs, the IBMS 420, or elements thereof including IBMS Private Server 424, IBMS Private Database 432, IBMS Global Server 428, IBMS Global Database 432, the Private Database 440, and the processing and storage elements accessible utilizing the public internet such as the Cloud computing resource 456, Public Database 452, and Proprietary Database.

Embodiments of the invention allow for a practical approach to the deployment, monitoring and operation of obstructed non-line of sight systems in the presence of unlicensed or licensed conventional backhaul radios or other licensed services, according to 47 C.F.R. §101, within the same operational bands. Further, such an embodiment allows for the rapid deployment of new backhaul radios configured for co-channel operation with the foregoing systems, including conventional backhaul radio networks and other 47 C.F.R. §101 systems such as Common Carrier Fixed Point to Point Microwave Service and Private Operational Fixed Point-to-Point Microwave Service and associated bands as described in 47 C.F.R. §101.101, and listed in the universal licensing System (ULS) operated by the Federal Communications Commission.

To fully utilize the capabilities of the IBRs and the IBMS, particularly within specific 47 C.F.R. §101 licensed bands, it is advantageous to utilize the IBMS and IBRs to aid in the determination, deployment and management of IBR operational parameters, when IBRs are deployed in the same bands of operation as existing CBRs 1005, 1010 or other radios to which or from which interference is undesirable or forbidden. In some embodiments, such deployments may include the co-channel operation with CBRs 1005, 1010 or other systems including 47 C.F.R. §101 systems, such as Common Carrier Fixed Point to Point Microwave Service and Private Operational Fixed Point-to-Point Microwave Service and associated bands.

During installation or during deployment and operation of the IBRs 1020, 1025, the IBS, IBMS and other public and private network elements may use information stored with one or more network elements to determine or aid in the determination of IBR operational parameters for allowing co-band or co-channel operation with manageable interference impact to and from CBRs 1005, 1010 or other aforementioned services within a geographic zone, or within a known radio frequency propagation distance.

Exemplary IBR operational parameters include but are not limited to: the selection operational frequencies; the modification of transmitter antenna patterns; the modifying or selection of antenna polarization or spatial patterns; the selection of specific antennas from a set of available antennas; the selection of transmission nulls, reducing the interference impinging upon other systems; the selection of receiving or transmission digital beam forming weights, or algorithmic beam forming constraints; the physical movement, placement, alignment, or augmentation of one or more antenna elements, or antenna arrays by electrical, or electromechanical control or by a request for manual adjustment or augmentation during or after installation; and the modification of transmission power; and the selection of interference margin values for the reduction of the risk in interfering existing systems.

In one embodiment, the determination of the IBR operational parameters is performed utilizing an algorithm based at least in part on the location of the CBRs 1005, 1010 and radiation parameters. This information may be stored in the Universal Licensing System (ULS) operated by the Federal Communications Commission (FCC), or on other public or private databases. In one embodiment, ULS information and associated radiation parameters in combination with radio frequency propagation models are utilized to determine the level to which operation of an IBR, under various IBR operational parameters would interfere with one or more licensed 47 C.F.R. §101 services, including Common Carrier Fixed Point to Point Microwave Service and Private Operational Fixed Point-to-Point Microwave Service within FCC designated bands. In another embodiment, reports of received signal are provided by IBRs, possibly in combination with existing IBR operational parameters, to the IBMS for use in IBR operational parameter determination. Such reports may be stored by the IBMS and used alone or in combination with CBR radiation parameter information from public or private databases to perform IBR operational parameter selection.

Further embodiments may include an iterative method. For example, the IBRs may report received spectral measurements and configuration parameters to the IBMS, which performs selection of some or all for the operation parameters, and passing the parameters to respective IBRs. The IBRs may then perform additional or refined scanning, or initial operation, prior to the determination of the IBR operational parameters.

In one embodiment, the remote end IBR (RE-IBR) is configured to operate with the aggregation end IBR (AE-IBR) on one or more frequency channels which are co-channel with a TDD CBR. In this embodiment, the AE-IBR has a wired Ethernet connection to the IMBS. The RE-IBR connects to the IBMS utilizing an out of band data link in the form of a cellular data link during configuration, which may be a mobile phone with a Wi-Fi connection to the RE-IBR (i.e., the phone is acting as a mobile hot spot) or utilizing a Wi-Fi direct connection. Upon initiating the configuration process in this embodiment, the respective IBRs perform a scan of their receive channels to detect existing CBRs. The IBRs then report their respective antenna configurations and scan results to the IMBS. The IMBS, in one embodiment, will determine, assuming another channel may not be used, the level of interference the CBR will receive. The interference may be determined utilizing IBR effective antenna pattern adjustments and, optionally, associated information retrieved from a data base of CBR parameters. In some embodiments, the effective antenna pattern adjustment include the use of transmission beam nulling from the required one or more IBRs to further reduce the interference levels which may be received at the CBR, while maintaining a minimum required performance between the respective IBRs. In one embodiment, an interference margin is also calculated. The interference margin is used as an additional reduction of the required interference to the target CBR. The interference margin may be based on a fixed amount, a level of uncertainty of the predicted interference, an amount based upon the reliability or predicted accuracy of interference calculations, or based upon using or the availability of, or specific values of CBR antenna and operating transmission parameters retrieved from a database.

In some embodiments, the RE-IBRs and AE-IBRs may operate on channels for which no interference is detected, but are within a predetermined distance of CBRs. The distance is determined based on the geographic location of the IBRs and the CBRs. The location of the CBRs may be determined by accessing, for example, the FCC (ULS) database. In such situations, an interference margin value or other operational constraint value may be utilized by the IBMS based upon propagation models, to further reduce the likelihood of interfering with the CBR.

In some embodiments, co-existence of the IBRs with FDD CBRs may be required. In these embodiments, interference margins or operational transmission constraints, including transmission beam nulling, may need to be calculated. For example, in one embodiment, the selection of the transmission antennas to utilize for receive during a scan procedure during configuration may allow for enhancement of transmit beam forming and transmit nulling operations and may further aid in the determination of values related to transmission beam nulling.

In some embodiments, received signals transmitted from a CBR 1005 operating in FDD are detected during a scan procedure at an IBR 1020. However, the IBR to IBR link, in one deployment, is configured to operate on the specific FDD paired frequency co-channel used for receiving by the FDD CBR 1005 as determined the IMBS 420 and FCC data base records in a public data base 452. In this embodiment, transmission beam nulling weighs for the CBR 1005 receiving channel (uplink paired channel used by CBR 1005 for receiving from CBR 1010) or other transmission constraints may be determined based upon the received signals at the IBR 1020 in the paired (downlink paired channel as used by CBR 1005 to transmit to CBR 1010) channel, despite the frequency difference for the transmission channel. Such calculations may utilize propagation modeling to determine interference levels, reported measurements by the IBR to determine the level of frequency flat fading, and data base values related to CBR parameters. These calculations involve a constrained transmission beam forming calculation for example, including an interference margin based at least in part upon the determined level of flat fading of the scanned signal on the paired band, in this embodiment.

Embodiments of the invention allow for IBR network parameters to be selected to avoid co-channel operation with CBRs. In embodiments where co-channel operation between the IBRs and CBRs is not avoided or is required, the impact on link performance to the CBR 1010 and from CBR 1005 can be reduced or eliminated completely while allowing for the deployment of the IBR 1020 and IBR 1025 in the same geographical region with sufficient inter-IBR link 1060 performance. In some embodiments, the IBRs may be deployed in the same geographical areas and within the same frequency bands as CBRs. In some embodiments, the IBRs and CBRs may be deployed in a co-channel configuration, while still allowing for sufficient performance between IBR 1020 and IBR 1025.

FIG. 13A is a table of a partial listing for the frequency availability for specific radio services. The listing is replicated from 47 C.F.R. §101.101. In FIG. 13A, frequency band 1305 is listed as operating from 3700 MHz to 4200 MHz. Frequency band 1305 is available for CC (Common Carrier Fixed Point-to-Point Microwave Service) and OFS (Private Operational Fixed Point-to-Point Microwave Service).

Figure 13B:
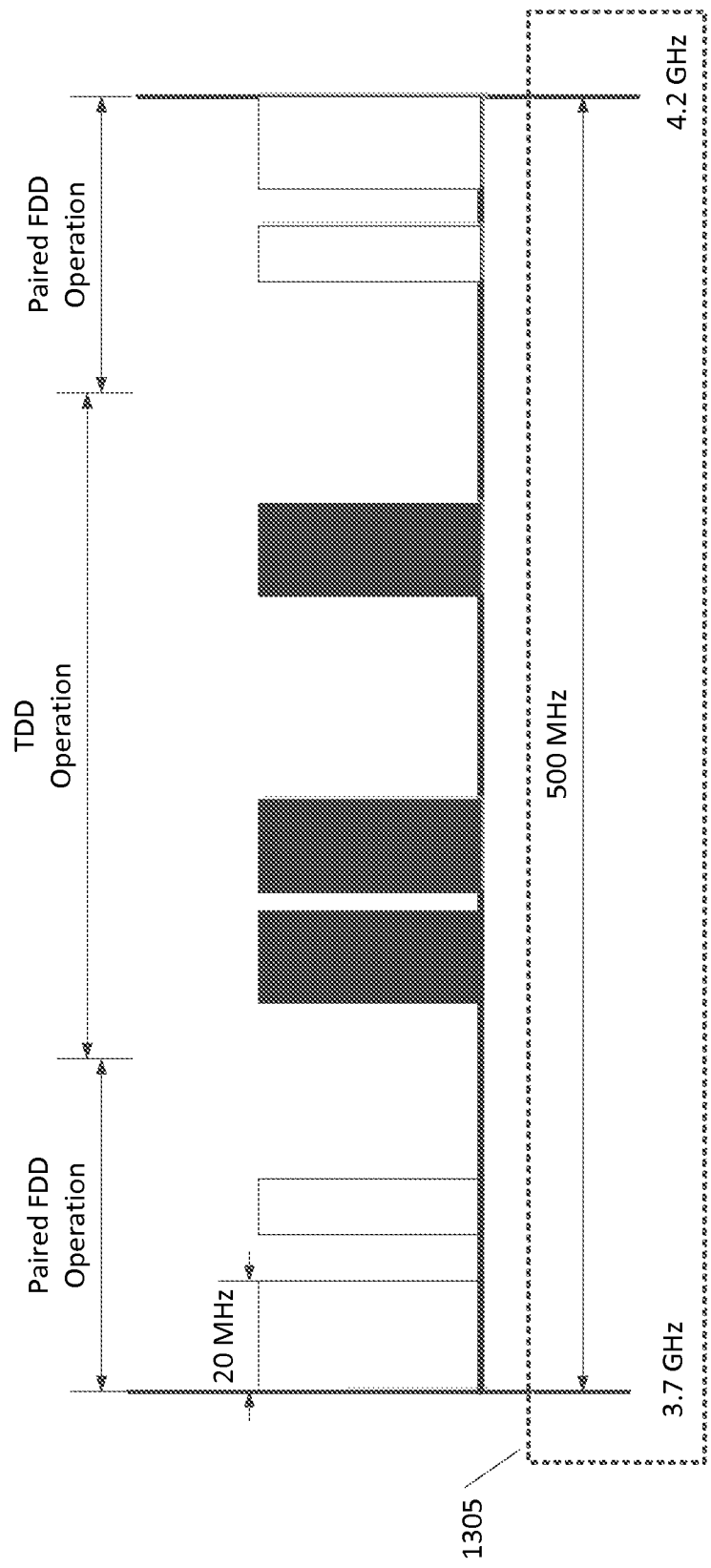
FIG. 13B illustrates an exemplary deployment for occupancy of services in the 3700 to 4200 MHZ frequency band for conventional cellular backhaul radios or other services as licensed under 47 C.F.R. §101 and listed in the FCC Universal Licensing System.

FIG. 13B is an illustration of an exemplary deployment for occupancy of services in the 3700 to 4200 MHZ frequency band 1305 for conventional cellular backhaul radios or other services as licensed under 47 C.F.R. §101 and listed online in the FCC Universal Licensing System. The services deployed within this band may be time division duplex (TDD) or frequency division duplexed (FDD). FDD systems utilize separate frequency channels for receiving and transmitted signals to each radio, as shown in FIG. 13B. TDD systems utilize a single frequency channel and alternate receiving and transmission with the radio to which they are communicating, allowing for the deployment of such services in the center of the operational band, as shown in FIG. 13B.

Figure 14:
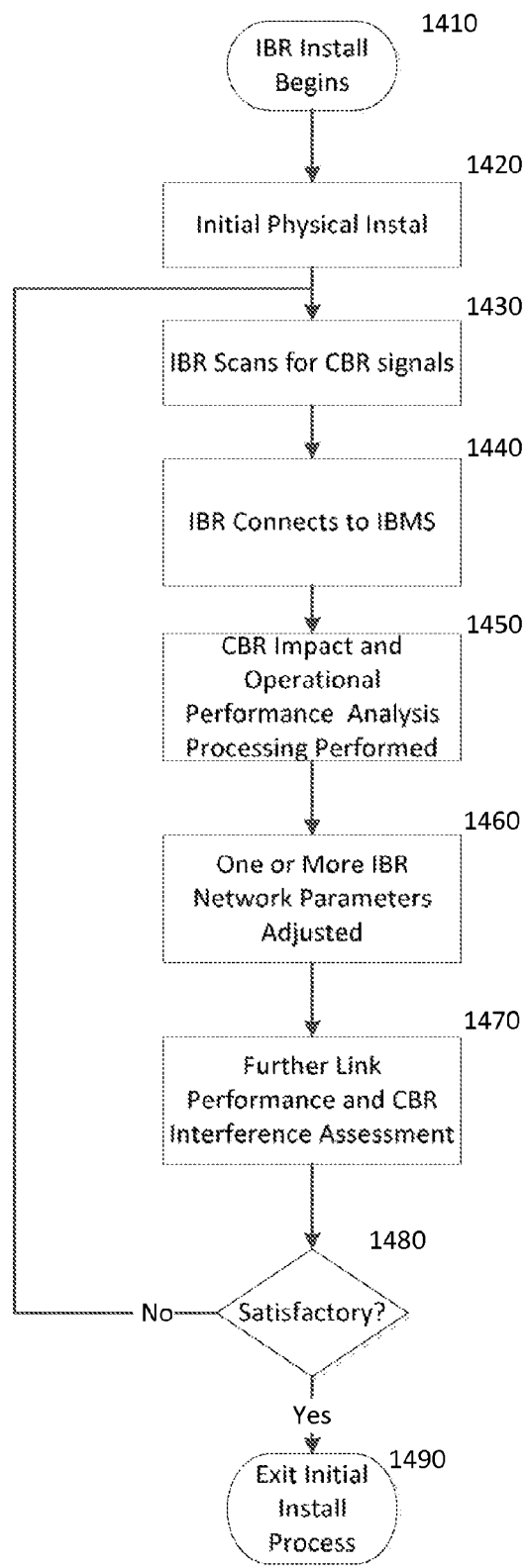
FIG. 14 is a flow chart illustrating an IBR installation process according to one embodiment of the present invention.

FIG. 14 is a flow chart showing a process of installing an IBR according to one embodiment of the present invention. It will be appreciated that the process described below is merely exemplary and may include a fewer or greater number of steps, and that the order of at least some of the steps may vary from that described below.

The installation process may be used for a point to point or a point to multipoint configuration. In some embodiments, the point to multipoint configuration includes multiple point to point configurations which are connected utilizing the IBS. In other embodiments, the digital beam forming capability of the IBRs allows for the same physical antenna array to be used in a multi-user MIMO or spatial division multiplexing (SDM) approach to support multiple point to point links. In yet other embodiments, point to multipoint links may be supported utilizing a time division multiplexed (TDM) approach, or utilizing frequency division multiplexing (FDM) on a per carrier or sub carrier (OFDMA) approach.

Each of the point to point multiplexing approaches described herein may be used together or in combination to allow for the support of point to point and point to multipoint links in various embodiments, and are supported by the current and alternative embodiments of the process described herein with respect to FIG. 14.

The installation process begins at step 1420. At step 1420, a course alignment of RE-IBR 1020 of the line of sight or obstructed line of sight path 1060 to the AE-IBR 1025 to within some angular tolerance (e.g., +/−10 degrees) is performed. This alignment is typically within the antenna pattern of the elements of the instant IBR (e.g., the 3 dB antenna gain pattern of antenna elements 854 on the front 858 of IBR 850). The course alignment may be physically refined (manually, electro-mechanically), and may be further electronically refined using antenna beam steering approaches, at later steps as described hereinafter. The physical alignment may also be aided by an electronic compass and an application utilizing the geographical knowledge of the instant IBR being installed and one or more IBRs to which a pint to point link is to be established. The application may be executed and configuration files or other information distributed locally or remotely by or between any IBS or IBMS network element as discussed with respect to the generation configuration files previously described with respect to FIG. 4. The electronic compass may be integrated with the IBR, or reside within an installation assisting device. The installation assisting device may be a console mode terminal, mobile communications device, smartphone, tablet, handset or the like and be linked to the IBC or IBR using a Wi-Fi link, a wired cable, or cellular data link.

In some embodiments, the installation assisting device may utilize a cellular data connection to connect with the IBMS or other network elements and to facilitate communication to perform the steps of the processes described with reference to FIG. 14 and FIG. 15. In one embodiment, the installation assisting device is connected to the IBR utilizing Bluetooth or Wi-Fi, and connects to the IMBS utilizing a 3G, 4G or other wireless communication link. Embodiments utilizing such communications may act as a conduit by which the IBR is able to communicate with elements of the IBMS or other required network elements.

The installation assisting device may further be mechanically mountable to the IBR antenna array in some embodiments to allow for the use of an integrated compass in registration to the antenna array bore sight angle. Such an arrangement, in various embodiments, may be utilized alone, or in combination with another installation assisting device, each integrated with or separate, but in communication with a respective IBR, allowing for the course alignment of one more IBRs. Communications by and between the installation assisting devices may be direct or may be the result of interacting with other network elements of the IBS and/or IBMS.

In some embodiments, the IBR may make use of a cellular data link by way of the installation assisting device or an integrated cellular device. The cellular device may also be operable to interface to the IBR currently being installed for the continual monitoring or configuration of various parameters on an ongoing basis. The specific functions of an installation assisting device and cellular device may further be integrated into specific IBRs.

When deploying an IBR in a band and location where no interference to existing CBRs is possible, mechanical or other alignment may further be performed utilizing training signals transmitted by one or both of the IBRs. When deploying in a band where CBRs may be possible, precautions must be taken to ensure there is no interference with the CBRs. The determination of the existence of CBRs may be performed utilizing a connection to elements of the IBMS as will be described in further detail below. However, in some embodiments, a provisional interference assessment determination may be made in step 1420. Course alignment signals may be used if no interference is possible to the existing CBRs within one or more specific frequency channels based on this provisional interference assessment. In some embodiments, a "safe" lower power transmission at a lower data rate may be used to further ensure acceptable risk of interference with existing CBRs. Safe transmissions may be signals with a lower data rate or no data at all (e.g., pilot signal or symbols), allowing for significantly lower transmission power. The signals may additionally include channel sounding symbols, so as to later aid in the refinement of link performance and interference assessment. For example, in the case of MIMO or MISO transmissions, successive symbols covered by an orthogonal code as used within IEEE802.11n, differing OFDMA pilot symbols from each transmit antenna, Walsh or Zadoff-Chu sequences, and the like may be used.

Information received from such sounding signals may be used to evaluate the diversity benefit of a physical positioning of an IBR antenna array, such as those discussed previously, including the order of the spatial channel matrix between the two IBRs. Such information may be used within any of the current and subsequent steps to aid in physical alignment, or configuration or selection of specific antenna elements as being used to receive, transmit or both, and including various polarizations.

In some embodiments, the most optimal course or fine physical alignment may not be aligned with or near the bore sight angle as discussed previously. Use of sounding signals allows for a more optimal diversity or channel capacity alignment. Additionally, sounding or training signals may be used to evaluate the potential performance of a specific physical alignment in the presence of an interferer which may be impactful to the performance of the IBR links. Such evaluation may result, in some cases, in an IBR alignment which is neither the near bore sight alignment, nor the highest propagation based capacity (highest order spatial channel matrix) between the two IBRs. In some embodiments, a more optimal alignment will take into account the desire to not interfere with or to not be impacted by interference from existing radio links (such as CBRs or other links) based on scanning for received signals or based upon database calculations, or both.

Such sounding or training signals, in some embodiments, may be permitted to be utilized if it is determined that no CBRs are in the area and potentially impacted based upon such transmissions at specific levels. The transmission levels of such training signals may be adjusted based upon a calculated propagation distance, or a fixed distance from one or both of the IBRs, or a frequency separation between the frequencies being sounded, and the operating channels of the CBRs as optionally retrieved from a database.

A physical adjustment of the initial alignment may be determined to be desirable if a better alignment is possible or if only a significantly compromised operation of a IBR to IBR link (e.g., link 1060) is possible. Such adjustments may be requested to be made manually by the installer, in some embodiments utilizing the installation assisting device, email, sms, chat, or the like. In other embodiments, physical adjustments made be made using a control signal to effect a mechanical adjustment, utilizing an electromechanical approach such as a servo motor, a motorized screw turn, or the like as are known in the industry.

Various embodiments of the preceding physical installation, course and fine alignment process may be used in any combination together or separately in step 1420 or other steps including step 1460 wherein one or more IBR network parameters are adjusted including physical parameters such as antenna placements and alignment. Aspects of the preceding embodiments may also be used during step 1470, such as the performing RF channel scanning for CBRs, the use of channel sounding and alignment signals including "safe" alignment signals when in the potential or actual presence of CBR links or interferers, or for the determination of the satisfactory performance of the currently set IBR network parameters. Adjustment to the antenna array placement IBR network parameters may further include adjustments in elevations, azimuth, polarization, physical configuration or antenna elements, addition, removal, or re-placement of operational transceivers or associated antenna elements collateral to the integrated antenna arrays of IBR electrical down tilt. One such electrically controllable down tilt product on the market is the Andrew Teletilt RET system (http://www.commscope.com/andrew/eng/product/antennas/teletilt/index.html>). Other products may perform electrical or manual adjustments to the azimuth pattern of the antenna elements or pattern. It will be appreciated that some of the antenna alignment parameters are not dynamically adjustable; instead, the parameters are static or semi-static parameters, which are generally static and set at installation, or, optionally, reconfiguration.

Upon completion of the initial Physical Installation step 1420, the process continues to step 1430. At step 1430, the instant IBR performs scans for received signals within the bands of interest. Such signals may include specific signals from CBRs or other §101 licensed radio links, or may additionally include detection of other non-CBR or §101 licensed links, such as other IBRs or other radios in the band operated. The scans performed by the IBR being installed, or other IBRs by tuning their receivers to one or more of the desired operating frequencies within one or more bands. The scans may include varying bandwidths, or bandwidth specific to the detection of specific signals of interest. The scans may further utilize generic detection approaches including simple power detection, or RSSI, or detection techniques specific to signals of interest such as preamble, pilot tone, pilot symbol, training symbol, periodicity, or symbol rate correlations or properties. Additionally, potential guard channels, frame rates, duplexing properties, modulation formats or other system configuration features of known signals may be exploited during or subsequent to the scans to perform detection or identification of CBRS or other radios, including other IBRs. Scans may additionally monitor varying bandwidths and signal channel widths as configured in embodiments. In other embodiments, a priori known signal types and known or typical signal attributes may be specifically searched for, or utilized to aid in the search and detection process, or generic signals or both may be searched for within the scan. Such a priori signal attributes, as discussed above, may further include techniques specific to waveforms, or may simply detect power levels in a band.

If available, scans may use information of possible interferers stored or provided to the IBR or configuration device potentially using a data link to query an FCC data base or IBMS, or other database, or even a locally stored database. Such steps will be further described in step 1440, and may be performed jointly, separately, or interactively and iteratively between scan step 1430 and IBR to IBMS connection step 1440, in various embodiments. When data of possible interferers or CBRs is known to the IBR, or types of possible signals are known to the IBR, differing types of scans may depend upon the expected signals within the area being FDD or TDD, or the known attributes of the signal including bandwidths, and typical or known channels or operation of sites within a specific range, or potential signal propagation distance.

In some embodiments, an initial preliminary and more course scan may be performed, and additional scans may be performed later based upon interactions with the IBMS and/or external databases.

Following the completion of the scanning process, or a part of a scanning assignment, a report may be prepared with the findings of the scans included. Such data may be stored locally as a table or other structure. Such report or data may be sent to other devices or networks nodes.

The scan reports may include additional data, such as, for example, current IBR or IBC configuration parameters, including antenna, or alignment parameters, location, radio configuration, firmware revisions, and the like.

In some embodiments, the reports contain RF environmental parameters including but not limited to: received power levels, spectrum analysis results, frequencies with receiver power levels, angle of arrive vs received power levels, lists of detected signals or a list of frequencies or identifier signals with one or more associated signal RF parameters. Examples of the associated signal RF parameters on a per frequency or signal basis include but are not limited to: bandwidth, power level, angle of arrival, power levels verses time, antenna weights used for receiving or nulling the signal, time domain samples of the signal received on each of a number of the IBR antennas, frequency domain data vs time, RF channels, and the like.

The data may be stored locally and initial reports and/or data sent to the IBMS. Optionally, additional reports and/or data may be sent in response to requests for specific additional data to conserve time and/or data bandwidth.

The process continues at step 1440. At step 1440, the IBR utilizes a data link to connect to another network element and performs a query to the node, or requests processing from the node. In one embodiment, the node is within the IMBS. The data link may be internal to the IBR, or it may be an external link (e.g., installation assisting device or other cellular data device). As such, the data link may be permanently available to the IBR, or may be available temporarily during installation only. In other embodiments, the data link may be initially a separate cellular data link in a first query, and then be a link utilizing a connection to another IBR as an in band of operation overhead messaging embodiment.

As discussed previously, the "safe" alignment signal may also include a data link component allowing for such connections and potentially operating as the IBR to IBR data link with conservative parameters allowing for lower data rates, and reduced risk of interference until such a time as additional processing may be performed. It will be appreciated that additional scanning steps and/or other processing steps for further link optimization may be performed.

In some embodiments, the node is a public or private data base, or other computing resource which may comprise a cloud computing resource. In other embodiments, a database query is performed and data returned to the IBR or other resource local to the IBR to perform processing in combination with the scan results.

At step 1440, the IBMS receives a scan result from the IBR, and stores the data in a database. The IBR may also provide information about the IBR itself, including, for example, the location of installation of the IBR, angle and azimuth of initial or current antenna array placement, types of antennas (antenna configuration, and patterns in elevation and azimuth), operational frequency capabilities, firmware revisions, sensitivity of receivers, receiver selectivity, transmitter spectrum, transmitter and receiver beam steering or nulling capabilities, radio transmission power capabilities and adjustment ranges, and the like.

Prior to step 1450, in some embodiments, the IBMS may collect further information. In these embodiments, the IBMS performs or requests a combination of processing steps and database queries (both or either internal or external to the IBMS). Such queries may include private or public databases, and include data associated with 47 C.F.R. §101 licensed radios, and associated links, including CBRs. In some embodiments, the database is the public FCC database which includes, for example: parameters of CBRs or other operating radio links. The parameters may be stored in the FCC Universal Licensing System and associated with Common Carrier Fixed Point to Point Microwave Service.

In one embodiment, the information collected by the IBMS includes, for example: the location of transmitter and/or receiver (lat/long), bore sight angle (magnetic or true north) of any directional antennas including fixed dish antennas typical, maximum transmit power, typical transmit power, frequencies of operation, height, size, gain, or radius of antennas or other key operation parameters of the antennas, modulation format, receiver sensitivity, equipment in use at the site, frequencies of operation, channel bandwidths, duplexing method (TDD vs FDD or other future approaches) and, any other or substitute parameters required for signal propagation analysis.

In some embodiments, steps 1420, 1430, and 1440 may be modified in order, combined in various manners, or performed jointly or iteratively, so as to facilitate the additional embodiments and efficiencies.

The process continues at step 1450. At step 1450, CBR Impact and Operational Performance Analysis Processing is performed. In one embodiment, the IBMS (either directly or using other computing resources) determines the best channels of sufficient bandwidth, resulting in desired performance while not interfering with existing CBRs. In other embodiments, the processing may be performed jointly with the IBR, or local to the IBR alone. In some embodiments, the CBR impact and performance analysis utilizes data required to perform a signal propagation analysis utilizing one or more of the parameters retrieved from the data base relegated to 47 C.F.R. §101 fixed microwave point to point services or other wireless stations, antenna configuration, and patterns in elevation and azimuth, and any of the aforementioned other parameters having been received by the IMBS or collected by the IBRs in the IBS.

In some embodiments, the processing may include performing propagation analysis based on the IBR parameters, the scan result(s), and/or the contents of the database(s). Additionally, the IMBS may include stored results from other scans performed by other IBRs within the IBS. The CBR parameters and the parameters associated with the IBR being installed are used in the processing modeling steps. The collective data and processing allows for signal propagation analysis. In some embodiments, the analysis allows for the prediction of the level of interference which the CBRs will receive, and the performance between the obstructed line of sight link between the instant IBR being installed, and the respective IBR participating in the link. In some embodiments, the processing includes incorporation of the capabilities of the respective IBRs, including their respective operational frequencies, receiver sensitivity, antenna configuration, and patterns in elevation and azimuth. Further, the propagation analysis may be utilized to determine the impact of IBR transmissions on existing CBRs with specific IBR transmission antenna patterns, frequencies of operation, transmit beam nulling from the IBRs. The knowledge of the type of CBRs deployed (e.g., FDD vs. TDD) in combination with the scans allows for operational interference margins to be utilized to ensure low risk of impact to CBRs. The operational interference margin is utilized to constrain operational parameters of the respective IBRs such as, for example, power transmitted at a specific frequency channel, in a specific direction. The constraints may be directly provided to the IBR, or be utilized in the development of the IBR parameters for use by the IBRs.

Figure 15:
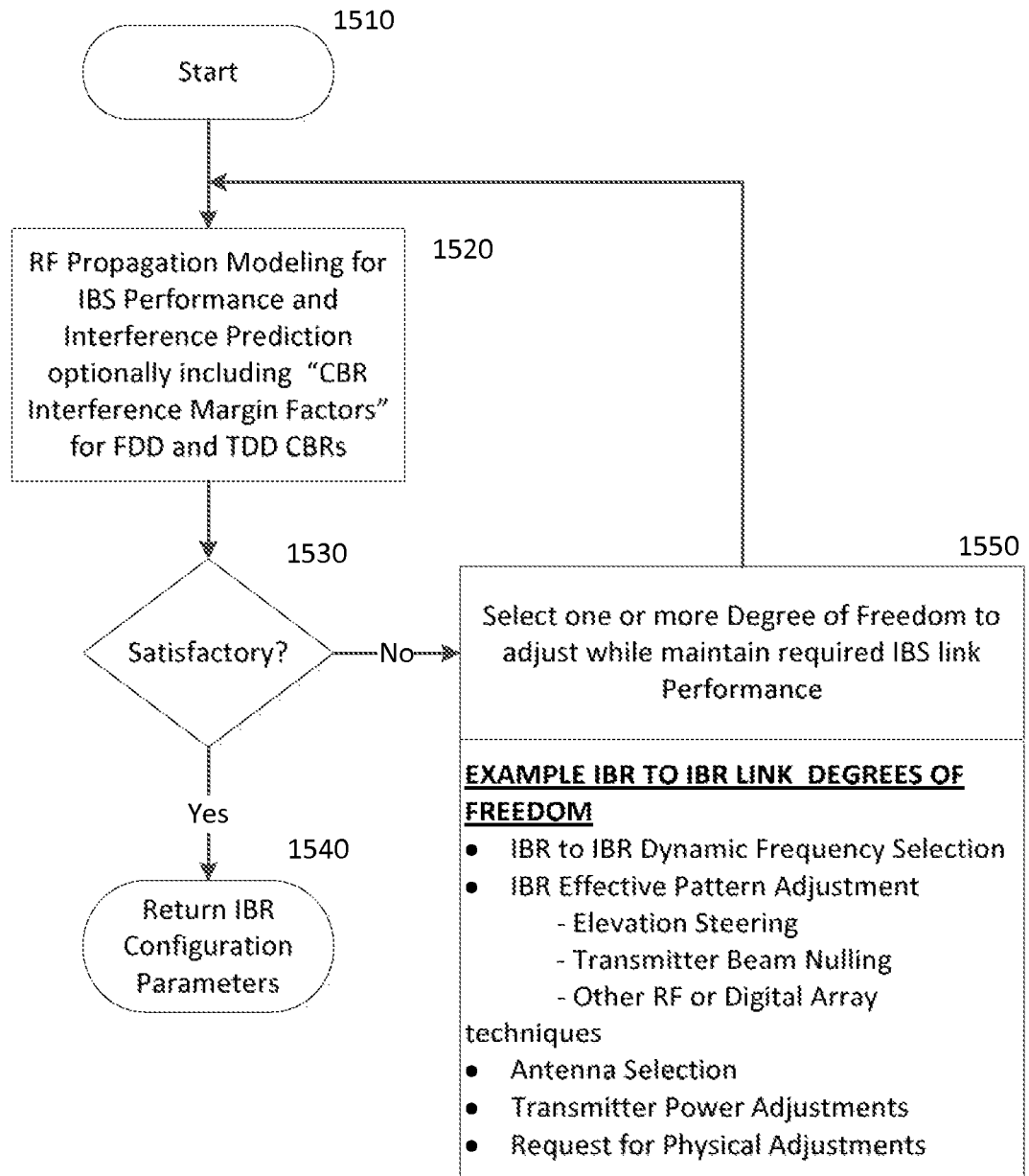
FIG. 15 is a flow chart illustrating selection of IBR configuration parameters according to one embodiment of the present invention.

FIG. 15 illustrates further details of the process of steps 1450 and 1460. In particular, the process of FIG. 15 allows for the adjustment of IBR network parameters such that degrees of freedom of IBRs are utilized to mitigate the impact to existing CBRs and interference from any existing other radios, and ensure satisfactory performance of the obstructed or unobstructed line of sight IBR point to point or point to multipoint links. Additional details will be discussed in further detail with reference to FIG. 15.

The degrees of freedom may be adjusted utilizing transmittable IBR parameters or configuration settings. In one embodiment, manual adjustment the IBR configuration may be requested, if the modeling algorithms determine that the configurable degrees of freedom (e.g., frequency channels of operation, transmitter beam former nulling, and antenna selection) have been exhausted and the link performance is not sufficient. Such adjustments, as previously described, may be performed by electromechanical approaches or as a physical adjustment by the installer or technician. Additionally, during installation, adjustment by a servo motor or other motorized approach may be performed by a temporarily installed adjustment device, including such motorized adjustment capabilities, and reusable during other installations. In such an embodiment, a permanently installed adjustable bracket may be used, and secured so as to securely fix any further movement of the antenna array, prior to removal of the temporary adjustment device.

Further manual IBR degrees of freedom modification requests may include an installation of additional transceivers of the IBR to allow for additional transmitter nulling degrees of freedom to create sufficient nulling capability. In one embodiment, the additional one or more transmitters may be integrated together with the IBR within a panel such as 858 or 862. In other embodiments, one or more additional transmitters may be separate from the IBR panels and adjusted in another direction allowing for new "sub array" processing, or additional nulling capability in a new azimuth, elevation, or frequency.

In other embodiments, the additional degrees of freedom may be created by the addition or relocation of transceivers or receivers. In embodiments where new or adjusted receiver capability degrees of freedom are provided, additional immunity to the interference from other radios is possible, or an increase in the performance of the point to point IBR link is possible in same or other embodiments. Algorithmic parameters as used in receive or transmitter beam forming techniques are further described in co-pending patent application Ser. No. 13/212,036, entitled Intelligent Backhaul Radio, incorporated herein by reference and further detailed in relation to FIG. 15.

With reference back to FIG. 14, the process continues at step 1460. At step 1460, the IBR network parameters are provided to the respective IBRs utilizing any of the previously described approaches in various embodiments (e.g., using a separate cellular data link providing connectivity between an installation assisting device the IBMS and the instant IBR, or an existing data link between the instant IBR and the IBMS via an IBC). The IBR makes adjustments based on the IBR network parameters received from the IBMS.

The process continues at step 1470. Step 1470 is similar to step 1420 in that a scan is performed. The scan of step 1470 may be a scan with modified scanning parameters to provide more detail related to a signal of interest such as detected in a previous scan, by another IBR, or as a predicted CBR from the database or other approaches providing data known to the IBMS. The IBMS may request that the scanning parameters be modified to provide more detail related to a signal of interest such as a detected or predicted CBR from the database or other scans known to the IBMS.

In some embodiments, the IBR may perform rescanning, sounding, or other attributed assessment techniques as a result of physical adjustments made to the configuration of an IBR, relative to antenna positioning, repositioning, addition or removal, as required. In the case where a physical reconfiguration of an IBR due to a readjustment or other modification of antenna positioning the scans may be limited and more details to a specific frequency range, angular range, azimuth range, or other scanning dimensions. Other reconfigurations may be required to increase the degrees of freedom within the operating environment result in the need for additional scans.

In some embodiments, transmission of a signal may be used to aid in the determination of the link performance between respective IBRs, including any specific transmission beam form nulling constraints required by the environment. Such transmission provides input to step 1480. Examples of the test transmission signals include an estimation signal, channel sounding signal, alignment assistance signal, safe data link signal, or the like. The test signal may be used to further evaluate the IBR link or environment, utilizing the current IBR network parameters, optionally including the use of modified frequencies of operation, transmission null steering to existing CBRs, and/or alternative antenna selections. Other embodiments utilize modeling of propagation to determine performance goal satisfaction in step 1480.

In some embodiments, the parameter modifications may be a request for additional scans to be performer in mode details relating to specific frequencies or signal detection attributes for instance. In other embodiments, the updated IBR network parameters may include extensive modifications to the operation of the individuals IBRs including any combination of techniques determined by the parameters discussed herein.

Upon the determination that the new IBR to IBR unobstructed line of sight link is determined (in 1480) to meet performance as discussed, the process of FIG. 14 is exited in step 1490. The performance goals in some embodiments include a minimum data rate between two respective IBRs (MBPS), a minimum reliability parameter such as frame error rate (FER) or bit error rate (BER), an acceptable CBR interference tolerance and parameter in dB as determined by either calculation, extrapolation, modeling, or direct measurement, together or in combination. Such interference assessment margin approaches may include a factor for measurement, or prediction margin of error when direct measurement is not possible.

As an example, in the case where a time division duplexed protocol CBR is detected, and known parameters relating to the CBR transmission power are known as a result of access to a database, the reciprocal propagation channel characteristics of time division duplexed signals may be utilized to determine potential IBR interference with a relatively low margin of error. In other embodiments, where the CBR is a frequency division duplexed signal, use of one, several or all of the perspective IBR transmitter antennas, configured temporarily for transmission from those specific antennas to interfere with the CBR on those specific frequencies, using the channel reciprocity, which also has a relatively low margin of error.

In embodiments where only one side of a link is detectable due to blockage from the transmission of one CBR or a receiving CBR, the margin of error may be higher, requiring the use of measurements on one frequency channel, and prediction on the paired channel. When it can be determined that the fading profile across the band is flat due to little delay spread, a relatively lower margin of error may be utilized. When the delay spread of the channel form the observable CBR is higher in delay spread, resulting in more frequency propagation variation (i.e, frequency selective fading) is present, a higher margin of error is factored in. In either case, some embodiments may use the transmission antenna to perform a receive scan during such assessment as perform in step 1470 and evaluated in step 1480. As such, the satisfactory configuration determination of step 1480 may include a measurement of the channel variation in frequency or time to determine, at least in part, the interference error margins.

With reference to FIG. 15, a detailed process for determining the parameters for adjustment is shown. The process may use information determined using one or more steps of the process of FIG. 14. Similarly, the process of FIG. 15 may supply information to one or more steps of FIG. 14. The process and/or process steps of FIG. 15 may be performed at one or more of the IBR (404, 1020, or 1025), the IBC (408), the IBMS (420), elements of the IBMS (e.g., 424, 428) or another network node (such as a remote processor, or cloud computing resource 456), within the foregoing installation assisting device, etc.

The process begins at step 1520. At 1520, IBS performance prediction and assessment, CBR interference impact assessment, and/or CBR interference margin factors are determined. In some embodiments, RF propagation analysis is used to make these determinations. As discussed in FIG. 15, and in additional detail herein, IBRs and/or databases provide input to the IMBS that can be used in the process of FIG. 15. Examples of this data include, for example:
known location of the IBRs being installed;
angle and azimuth of initial or current antenna placement;
types of antennas (Antenna configuration, and patterns in elevation and azimuth);
IBR Operational Frequencies;
IBR Sensitivity of receivers;
IBR Transmitter spectrum;
IBR Transmitter and receiver beam steering or nulling capabilities;
IBR Radio tx power;
and other parameters of the IBR.

In step 1520, a CBR interference assessment within a conservative range is performed. This range determines specific other stations of interest and may be determined by a fixed geographical range (e.g., 25, 50, or 100 miles), or may be a range calculated based on the above parameters and calculations related to the potential for interfering with other stations. In some embodiments, the potential for interfering with other stations is determined based on the worst case height of CBR antennas. In other embodiments, the range is calculated based upon a calculated potential to be interfered with by other stations based upon a known worst case transmission power for FCC limits, or other known limits such as industry commercially feasible limits and the sensitivity of the IBRs, as one example.

Following the determination of a range, stations of interest are determined using an FCC database of licensed §101 fixed microwave services point to point stations. Other stations may be determined based on additional or alternative databases.

In the embodiment where CBRs are of concern, each station of interest is reviewed and the FCC database RF parameters reviewed relative to the potential to interfere with those stations based on the parameters, or to interfere with the IBRs based upon the existence of those stations.

Exemplary data retrieved from the FCC database (FCC Universal Licensing System—http://wireless.fcc.gov/uls/index.htm?job=home) or a cached image of the database and data from other databases include:
Service Group: Microwave Site-Based
Radio Service Group (including in some embodiments CF— Common carrier Fixed Point to Point Microwave, and other groups as defined in FIG. 13A)
Fixed Transmit Location Details
Location: Lat Long, Street Address
Support Structure Type
Site Elevation
Antenna Elevation
Transmitter antenna height
Polarization
Beam width
Antenna pointing Azimuth and Elevation Angle
Antenna Gain in dBi
EIRP (e.g., 44.8 dBm)
Frequency and tolerance
Emission Designator (Equipment Modulation type and rate) for instance
Baseband Digital Rate 44736 (kbps), 4FSK
Equipment Manufacturer (indicating channel selectivity for including in calculations in some embodiments)
"Paths" frequencies of operation
Location 2: Receive Location—Lat Long, Site Elevation The determination of interference potential to or from the CBRs may utilize propagation modeling. While embodiments may use various propagation modeling approaches, exemplary propagation analysis models include:
Lee
Hata
Okumura-Hata
ITU-R P.53
ITU-R P.154
ITU-R P.452
ITU-R P.1410
Ray tracing, flat models, or other models The models, in some embodiments, are used to perform prediction of interference to the licensed CBRs. Such calculations may additionally be used to refine the scanning procedures of FIG. 14, and perform interference model validation by comparing the FCC database predicted and modeled interferers, with the results of IBR scans. In the case of FDD systems, the modeling to determine interference may be critical, resulting in a varying interference margin tolerance based on directly observed, indirectly observed, or predicted but not observed signals, individually or together.

Further determination of interference from other stations may be performed using reports from other IBRs and use of the propagation models and relative "performance margins" to ensure reliability in the case of uncertain interference levels.

At step 1530, a determination of a predicted satisfactory achievement of the system requirements is performed. The criteria used to determine the predicted satisfactory achievement is similar to those of step 1480 of FIG. 14. The determination is unsatisfactory if the risk of interfering with a §101 radio (CBR or other) is too high, as denoted by a required interference margin of error as discussed, or the risk of being interfered with at an IBR is too high such that it is likely that the link performance will be unacceptable, or if the predicted link performance is too low given required constraints and margins. Further, if no frequency channels are available or currently assigned to a IBR, the result is deemed unsatisfactory.

The IBR network parameters are deemed to be satisfactory if the risk of impacting a CBR is beyond a determined desired tolerance or interference margin, including additional margins for error of prediction in some embodiments. Other embodiments include an acceptable risk of link outages acceptably low at a given target performance level (data rate, FER, and/or BER).

If, in step 1530, the process determines that the current IBR Network parameters are unsatisfactory, the process continues to step 1550. At step 1550, one or more degrees of freedom for one or more specific IBRs are modified to satisfy the requirements of step 1530. Examples of specific degrees of freedom available at a IBR include:

perform IBR to IBR Dynamic Frequency Selection to avoid any operating channels or guard bands where interfere to another station would be impactful or of minimum impact to the criteria of step 1530;

perform IBR Effective Pattern Adjustment, which in various embodiments may include Elevation Steering, Transmitter Beam Nulling and other RF or Digital Array techniques;

perform beam forming calculations for use with the antenna system requiring the generation of Interference Angle of Arrival Vectors based on non-directly detected sources (e.g., databases, remote sensing from other IBRs, etc.);

perform antenna selection, such as the selection of antenna elements from differing angular patterns based upon differing facets of IBR 850, or alternative polarizations;

perform transmitter power adjustments;

request for Physical Adjustments (Manual, or Automatic), as discussed elsewhere.

In one embodiment, step 1550 includes performing the following steps. First, dynamic frequency selection is performed. Dynamic frequency selection predicts interference potential to select a subset of channels within desired operating band. Next, if possible, a channel/antenna selection combination is selected within the operating band where there is no potential of interfering with §101 links based on propagation predictions and no interferers to the IBRs have been detected. If no such condition exists, the channel/antenna combination is selected with the combination of an acceptable impact risk, lowest interference susceptibility risk, and using Tx effective pattern adjustment. These techniques are then employed in a specific order of optimization, including elevation steering, transmitter beam nulling, any additional antenna selection options, then transmitter power adjustments. If all the previous options of the current embodiment have failed to satisfy the link and interference requirements from step 1530, then the channel with the most acceptable interference susceptibility risk and predicted and manageable risk of interfering with §101 radios is selected. Next, if all the previous options of the current embodiment yield unsatisfactory results, antenna transmitter location or angle or azimuth adjustment (manual or mechanically or electrically controlled and automatized) is requested. Finally, if all the previous approaches have failed to result in satisfying the criteria of 1530, additional degrees of freedom in the form of additional transmitter or transceiver capability (co-arrays), separate nulling antennas, canceling transmitters/arrays, and the like, are requested. The process then returns to step 1520. It should be noted that in an embodiment of FIG. 15, following the change of an IBR parameter, also referred to as a degree of freedom in step 1550, returning to steps 1520 and 1530 allows for the evaluation of each modified parameter and the determination of satisfactory configuration per the goals of the system.

As previously described, one approach to the modification of an effective antenna radiation pattern adjustment is the employment of digital beam forming techniques. As such techniques are digital in nature, being performed at base band, the receiver and transmitter radiation patterns may differ. In some embodiments, when the same antennas are utilized for receive and transmit, the effective patterns may also differ due to differences of digital weightings on the receiver and the transmitter processing. In additional embodiments the weighting may be the same. In some embodiments, the transmitter and receiver weights may be or be related using a mathematical relation, with the goal of resulting in differing performance criteria, or in compensating for differing receiver and transmitter configurations. In some embodiments, the differing criteria may be to utilize transmit nulling to minimize the transmitter signal in the direction of another receiver such as, in one embodiment, a CBR or other radio. In other embodiments, the differences in the weights may compensate for the differences in operating frequency between the receiver and the transmitter, the differences between the geometry, polarization, radiation pattern or other properties of the transmitter array relative to the receiver array, or other factors causing a difference in receiver to transmitter weight applicability. Such techniques may be utilized together, separately, or in any combination. Such a relation has been described as a mathematical function based on differences between the receiver properties and the transmitter properties or even as a function of the topology of the IBS deployment, including in certain embodiment the existence of TDD or FDD CBRs.

Algorithms for the calculation, or the modification of the digital weights, are known in the art, and may include in certain embodiments constraints to modify resulting weights to achieve transmit null steering, or receiver null steering. In other embodiments, the algorithms are unconstrained. Additional beam former algorithms may be employed for transmitter and or receiver optimization, or for interference mitigation as known in the art, and include adaptive beam forming techniques. Exemplary beam former or other array processing algorithms include, for example: MMSE, LMS or RLS, CM, Constrained Optimization Techniques, GSC—Generalized Side lobe canceler, a null steering beam former, Zero-Forcing Precoding, Dolph-Chebyshev based techniques, MU-MIMO like techniques, Schelkunoff Polynomial Methods, and Dirty Paper Precoding (DPC).

In the case of transmitter nulling, the determination and estimation of interfered channel state information based on received interfering signal may be employed, and include utilizing the stationary nature of the CBR to IBR channel, or compensating for channel variations. In other embodiments, factors may be considered such as delay spread and spectral flatness.

As will be appreciated, when calculating transmitter weights based upon receiver weights, differences in the configuration of the transmitter and receiver antenna arrays or transceivers are considered. In the case of TDD, the reciprocity of the propagation channel may be utilized. However, array calibration should be performed if different antennas are used for receive and transmit. Other factors which should be considered, calibrated, or otherwise compensated for include weighting translation based on one or more of differing element patterns, gain, phase and polarization differences, and changes relative to the angle of arrival. Additional factors that should be considered include the differences in antenna array geometries or array factor based on angle dependent mutual coupling, or other factors.

Transmitter nulling techniques may further be addressed on a per signal of interest basis, such as a CBR, and utilize nulling vectors for use in a constrained optimization or other approach to the determination of transmitter weights.

Further optimization constraints may include the geometrical translation of nulling vectors and weights on a per SOC basis, a "over constrained" or multiple constrained approach, and, in some embodiments, basing constraints on differing tolerances for the interference margin of error. One embodiment may employ generalized MMSE or LMS with constraints based on tolerance dependent signal of interest (CBR) interference vector constraints (translated) as a function of uncertainty factors.

The aforementioned techniques may also apply to FDD systems in certain embodiments, including the requirements to compensate for differences between the receiver and transmitter antenna elements. In some embodiments, the difference in frequency results in differing effective array geometry as well in terms of the antenna element spacing relative the operating frequency wavelength. Further, where differing antenna elements are used, differences in the effective geometry result as well. These geometrical differences may be compensated for by adjustments in the weights utilized on the transmitter, relative to the receiver based upon expected gain and phase differences relative the geometrical differences as measured in wavelength.

One or more of the methodologies or functions described herein may be embodied in a computer-readable medium on which is stored one or more sets of instructions (e.g., software). The software may reside, completely or at least partially, within memory and/or within a processor during execution thereof. The software may further be transmitted or received over a network.

The term "computer-readable medium" should be taken to include a single medium or multiple media that store the one or more sets of instructions. The term "computer-readable medium" shall also be taken to include any medium that is capable of storing, encoding or carrying a set of instructions for execution by a machine and that cause a machine to perform any one or more of the methodologies of the present invention. The term "computer-readable medium" shall accordingly be taken to include, but not be limited to, solid-state memories, and optical and magnetic media.

Embodiments of the invention have been described through functional modules at times, which are defined by executable instructions recorded on computer readable media which cause a computer, microprocessors or chipsets to perform method steps when executed. The modules have been segregated by function for the sake of clarity. However, it should be understood that the modules need not correspond to discreet blocks of code and the described functions can be carried out by the execution of various code portions stored on various media and executed at various times.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The invention has been described in relation to particular examples, which are intended in all respects to be illustrative rather than restrictive. Those skilled in the art will appreciate that many different combinations of hardware, software, and firmware will be suitable for practicing the present invention. Various aspects and/or components of the described embodiments may be used singly or in any combination. It is intended that the specification and examples be considered as exemplary only, with a true scope and spirit of the invention being indicated by the claims.

The invention claimed is:

1. A method for installing a backhaul link between a first backhaul radio and an at least one second backhaul radio, wherein each one of the first backhaul radio and the second backhaul radio comprises at least an antenna array comprising at least a plurality of directive gain antenna elements, and wherein each directive gain antenna element is couplable to at least one receive RF chain or transmit RF chain, said method comprising the steps of:

course aligning a physical configuration of the first backhaul radio or an arrangement of the antenna array within the first backhaul radio;

course aligning a physical configuration of the second backhaul radio or an arrangement of the antenna array within the second backhaul radio;

transmitting at least one alignment signal from the first backhaul radio using a first transmit antenna pattern or receiving in order to detect at least one alignment signal at the first backhaul radio using a first receive antenna pattern;

transmitting at least one alignment signal from the second backhaul radio using a second transmit antenna pattern or receiving in order to detect at least one alignment signal at the second backhaul radio using a second receive antenna pattern; and adjusting, upon a detection of at least one alignment signal at either of the first backhaul radio or the second backhaul radio, one or more of:
the first transmit antenna pattern;
the second transmit antenna pattern;
the first receive antenna pattern; and
the second receive antenna pattern.

2. The method of claim 1, further comprising the steps of:
scanning a plurality of radio frequency channels for detection of radio signals transmitted from one or more other radio systems, thereby generating scan data;
generating a scan report based on the scan data; and
transmitting the scan report to a server.

3. The method of claim 1, further comprising one or more of the steps of:
fine aligning the physical configuration of the first backhaul radio or the arrangement of the antenna array within the first backhaul radio; and
fine aligning the physical configuration of the second backhaul radio or the arrangement of the antenna array within the second backhaul radio.

4. The method of claim 1, wherein prior to the detection of at least one alignment signal at either of the first backhaul radio or the second backhaul radio, the first transmit antenna pattern is the same as the second transmit antenna pattern.

5. The method of claim 1, wherein prior to the detection of at least one alignment signal at either of the first backhaul radio or the second backhaul radio, the first transmit antenna pattern is the same as the first receive antenna pattern.

6. The method of claim 1, wherein either or both of the first backhaul radio or the second backhaul radio operate under license from the Federal Communications Commission (FCC) under 47 Code of Federal Regulations (CFR) section 101 as a common carrier fixed point-to-point microwave service or as a private operational fixed point-to-point microwave service.

7. The method of claim 1, wherein the adjusting of one or more of the first transmit, second transmit, first receive, and second receive antenna patterns comprises one or more of:
adjusting an effective radiation pattern of an antenna array;
selecting one or more ones of a plurality of directive gain antenna elements;
steering an effective radiation pattern in elevation; and
steering an effective radiation pattern in azimuth.

8. The method of claim 7, wherein the adjusting the effective radiation pattern comprises:
calculating digital beam former weights based upon at least one constraint related to a potential of interference or an improvement of link performance; and
applying the digital beam former weights.

9. The method of claim 1, wherein either or both of the course aligning steps utilizes at least one GPS location or compass direction.

10. The method of claim 9, wherein at least one GPS location or compass direction is determined by an installation assisting device.

11. The method of claim 1, wherein at least one of the pluralities of directive gain antenna elements comprises a first subset of one or more directive gain elements with a first polarization and a second subset of one or more directive gain elements with a second polarization, and wherein the first polarization is orthogonal to the second polarization.

12. The method of claim 11, wherein the first polarization is vertical and the second polarization is horizontal.

13. The method of claim 1, wherein at least one of the pluralities of directive gain antenna elements comprises at least one patch antenna element.

14. The method of claim 1, wherein at least one transmit RF chain comprises at least a vector modulator and two digital to analog converters.

15. The method of claim 1, wherein at least one receive RF chain comprises at least a vector demodulator and two analog to digital converters.

16. The method of claim 1, wherein either or both of the course aligning steps comprises at least manually adjusting a bracket.

17. The method of claim 3, wherein either or both of the fine aligning steps comprises at least physically moving one or more of a plurality of directive gain antenna elements by electrical or electromechanical control.

18. The method of claim 1, wherein the alignment signal comprises at least one of an orthogonal code, a Walsh sequence or a Zadoff-Chu sequence.

19. The method of claim 7, wherein the selecting of one or more ones of the plurality of directive gain antenna elements comprises selecting one or more of:
directive gain antenna elements with different angular patterns; and
directive gain antenna elements with different polarizations.

20. The method of claim 1, wherein the detection of at least one alignment signal at either of the first backhaul radio or the second backhaul radio comprises at least one of detecting a preamble, a pilot tone, a pilot symbol, a training symbol, a periodicity, or a symbol rate correlation.

* * * * *